United States Patent
Jang et al.

(10) Patent No.: US 9,965,608 B2
(45) Date of Patent: May 8, 2018

(54) BIOMETRICS-BASED AUTHENTICATION METHOD AND APPARATUS

(71) Applicant: SAMSUNG ELECTRONICS CO., LTD., Suwon-si, Gyeonggi-do (KR)

(72) Inventors: Yoonkyu Jang, Yongin-si (KR); Kyoungmo Kim, Seongnam-si (KR); Hansub Jung, Yongin-si (KR); Suha Yoon, Seoul (KR); Euichang Jung, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 85 days.

(21) Appl. No.: 14/905,677

(22) PCT Filed: Jul. 18, 2014

(86) PCT No.: PCT/KR2014/006565
§ 371 (c)(1),
(2) Date: Jan. 15, 2016

(87) PCT Pub. No.: WO2015/009111
PCT Pub. Date: Jan. 22, 2015

(65) Prior Publication Data
US 2016/0147987 A1    May 26, 2016

(30) Foreign Application Priority Data

Jul. 18, 2013  (KR) .................. 10-2013-0084956
Aug. 22, 2013  (KR) .................. 10-2013-0099924

(51) Int. Cl.
*H04L 29/06* (2006.01)
*G06F 21/32* (2013.01)
*G06K 9/00* (2006.01)

(52) U.S. Cl.
CPC ......... *G06F 21/32* (2013.01); *G06K 9/00087* (2013.01)

(58) Field of Classification Search
CPC ...................................................... G06F 21/32
See application file for complete search history.

(56) References Cited

U.S. PATENT DOCUMENTS 6,636,973 B1 * 10/2003 Novoa ................ G06F 21/32
340/5.74
7,007,298 B1 * 2/2006 Shinzaki ............. G06F 21/32
382/115

(Continued)

FOREIGN PATENT DOCUMENTS

KR  10-2005-0099220    10/2005
KR     10-0716743      5/2007

(Continued)

OTHER PUBLICATIONS

International Search Report for PCT/KR2014/006565, dated Nov. 19, 2014, 6 pages.

(Continued)

*Primary Examiner* — Shawnchoy Rahman
(74) *Attorney, Agent, or Firm* — Nixon & Vanderhye, P.C.

(57) ABSTRACT

Provided are a method and an electronic device for performing an authentication on the basis of biometrics. The electronic device may acquire sensing data by sensing a target to be authenticated. The electronic device may calculate feature information from the sensing data. The electronic device may determine whether the calculated feature information and stored registered information match each other by using a dynamic matching scheme in which matching between the feature information and the registered information is variably performed according to a state of the electronic device. When the feature information and the (Continued)

registered information match each other on the basis of a result of the determination, the electronic device may generate an event for authentication success.

30 Claims, 37 Drawing Sheets

(56) References Cited

U.S. PATENT DOCUMENTS

| | | | | |
|---|---|---|---|---|
| 2004/0234111 A1* | 11/2004 | Mueller | ............. | G06K 9/00006 382/124 |
| 2005/0226467 A1* | 10/2005 | Hatano | ............. | G06K 9/00067 382/115 |
| 2006/0117188 A1* | 6/2006 | Fiske | ................ | G06F 21/32 713/186 |
| 2006/0153433 A1* | 7/2006 | Lo | .................... | G11B 20/00086 382/124 |
| 2006/0265231 A1* | 11/2006 | Fusaro | .................. | G06Q 10/10 717/120 |
| 2008/0013804 A1* | 1/2008 | Moon | ................ | G06F 21/32 382/124 |
| 2010/0061602 A1* | 3/2010 | Yamada | ............. | G06K 9/00067 382/124 |
| 2010/0162386 A1* | 6/2010 | Li | ........................ | G06F 21/32 726/19 |
| 2010/0315356 A1 | 12/2010 | Ferren et al. | | |
| 2012/0013436 A1 | 1/2012 | Niinuma | | |
| 2012/0230555 A1* | 9/2012 | Miura | ............... | G06K 9/00087 382/124 |
| 2012/0253953 A1* | 10/2012 | Aziz | ............... | G06Q 20/40145 705/16 |
| 2013/0004032 A1 | 1/2013 | Abiko | | |
| 2013/0279770 A1* | 10/2013 | Abe | .................. | G06K 9/00087 382/124 |
| 2015/0047017 A1* | 2/2015 | Kim | ....................... | G06F 21/36 726/19 |
| 2015/0254445 A1* | 9/2015 | Takagi | ............... | H04L 63/0861 726/7 |
| 2016/0034744 A1* | 2/2016 | Chiang | ............. | G06K 9/00073 382/125 |

FOREIGN PATENT DOCUMENTS

| | | | | |
|---|---|---|---|---|
| KR | 10-2008-0092789 | | 10/2008 | |
| WO | WO 0159690 A1 * | | 8/2001 | ......... G06K 9/00093 |

OTHER PUBLICATIONS

Written Opinion of the ISA for PCT/KR2014/006565, dated Nov. 19, 2014, 7 pages, (foreign language).

* cited by examiner

FIG. 12

- REGISTERED FEATURE INFORMATION TEMPLATES
- FEATURE INFORMATION TEMPLATES FOR FOUR GOOD IMAGES
- IMAGE MINUTIA VALUE = {68, 68, 68, 68}

- IMAGE MINUTIA VALUE = 68
- MATCH RESULT = {9, 7, 4, 16}

- IMAGE MINUTIA VALUE = 68
- MATCH RESULT = {15, 20, 8, 7}

- IMAGE MINUTIA VALUE = 68
- MATCH RESULT = {7, 6, 5, 7}

[a]

[b]

BIOMETRICS-BASED AUTHENTICATION METHOD AND APPARATUS

This application is the U.S. national phase of International Application No. PCT/KR2014/006565 filed 18 Jul. 2014, which designated the U.S. and claims priority to KR Patent Application Nos. 10-2013-0084956 filed 18 Jul. 2013, and 10-2013-0099924 filed 22 Aug. 2013, the entire contents of each of which are hereby incorporated by reference.

TECHNICAL FIELD

The present invention relates to a biometrics-based authentication method and an electronic device that is able to perform the biometrics-based authentication.

BACKGROUND ART

A variety of schemes related to security or authentication are used in the electronic devices.

For example, portable electronic devices adopt a lock function in order to prevent unauthorized persons from using the electronic devices. The lock function may be implemented by a technology, such as a password or PIN (Personal Identification Number) input scheme, or a pattern lock scheme by using a touch screen.

In addition, biometrics-based methods, in which the individual biometric features are recognized to be utilized for security systems or authentication systems, include a fingerprint recognition method, a face recognition method, or a voice recognition method.

In the biometrics-based system, the data, which is registered in the database of the authentication system by the user, may be compared with the data, which is detected from the user for the authentication, in order to thereby determine the success of the authentication.

Recently, with the development of biometric implementation technology, attempts to apply biometrics to various fields have been made. There have been various requirements, such as the reliability of the biometrics or the security level, for the security system, the authentication system, or each application field, so studies are required to satisfy such requirements.

In addition, research is required to improve the usability for the user to use the biometrics-based system or to conduct the authentication by using the same.

DETAILED DESCRIPTION OF THE INVENTION

Technical Problem

An object, according to an aspect of the present invention, is to provide a biometrics-based authentication method and an apparatus, in which a criterion for the biometrics may be configured according to the circumstances when performing the biometrics-based authentication.

In addition, an object, according to another aspect of the present invention, is to provide a biometrics-based authentication method and an apparatus, in which a criterion for evaluating the quality level of the biometric information is configured to be different depending on a registration mode and an authentication mode when performing the biometrics-based authentication.

In addition, an object, according to another aspect of the present invention, is to provide a biometrics-based authentication method and an apparatus, in which a user interface is provided to configure the security level and the authentication is conducted according to the configured security level when performing the biometrics-based authentication.

In addition, an object, according to another aspect of the present invention, is to provide a biometrics-based authentication method and an apparatus, which control to update registered information by using new biometric information when a preset criterion is satisfied in the biometrics-based authentication.

In addition, an object, according to another aspect of the present invention, is to provide a biometrics-based authentication method and an apparatus, which more intelligently select a fingerprint template that is to be compared with the input fingerprint of the user in order to thereby more rapidly perform the user authentication by using the fingerprint.

Technical Solution

According to an embodiment of the present invention, a biometrics-based authentication method of an electronic device may include: sensing the authentication target to obtain sensing data; calculating feature information based on the sensing data; if the quality level of the biometric information, which includes at least one piece of the sensing data or the feature information, is equal to or more than the first preset quality level in the registration mode, recording the feature information as registered information on the authentication target; if the quality level of the biometric information is equal to or more than the second preset quality level in the authentication mode, identifying whether or not the feature information matches the registered information, wherein the first preset quality level in the registration mode and the second preset quality level in the authentication mode may be different from each other.

According to an embodiment, the operation of obtaining the sensing data may include correcting the sensing data in order to thereby obtain the corrected sensing data, and the sensing data contained in the biometric information may include the corrected sensing data.

According to an embodiment, the first preset quality level may be more than the second preset quality level.

According to an embodiment, the first preset quality level may include at least one of the quality level of preset registration sensing data for evaluating the quality level of the sensing data or the quality level of the preset registration feature information on evaluating the quality level of the feature information, in the registration mode, and the second preset quality level may include at least one of the quality level of preset authentication sensing data for evaluating the quality level of the sensing data or the quality level of the preset authentication feature information on evaluating the quality level of the feature information, in the authentication mode.

According to an embodiment, the quality level of the preset registration sensing data may be equal to or more than the quality level of the preset authentication sensing data, and the quality level of the preset registration feature information may be equal to or more than the quality level of the preset authentication feature information.

According to an embodiment, the quality level of the biometric information may include at least one of the quality level of the sensing data or the quality level of the feature information.

According to an embodiment, in the case where the biometric information is fingerprint recognition information, the quality level of the sensing data may be calculated based on at least one of the size of an area, the degree of distortion, an offset, or a rotation angle of the image that is obtained from the authentication target, and the quality level of the feature information may be calculated based on at least one of the existence of at least one of a bifurcation point, an end point, a core, or a delta in the minutiae, or the number of feature points.

According to an embodiment, the authentication target may include at least one of a user's fingerprint, a hand pattern, a vein pattern, a retina pattern, an iris pattern, an ear shape, a facial feature, or the like.

According to an embodiment, if the quality level of the biometric information is lower than the first preset quality level in the registration mode, the method may further include providing a user interface for at least one of the feedback on the registration failure or the acquisition of new sensing data.

According to an embodiment, if the quality level of the biometric information is lower than the second preset quality level in the authentication mode, the method may further include providing a user interface for at least one of the feedback on the registration failure or the acquisition of new sensing data.

According to an embodiment, the method may further include, in the case where the quality level of the biometric information includes the quality level of the sensing data, if the quality level of the sensing data is less than the quality level of the preset registration sensing data that belongs to the first preset quality level, or is less than the quality level of the preset authentication sensing data that belongs to the second preset quality level, omitting the calculation of the feature information and providing a user interface for requesting the acquisition of new sensing data.

According to an embodiment of the present invention, an electronic device for performing biometrics-based authentication may include: a memory that stores the first preset quality level and the second preset quality level; a sensor unit that senses the authentication target to obtain sensing data; and a control unit that calculates feature information based on the sensing data, if the quality level of the biometric information, which includes at least one piece of the sensing data or the feature information, is equal to or more than the first preset quality level in the registration mode, records the feature information as registered information on the authentication target, and if the quality level of the biometric information is equal to or more than the second preset quality level in the authentication mode, identifies whether or not the feature information matches the registered information, wherein the first preset quality level in the registration mode and the second preset quality level in the authentication mode may be different from each other.

According to an embodiment, the control unit may correct the sensing data in order to thereby obtain the corrected sensing data, and the sensing data contained in the biometric information may include the corrected sensing data.

According to an embodiment, the first preset quality level may be more than the second preset quality level.

According to an embodiment, the first preset quality level may include at least one of the quality level of preset registration sensing data for evaluating the quality level of the sensing data or the quality level of the preset registration feature information on evaluating the quality level of the feature information, in the registration mode, and the second preset quality level may include at least one of the quality level of preset authentication sensing data for evaluating the quality level of the sensing data or the quality level of the preset authentication feature information on evaluating the quality level of the feature information, in the authentication mode.

According to an embodiment, the quality level of the preset registration sensing data may be equal to or more than the quality level of the preset authentication sensing data, and the quality level of the preset registration feature information may be equal to or more than the quality level of the preset authentication feature information.

According to an embodiment, the quality level of the biometric information may include at least one of the quality level of the sensing data or the quality level of the feature information.

According to an embodiment, in the case where the biometric information is fingerprint recognition information, the quality level of the sensing data may be calculated based on at least one of the size of an area, the degree of distortion, an offset, or a rotation angle of the image that is obtained from the authentication target, and the quality level of the feature information may be calculated based on at least one of the existence of at least one of a bifurcation point, an end point, a core, or a delta in the minutiae, or the number of feature points.

According to an embodiment, the authentication target may include at least one of a user's fingerprint, a hand pattern, a vein pattern, a retina pattern, an iris pattern, an ear shape, a facial feature, or the like.

According to an embodiment, the electronic device may further include a user interface unit that, if the quality level of the biometric information is lower than the first preset quality level in the registration mode, provides a user interface for at least one of the feedback on the registration failure or the acquisition of new sensing data.

According to an embodiment, the electronic device may further include a user interface unit that, if the quality level of the biometric information is lower than the second preset quality level in the authentication mode, provides a user interface for at least one of the feedback on the registration failure or the acquisition of new sensing data.

According to an embodiment, the control unit, in the case where the quality level of the biometric information includes the quality level of the sensing data, if the quality level of the sensing data is less than the quality level of the preset registration sensing data that belongs to the first preset quality level or is less than the quality level of the preset authentication sensing data that belongs to the second preset quality level, may control to omit the calculation of the feature information and to provide a user interface for requesting the acquisition of new sensing data.

According to another embodiment of the present invention, a biometrics-based authentication method of the electronic device may include: storing registered information on the authentication target; providing a user interface for configuring the security levels for an application that performs the biometrics-based authentication; specifying a threshold according to the security level configured through the user interface; sensing the authentication target to obtain sensing data; calculating feature information based on the sensing data; and if a match score, which indicates the degree to which the feature information and the registered information match, is equal to or more than the specified threshold, generating an authentication success event.

According to another embodiment, the operation of specifying the threshold may include: if the security level is configured to be high through the user interface, specifying the first threshold that reduces the FAR (false acceptance rate) for the authentication target; and if the security level is configured to be low through the user interface, specifying the second threshold that reduces the FRR (false rejection rate) for the authentication target.

According to another embodiment, the application may include at least one of a screen lock application or a financial application.

According to another embodiment, the method may further include: accumulating and storing the match score that indicates the degree to which the feature information and the registered information match; and controlling to update the registered information by using the feature information when the accumulated match score satisfies a predetermined criterion.

According to another embodiment, the operation of controlling the update may include, if the quality level of the feature information is higher than the quality of the fingerprint template included in the registered information, controlling to store the feature information as a new fingerprint template.

According to another embodiment, the operation of accumulating and storing the match score may include accumulating and storing authentication scores, which refer to the match scores that are equal to or more than a preset threshold.

According to another embodiment, the preset criterion may refer to the case where the accumulated authentication score for the authentication target is gradually lowered to be the same as, or close to, the preset threshold.

According to another embodiment, the method may include: if the authentication target relates to a child, controlling to periodically update the registered information by using the feature information; and when the authentication target relates to an adult, if the number of update times by using the feature information exceeds the preset number of times, stopping the addition of the fingerprint template included in the registered information on the authentication target in order to thereby limit the update of the registered information.

According to another embodiment of the present invention, an electronic device for performing the biometrics-based authentication may include: a memory that stores registered information on the authentication target; a user interface unit that provides a user interface for configuring the security level of an application that performs the biometrics-based authentication; a sensor unit that senses the authentication target to obtain sensing data; and a control unit that specifies a threshold according to the security level configured through the user interface, calculates feature information based on the sensing data, and if a match score, which indicates the degree to which the feature information and the registered information match, is equal to or more than the specified threshold, generates an authentication success event.

According to another embodiment, the control unit, if the security level is configured to be high through the user interface, may specify the first threshold that reduces the FAR, and if the security level is configured to be low through the user interface, may specify the second threshold that reduces the FRR.

According to another embodiment, the control unit may accumulate and store the match score that indicates the degree to which the feature information and the registered information match, and may control to update the registered information by using the feature information when the accumulated match score satisfies a predetermined criterion.

According to another embodiment, the control unit, if the quality level of the feature information is higher than the quality of the fingerprint template included in the registered information, may control to store the feature information as a new fingerprint template.

According to another embodiment, the control unit may control to accumulate and store authentication scores, which refer to the match scores that are equal to or more than a preset threshold.

According to another embodiment, the preset criterion may refer to the case where the accumulated authentication score for the authentication target is gradually lowered to be the same as, or close to, the preset threshold.

According to another embodiment, the control unit, if the authentication target relates to a child, may control to periodically update the registered information by using the feature information, and when the authentication target relates to an adult, if the number of update times by using the feature information exceeds the preset number of times, may stop the addition of the fingerprint template included in the registered information on the authentication target in order to thereby limit the update of the registered information.

According to another embodiment of the present invention, a biometrics-based authentication method of the electronic device may include: if the quality level of the first biometric information obtained from the authentication target is equal to or more than the first preset quality level, recording at least some of the first biometric information as registered information on the authentication target; specifying a threshold according to the security level configured through the user interface; and if the quality level of the second biometric information obtained from the authentication target is equal to or more than the second preset quality level, and a match score that indicates the degree of matching to which the second biometric information and the registered information match is equal to or more than the specified threshold, generating an authentication success event.

According to another embodiment of the present invention, an electronic device for performing biometrics-based authentication may include: a memory that stores registered information on the authentication target; a user interface unit that provides a user interface for configuring the security level of an application that performs the biometrics-based authentication; and a control unit that, if the quality level of the first biometric information obtained from the authentication target is equal to or more than the first preset quality level, records at least some of the first biometric information as the registered information, and if the quality level of the second biometric information obtained from the authentication target is equal to or more than the second preset quality level and a match score that indicates the degree to which the second biometric information and the registered information match is equal to or more than the specified threshold, generates an authentication success event.

According to another embodiment of the present invention, a method for authenticating the user's fingerprint by using fingerprint template selection information may include: sensing the finger; recognizing the fingerprint of the sensed finger and extracting feature information from the recognized fingerprint; determining fingerprint template selection information based on at least one piece of status information on the electronic device or fingerprint history information; and determining the priority of the fingerprint templates to be matched with the feature information of the extracted fingerprint based on the fingerprint template selection information.

According to another embodiment, the status information on the electronic device may be determined based on the position of the fingerprint recognition sensor.

According to another embodiment, the status information on the electronic device may be determined based on skew information on the finger, which is input into the fingerprint recognition sensor.

According to another embodiment, the status information on the electronic device may be determined based on the attachment or detachment of a stylus that is provided at a specific position of the electronic device.

According to another embodiment, the status information on the electronic device may be determined based on a hand that is holding the electronic device.

According to another embodiment, the status information on the electronic device may be determined based on the configuration information of the electronic device.

According to another embodiment, the fingerprint history information may be determined based on the frequency of authentication.

According to another embodiment, the frequency of authentication may be updated according to the fingerprint authentication success or failure.

According to another embodiment, a method for authenticating the user's fingerprint by using fingerprint template selection information may include: sensing the finger; recognizing the fingerprint of the sensed finger and extracting feature information from the recognized fingerprint; transmitting the extracted feature information to a server; and transmitting the fingerprint template selection information, which is determined based on status information on the electronic device or fingerprint history information, to the server.

According to another embodiment, a method for authenticating the user's fingerprint by using fingerprint template selection information may include determining the priority of fingerprint templates, wherein the fingerprint template selection information is determined based on status information on the electronic device or fingerprint history information.

According to another embodiment of the present invention, an electronic device for authenticating the user's fingerprint by using fingerprint template selection information may include: a storage unit that fingerprint templates; an extracting unit that extracts feature information from the recognized fingerprint; an obtaining unit that obtains the fingerprint template selection information that is determined based on status information on the electronic device or fingerprint history information; and a determining unit that determines the priority of the fingerprint templates to be matched with the feature information of the extracted fingerprint based on the fingerprint template selection information.

According to another embodiment, the status information on the electronic device may be determined based on the position of the fingerprint recognition sensor.

According to another embodiment, the status information on the electronic device may be determined based on skew information on the finger, which is input into the fingerprint recognition sensor.

According to another embodiment, the status information on the electronic device may be determined based on the attachment or detachment of a stylus that is provide at a specific position of the electronic device.

According to another embodiment, the status information on the electronic device may be determined based on a hand that is holding the electronic device.

According to another embodiment, the status information on the electronic device may be determined based on the configuration information of the electronic device.

According to another embodiment, the fingerprint history information may be determined based on the frequency of authentication.

According to another embodiment, the frequency of authentication may be updated according to the fingerprint authentication success or failure.

According to another embodiment of the present invention, an electronic device for authenticating the user's fingerprint by using fingerprint template selection information may include: a fingerprint recognition sensor unit that senses the user's finger and recognizes the fingerprint of the sensed finger; an extracting unit that extracts feature information from the recognized fingerprint; an obtaining unit that obtains the fingerprint template selection information based on at least one piece of status information on the electronic device or fingerprint history information; and a transmitting unit that transmits the extracted feature information and the obtained fingerprint template selection information to a server.

According to another embodiment of the present invention, a server for authenticating the user's fingerprint by using fingerprint template selection information may include: a storage unit that stores fingerprint templates; a receiving unit that receives, from the electronic device, feature information of the user's fingerprint and fingerprint template selection information; and a determining unit that determines the priority of the fingerprint templates to be matched with the feature information of the extracted fingerprint based on the fingerprint template selection information, wherein the fingerprint template selection information is determined based on at least one piece of status information on the electronic device or fingerprint history information.

According to another embodiment of the present invention, a biometrics-based authentication method of an electronic device may include: storing registered information on the authentication target; sensing the authentication target to obtain sensing data, and calculating feature information from the sensing data; determining whether or not the calculated feature information and the stored registered information match each other by using a dynamic matching scheme in which the matching operation of the feature information and the registered information is variably performed according to the status of the electronic device; and if the feature information and the registered information match each other as a result of the determination, generating an authentication success event.

According to another embodiment, the dynamic matching scheme, in which the matching operation of the feature information and the registered information is variably performed according to the status of the electronic device, may be a scheme that performs the matching of the feature information and the registered information by selectively applying one of the plurality of matching schemes, which are distinguished according to the status of the electronic device.

According to another embodiment, the plurality of matching schemes, which are distinguished according to the status of the electronic device, may have different security levels according to the status of the electronic device.

According to another embodiment, the plurality of matching schemes, which are distinguished according to the status of the electronic device, may use different fingerprint templates according to the status of the electronic device.

According to another embodiment, the plurality of matching schemes, which are distinguished according to the status of the electronic device, may be distinguished according to the type of application that requests the biometrics-based authentication through the electronic device.

According to another embodiment, in the case where a screen lock application and a financial application are installed in the electronic device, the plurality of matching schemes, which are distinguished according to the status of the electronic device, may be distinguished according to whether the application, which requests the biometrics-based authentication through the electronic device, is the screen lock application or the financial application.

According to another embodiment, the plurality of matching schemes, which are distinguished according to the status of the electronic device, may be distinguished according to the direction in which the fingerprint recognition sensor is positioned when the electronic device is in a horizontal mode.

According to another embodiment, the plurality of matching schemes, which are distinguished according to the status of the electronic device, may be distinguished according to the direction in which a finger input is received on the fingerprint recognition sensor of the electronic device.

According to another embodiment, the plurality of matching schemes, which are distinguished according to the status of the electronic device, may be distinguished according to the attachment or detachment of a stylus that is provided at a preset position of the electronic device.

According to another embodiment, the plurality of matching schemes, which are distinguished according to the status of the electronic device, may be distinguished according to whether the electronic device is held by a right hand or a left hand.

According to another embodiment, the plurality of matching schemes, which are distinguished according to the status of the electronic device, may be distinguished based on information that is configured through a configuration menu provided by the electronic device.

According to another embodiment, the plurality of matching schemes, which are distinguished according to the status of the electronic device, may be distinguished according to the growth condition of a user of the electronic device.

According to another embodiment, the method may further include providing a user interface for differently configuring the security level according to the status of the electronic device.

According to another embodiment, the method may further include: providing an object that represents the security level in one of the states of the electronic device; and changing the security level in one state to a low security level or a high security level according to a user input.

According to another embodiment of the present invention, a biometrics-based authentication method of an electronic device may include: storing registered information on the authentication target; providing a user interface for configuring the security levels for a plurality of applications that perform the biometrics-based authentication; configuring the security level for one of the plurality of applications according to a user input through the user interface; when the biometrics-based authentication related to the one application is performed, sensing the authentication target to obtain sensing data; calculating feature information based on the sensing data; and if the feature information and the registered information match each other based on the security level, generating an authentication success event.

According to an embodiment of the present invention, an electronic device for performing biometrics-based authentication may include: a memory that stores registered information on the authentication target; a sensor unit that senses the authentication target to obtain sensing data; and a control unit that determines whether or not feature information, which is calculated from the sensing data obtained by the sensor unit, and the registered information, which is stored in the memory, match each other by using a dynamic matching scheme in which the matching operation of the feature information and the registered information is variably performed according to the status of the electronic device, and if the feature information and the registered information match each other as a result of the determination, generates an authentication success event.

According to another embodiment, the dynamic matching scheme, in which the matching operation of the feature information and the registered information is variably performed according to the status of the electronic device, may be a scheme that performs the matching of the feature information and the registered information by selectively applying one of the plurality of matching schemes, which are distinguished according to the status of the electronic device.

According to another embodiment, the plurality of matching schemes, which are distinguished according to the status of the electronic device, may have different security levels according to the status of the electronic device.

According to another embodiment, the plurality of matching schemes, which are distinguished according to the status of the electronic device, may use different fingerprint templates according to the status of the electronic device.

According to another embodiment, the plurality of matching schemes, which are distinguished according to the status of the electronic device, may be distinguished according to the type of application that requests the biometrics-based authentication through the electronic device.

According to another embodiment, in the case where a screen lock application and a financial application are installed in the electronic device, the plurality of matching schemes, which are distinguished according to the status of the electronic device, may be distinguished according to whether the application, which requests the biometrics-based authentication through the electronic device, is the screen lock application or the financial application.

According to another embodiment, the plurality of matching schemes, which are distinguished according to the status of the electronic device, may be distinguished according to the direction in which the fingerprint recognition sensor is positioned when the electronic device is in a horizontal mode.

According to another embodiment, the plurality of matching schemes, which are distinguished according to the status of the electronic device, may be distinguished according to the direction in which a finger input is received on the fingerprint recognition sensor of the electronic device.

According to another embodiment, the plurality of matching schemes, which are distinguished according to the status of the electronic device, may be distinguished according to the attachment or detachment of a stylus that is provided at a preset position of the electronic device.

According to another embodiment, the plurality of matching schemes, which are distinguished according to the status of the electronic device, may be distinguished according to whether the electronic device is held by a right hand or a left hand.

According to another embodiment, the plurality of matching schemes, which are distinguished according to the status of the electronic device, may be distinguished based on information that is configured through a configuration menu provided by the electronic device.

According to another embodiment, the plurality of matching schemes, which are distinguished according to the status of the electronic device, may be distinguished according to the growth condition of a user of the electronic device.

According to another embodiment, the electronic device may further include a user interface unit that provides a user interface for differently configuring the security level according to the status of the electronic device.

According to another embodiment, the electronic device may further include a user interface unit that provides an object that represents the security level in one of the states of the electronic device, wherein the control unit changes the security level in one state to a low security level or a high security level according to a user input through the user interface unit.

According to another embodiment of the present invention, an electronic device for performing biometrics-based authentication may include: a memory that stores registered information on the authentication target; a user interface unit that provides a user interface for configuring the security level of an application that performs the biometrics-based authentication; a sensor unit that senses the authentication target to obtain sensing data; and a control unit that configures the security level for one of the plurality of applications according to a user input through the user interface, when the biometrics-based authentication related to the one application is performed, calculates feature information based on the sensing data obtained through the sensor unit, and if the feature information and the registered information match each other based on the security level, generates an authentication success event.

Meanwhile, another embodiment of the present invention provides a computer-readable recording medium that records a program to execute the methods above.

Furthermore, other methods, other systems, and a computer-readable recording medium that records a computer program to execute the methods may be provided.

Advantageous Effects

A criterion for evaluating the quality level of the biometric information is configured to be different depending on the registration mode or the authentication mode in order to thereby secure the reliability of the quality of the biometric information, which is stored as the registered information, and in order to thereby increase the success rate of the authentication so that the usability may be improved.

In addition, since a user interface for configuring the security level is provided and the biometrics-based authentication is performed according to the configured security level, the user may conveniently configure the security level depending on the usage environment or purpose of the electronic device.

In addition, since the registered information is updated by using new biometric information when a preset criterion is satisfied, the registered information may remain to be high quality and the usability may be effectively improved.

In addition, the fingerprint template to be compared with the user's input fingerprint may be more intelligently selected so that the user authentication may be more quickly performed.

BRIEF DESCRIPTION OF THE DRAWINGS

FIG. 12 is a conceptual diagram showing a matching result of feature information corresponding to a variety of sensing data and registered information, according to an embodiment of the present invention.

MODE FOR CARRYING OUT THE INVENTION

Figure 1:
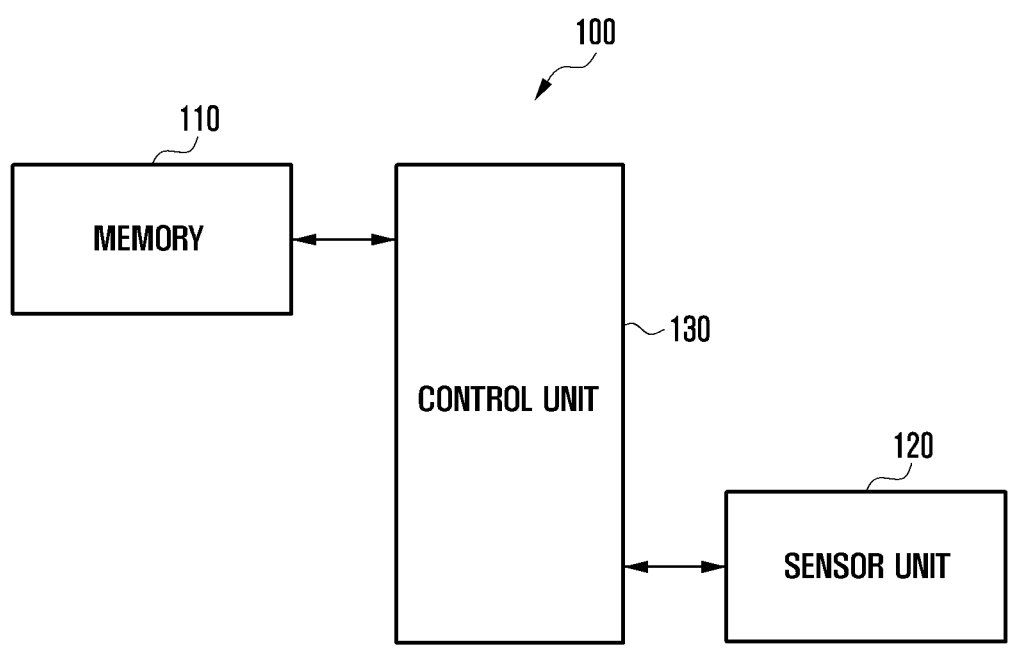
FIG. 1 is an exemplary diagram illustrating an electronic device, according to an embodiment of the present invention.

The detailed description of the present invention will be given below with reference to the accompanying drawings illustrated for specific embodiments implementing the present invention as examples. The embodiments will be sufficiently described in detail such that those skilled in the art may carry out the present invention. It should be understood that although various embodiments of the present invention are different from each other, they need not be mutually exclusive.

For example, specific shapes, structures, or features described in the present specification may be modified for another embodiment without departing from the spirit and scope of the present invention. In addition, it should be understood that the position or arrangement of each element in each embodiment may vary without departing from the spirit and scope of the present invention. Therefore, the present invention is not limited to the following description, and the scope of the present invention should be interpreted to encompass the full range of claims and equivalents thereof.

Similar reference numerals shown in the drawings denote members performing an identical or similar function in several aspects. Further, parts irrelevant to the present invention are omitted in the drawings to make the present invention clear and the same reference numerals are designated to the same or similar components throughout the specification.

Hereinafter, exemplary embodiments of the present invention will be described in detail with reference to the accompanying drawings to be easily implemented by those skilled in the art to which the present invention pertains. However, the present invention may be implemented in various different forms and is not limited to embodiments described herein.

In embodiments of the present invention, when it is described that an element is "connected" to another element, not only the first element may be "connected directly" to the second element, but the first element may also be "electrically connected" to the second element while a third element is interposed therebetween. In the entire specification of the present application, when it is described that a certain unit i°includes; i± a certain element, this means that the unit may include any other element rather than exclude the any other element unless otherwise described.

The terms "unit", "module" and the like used in the specification refer to units processing at least one function or operation and may be implemented by hardware, software, or a combination thereof.

The electronic device 100, according to an embodiment, may be implemented in various forms. For example, the electronic device 100 described herein may include a mobile electronic device 100, or a variety of devices that are comprised of a computer, a memory, and a control unit. The electronic device 100 may be a mobile phone, a smart phone, a laptop computer, a tablet PC, an e-book electronic device 100, a digital broadcasting electronic device 100, a PDA (Personal Digital Assistants), a PMP (Portable Multimedia Player), a navigation device, a wearable PC, a wrist-watch phone, a smart TV set, or the like, but the electronic device 100 is not limited thereto. In addition, all kinds of electronic devices 100 that can be connected with a health fingerprint authentication server through a network may be included.

Hereinafter, embodiments of the present invention will be described in more detail with reference to the accompanying drawings to allow those skilled in the art to easily implement the present invention. However, the present invention may be implemented in various different forms and is not limited to embodiments described herein. Further, parts irrelevant to the present invention are omitted in the drawings to make the present invention clear and the same reference numerals are designated to the same or similar components throughout the specification.

The electronic device 100 capable of performing the biometrics-based authentication may sense the authentication target. The authentication target may include user's behavior, a user's body, or at least a part of the body. For example, the authentication target may be the physiological characteristics, such as a user's fingerprint, a hand pattern, a vein pattern, a retina pattern, an iris pattern, an ear shape, a facial feature, or a DNA (deoxyribonucleic Acid) nucleotide sequence. In addition, the authentication target may further include behavioral features, such as a user's handwriting (or signature), voice, or gait.

The electronic device 100 may include a sensor unit for sensing the authentication target. The sensor unit may include various biometric authentication types of sensors according to the authentication target. For example, the sensor unit may include a fingerprint recognition sensor 121, a retina recognition sensor, or an iris recognition sensor. In addition, the sensor unit may include an optical sensor, such as a camera or an infrared sensor, for the face recognition or iris recognition. In addition, the sensor unit may include a pressure sensitive sensor or a touch panel for detecting the handwriting. Here, the pressure sensitive sensor or the touch panel may be provided in a user interface unit of the electronic device 100 rather than the sensor unit. For example, the touch panel and a display module, which are included in the user interface unit, may be combined to make a touch screen, and the user's handwriting may be sensed through the touch screen. In addition, the sensor unit may include a motion sensor or a camera for detecting the behavioral features.

In addition, the sensor unit may be omitted from the electronic device 100, and the electronic device 100 may receive the sensing data that is transmitted from sensors or separate devices outside the electronic device 100. The electronic device 100 may perform the registration or the authentication procedure for the biometrics-based authentication by using the sensing data.

Hereinafter, the electronic device 100, according to an embodiment of the present invention, will be described in more detail with reference to FIG. 1 to FIG. 3.

FIG. 1 is an exemplary diagram illustrating the electronic device 100, according to an embodiment of the present invention.

The electronic device 100 may include a memory 110, a sensor unit 120, and a control unit 130.

The memory 110 may store the first preset quality level and the second preset quality level.

The first preset quality level may include at least one of a registration sensing data quality level that is preset to evaluate the quality level of the sensing data in a registration mode, and a registration feature information quality level that is preset to evaluate the quality level of feature information.

The second preset quality level may include at least one of an authentication sensing data quality level that is preset to evaluate the quality level of the sensing data in an authentication mode, and an authentication feature information quality level that is preset to evaluate the quality level of the feature information.

The sensor unit 120 may sense the authentication target in order to thereby acquire the sensing data. The authentication target may be a user's fingerprint, a hand pattern, a vein pattern, a retina pattern, an iris pattern, an ear shape, a facial feature, a DNA nucleotide sequence, user's handwriting, voice, or gait. The sensor unit 120 may include a fingerprint recognition sensor 121, a retina recognition sensor, an iris recognition sensor, an optical sensor, such as a camera or an infrared sensor, a pressure sensitive sensor, a motion sensor, or the like, according to the authentication target.

The control unit 130 may calculate the feature information based on the sensing data. In addition, the control unit 130 may correct the sensing data in order to thereby obtain the corrected sensing data. When the corrected sensing data is obtained, the control unit 130 may calculate the feature information based on the corrected sensing data.

In addition, if the quality level of the biometric information is equal to or more than the first preset quality level in the registration mode, the control unit 130 may control to store the feature information, as registered information on the authentication target, in the memory 110.

Here, the biometric information may include at least one piece of the sensing data or the feature information. The sensing data included in the biometric information may include at least one piece of the sensing data that is obtained from the sensor unit 120 or the sensing data that is obtained by correcting the sensing data received from the sensor unit 120 by the control unit 130. The quality level of the biometric information may include at least one of the quality level of the sensing data or the quality level of the feature information.

If the quality level of the biometric information is equal to or more than the second preset quality level in the authentication mode, the control unit 130 may identify whether or not the feature information matches the registered information.

Here, the first preset quality level in the registration mode and the second preset quality level in the authentication mode may be different from each other. For example, the first preset quality level may be more than the second preset quality level. The fact that the first preset quality level is more than the second preset quality level may mean that the quality level of the preset registration sensing data is equal to or more than the quality level of the preset authentication sensing data, or the quality level of the preset registration feature information is equal to or more than the quality level of the preset authentication feature information.

In addition, in the case where the quality level of the biometric information includes the quality level of the sensing data, if the quality level of the sensing data is less than the quality level of the preset registration sensing data that belongs to the first preset quality level, or is less than the quality level of the preset authentication sensing data that belongs to the second preset quality level, the control unit 130 may control to omit the calculation of the feature information and to provide a user interface for requesting the acquisition of new sensing data.

In addition, if the quality level of the biometric information is lower than the first preset quality level in the registration mode, the control unit 130 may control to provide a user interface for at least one of the feedback on the registration failure or the acquisition of new sensing data.

For example, the feedback on the registration failure may be displayed as "User information registration has failed", or may be provided through a voice or a sound effect. The user interface for the acquisition of new sensing data may ask if the user is to retry the biometric authentication for the registration of the user information, or may visually or audibly provide the user guidance for obtaining the sensing data from the user through the sensor unit 120 of the electronic device 100. For example, the user interface may provide information on the position of the fingerprint recognition sensor 121 of the electronic device 100 for the fingerprint recognition, or may provide information on the user's gesture for the fingerprint recognition sensor 121.

In addition, if the quality level of the biometric information is lower than the second preset quality level in the authentication mode, the control unit 130 controls to provide a user interface for at least one of the feedback on the authentication failure or the acquisition of new sensing data.

For example, the feedback on the authentication failure may be a visual or audible notification, such as "User authentication has failed." The user interface for the acquisition of new sensing data may ask if the user is to retry the biometric authentication for the user authentication, or may provide the user guidance for the biometric authentication, as described above. In addition, the electronic device 100 may further include a user interface unit (not shown) that provides the feedback on the registration failure or the authentication failure, or that provides the user interface for obtaining new sensing data.

In addition, the control unit 130 may determine whether or not the feature information, which is calculated based on the sensing data, matches the pre-stored registered information by using a dynamic matching scheme in which the matching operation of the feature information and the registered information is variably performed according to the status of the electronic device 100.

The dynamic matching scheme, in which the matching operation of the feature information and the registered information is variably performed according to the status of the electronic device 100, may be a scheme in which the matching operation of the feature information and the registered information is performed by selectively applying a single matching scheme corresponding to the status of the electronic device 100 among a plurality of matching schemes that are distinguished depending on the status of the electronic device 100. At this time, the status of the electronic device 100, for example, may be determined based on at least one of: the type of application that requests the biometrics-based authentication in the electronic device 100; the direction in which the fingerprint recognition sensor 121 is positioned when the electronic device 100 is in a landscaped mode; the direction in which the finger input is received on the fingerprint recognition sensor 121 of the electronic device 100; the attachment or detachment of a stylus that is provide at a specific position of the electronic device 100; the type of user's hand that is gripping the electronic device 100; configuration information on the electronic device 100; or the like. Hereinafter, the execution of the variable dynamic matching according to the status of the electronic device 100 will be described as detailed embodiments later.

Figure 2:
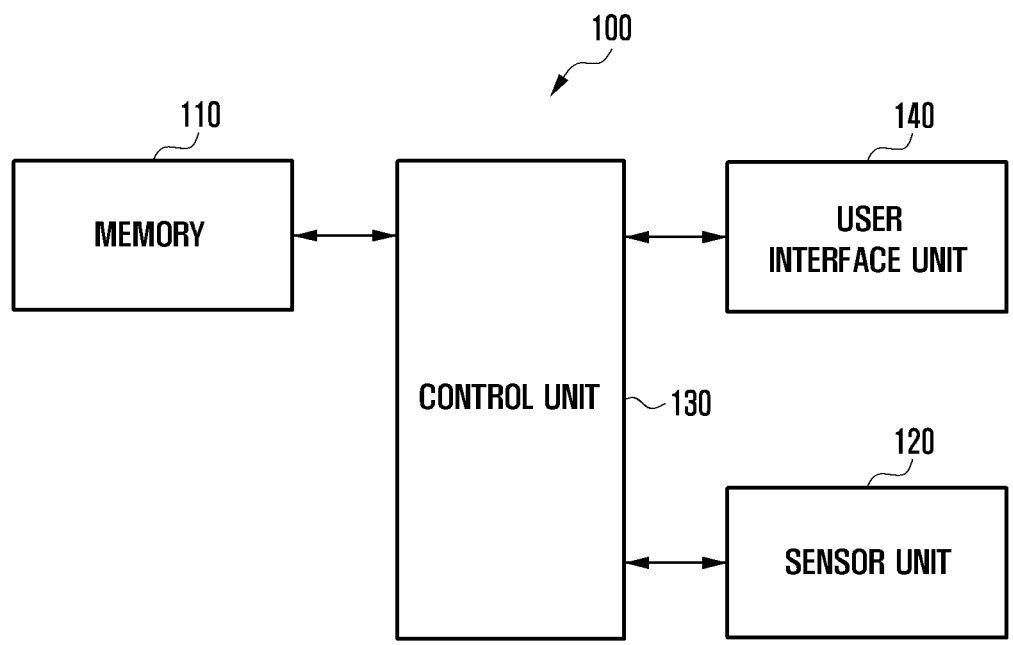
FIG. 2 is an exemplary diagram illustrating an electronic device, according to another embodiment of the present invention.

FIG. 2 is an exemplary diagram illustrating the electronic device 100, according to another embodiment of the present invention.

The electronic device 100 may include a memory 110, a sensor unit 120, a control unit 130, and a user interface unit 140.

The memory 110 may include a fingerprint registration DB, and the fingerprint registration DB may store the registered information on the authentication target. The registered information may include one or more fingerprint templates.

The user interface unit 140 may provide a user interface to configure the security level for an application that performs the biometrics-based authentication. For example, the application may include at least one of a screen lock application or a financial application.

The sensor unit 120 may sense the authentication target in order to thereby acquire the sensing data.

The control unit 130 may specify a threshold (or a match score threshold) according to the security level that has been configured through the user interface. The memory 110 may store a mapping table for the thresholds corresponding to one or more security levels, or a function showing the relationship between the security level and the threshold. The control unit 130 may specify the threshold corresponding to the configured security level by using the mapping table or function.

The control unit 130 may calculate the feature information based on the sensing data. In addition, the control unit 130 may correct the sensing data in order to thereby obtain the corrected sensing data. When the corrected sensing data is obtained, the control unit 130 may calculate the feature information based on the corrected sensing data.

If the match score, which indicates the degree to which the feature information and the registered information match, is equal to or more than a specified threshold, the control unit 130 may generate an authentication success event. For example, in the case where the feature information is obtained through the fingerprint recognition, the match score may be obtained by quantifying the number of feature points that match each other between the minutiae of the feature information and the minutiae of the registered information or the degree of matching for the matched feature points.

In addition, when the security level is configured to be high through the user interface, the control unit 130 may specify the first threshold that reduces a false acceptance rate (hereinafter, 'FAR') for the authentication target. When the security level is configured to be low through the user interface, the control unit 130 may specify the second threshold that reduces a false rejection rate (hereinafter, 'FRR') for the authentication target.

In addition, the control unit 130 may control to accumulate and store the match scores, which indicate the degree to which the feature information and the registered information match, and may control to update the registered information by using the feature information when the accumulated match score satisfies a predetermined criterion. The control unit 130 may control to accumulate and store authentication scores, which refer to the match scores that are equal to or more than a preset threshold. For example, the preset criterion may refer to the case where the accumulated authentication score for the authentication target is gradually lowered to be the same as, or close to, the preset threshold. In addition, the preset criterion may include the case where the correlation between the feature information and the previous feature information, which has recently been stored when the authentication was successful, is greater than a preset value. In addition, the control unit 130 may control to store the number of authentication successes and authentication failures, or the authentication success rate with respect to the authentication attempt. In addition, it may be understood by those skilled in the art that the preset criterion may be variously configured by the manufacturers or users of the electronic device 100, including the embodiments described above.

If the quality level of the feature information is higher than the quality of at least one fingerprint template included in the registered information, the control unit 130 may control to store the feature information as a new fingerprint template in order to thereby update the registered information.

In addition, if the authentication target relates to a child, the control unit 130 may control to periodically update the registered information by using the feature information. In the case of a child, the registered information may be periodically updated according to the child's growth so that the reliability of the registered information and the authentication success rate for the same user may be maintained above a specific level. In the case where the authentication target relates to an adult, if the number of updates by using the feature information exceeds the preset number of times, the control unit 130 may stop the addition of the fingerprint template included in the registered information on the authentication target in order to thereby limit the update of the registered information. In addition, it is obvious to those skilled in the art that the update period or the number of updates may be variously configured depending on the usage environment, the manufacturer, or the user. For example, the update period may be configured in consideration of the user's job or age.

In this case, a plurality of matching schemes, which are distinguished according to the status of the electronic device 100, may be distinguished by the growth condition of the user of the electronic device 100. For example, if the user is a child, one of a plurality of matching schemes may be a scheme to periodically update the registered information. On the contrary, if the user is an adult, one of a plurality of matching schemes may be a scheme to limit the update of the registered information.

An extend enrollment (hereinafter, 'EEM') scheme, in which the predetermined number of fingerprint templates may be added to be registered as the registered information included in the memory 110, may be operated. If the preset criterion is satisfied, the control unit 130 may control to update the registered information by using the feature information in the authentication mode as described above. In addition, if the preset criterion is satisfied, the control unit 130 may enter the registration mode to thereby control to provide a user interface for obtaining new sensing data, and may control to update the registered information by using new feature information that is obtained in the registration mode. The control unit 130 may increase the number of existing fingerprint templates that are included in the registered information by adding new fingerprint templates to the registered information. In addition, the control unit 130 may replace one or more existing fingerprint templates included in the registered information by the new fingerprint templates in order to thereby update the registered information.

Figure 3:
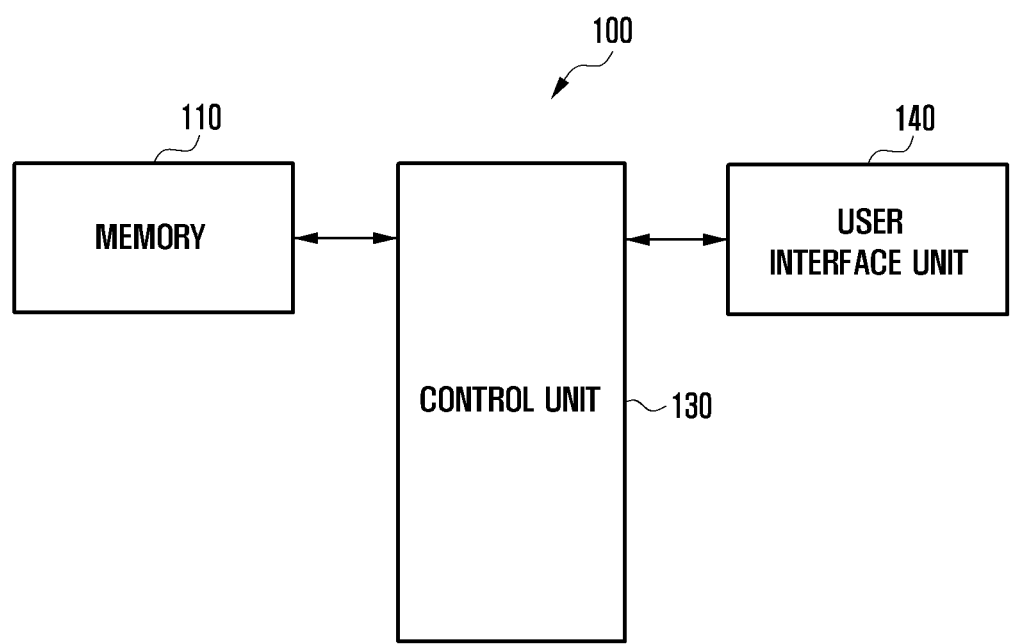
FIG. 3 is an exemplary diagram illustrating an electronic device, according to another embodiment of the present invention.

FIG. 3 is an exemplary diagram illustrating the electronic device 100, according to another embodiment of the present invention.

The electronic device 100 may include a memory 110, a control unit 130, and a user interface unit 140.

The memory 110 may store the registered information on the authentication target.

The user interface unit 140 may provide a user interface to configure the security level for an application that performs the biometrics-based authentication.

If the quality level of the first biometric information acquired from the authentication target is equal to or more than the first preset quality level, the control unit 130 may control to record at least some of the first biometric information as the registered information.

The control unit 130 may configure a threshold according to the security level that is configured through the user interface.

If the quality level of the second biometric information obtained from the authentication target is equal to or more than the second preset quality level and the match score, which indicates the degree to which the second biometric information and the registered information match, is equal to or more than a preset threshold, the control unit 130 may generate an authentication success event.

The first preset quality level may be intended to evaluate the quality level of the first biometric information in the registration mode, and the second preset quality level may be intended to evaluate the quality level of the second biometric information in the authentication mode. The first preset quality level and the second preset quality level may be different from each other. For example, when the first preset quality level is greater than the second preset quality level, the reliability of the quality of the biometric information, which is stored as the registered information, may be secured, and the authentication success rate may be increased in the authentication, compared to the registration, in order to thereby improve the usability.

It should be noted that the electronic device 100, according to the embodiment of the present invention described through FIG. 1 to FIG. 3, may be reconfigured by combining at least some of the elements illustrated in FIG. 1 to FIG. 3, or by modifying or omitting at least some of the illustrated elements.

Hereinafter, the electronic device 100, according to an embodiment of the present invention, will be described in more detail with reference to FIG. 4. In addition, the description will be made of the case where the authentication target is the user's fingerprint in order to assist with the understanding of the invention. The description of the elements that are described in FIG. 1 to FIG. 3 above will be omitted.

Figure 4:
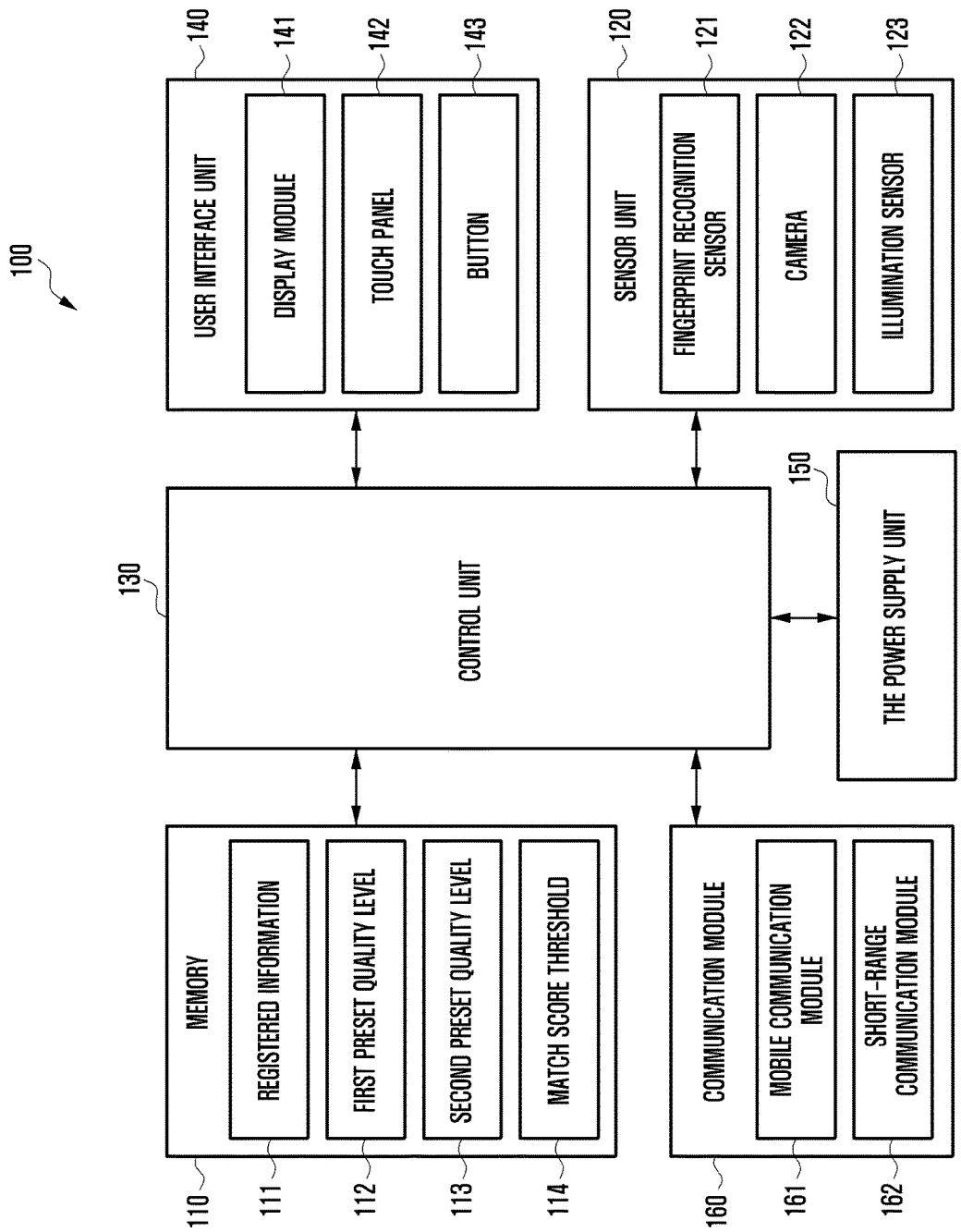
FIG. 4 is an exemplary diagram illustrating an electronic device in more detail, according to an embodiment of the present invention.

FIG. 4 is an exemplary diagram illustrating the electronic device 100 in more detail, according to an embodiment of the present invention.

The electronic device 100 may include the memory 110, the sensor unit 120, and the control unit 130. In addition, the electronic device 100 may further include a user interface unit 140.

In addition, the electronic device 100 may exclude the sensor unit 120. In the case of excluding the sensor unit 120, the electronic device 100 may receive the sensing data transmitted from sensors outside the electronic device 100 or from separate devices in order to thereby obtain the sensing data.

In addition, the electronic device 100 may further include a power supply unit 150 or a communication unit 160.

The memory 110 may store registered information 111, the first preset quality level 112, the second preset quality level 113, or a match score threshold (hereinafter, 'threshold') 114.

The registered information 111 may include one or more fingerprint templates.

The first preset quality level 112 may include at least one of the quality level of the preset registration sensing data or the quality level of the preset registration feature information, in the registration mode.

The second preset quality level 113 may include at least one of the quality level of the preset authentication sensing data or the quality level of the preset authentication feature information, in the authentication mode.

The threshold 114 may be a reference value for evaluating the degree to which the feature information and the registered information match, and may be pre-configured by the manufacturer of the electronic device 100 or the application or software provider, which is executed in the electronic device 100. In addition, the threshold 114 may be specified according to the security level that is configured through the user interface for configuring the security level of the application that performs the biometrics-based authentication.

In addition, the memory 110, under the control of the control unit 130, may store signals or data that are input/output to correspond to the operation of the sensor unit 120, the user interface unit 140, or the communication unit 160. In addition, the memory 110 may store control programs and applications for controlling the overall operation of the electronic device 100 or the control unit 130.

In addition, the memory 110 may include a ROM or RAM in the control unit 130, or memory cards (e.g., SD cards, memory sticks, etc.) that are inserted into the electronic device 100. The memory 110 may include a non-volatile memory, a volatile memory, a hard disk drive (HDD), or a solid state drive (SSD).

In addition, the memory 110 may store applications that perform the biometrics-based authentication, applications for various functions, such as navigation or games, images for providing graphical user interfaces (GUI) related to the applications, user information, documents, databases or data related to the process of touch inputs, background images (a menu screen, a standby screen, etc.) required to drive the electronic device 100, operating programs, or the data obtained by the sensor unit 120.

In addition, the memory 110 may include a device (e.g., computers) readable medium. The memory 110 may access information in the device-readable medium under the control of the control unit 130, and may store the accessed information. The device-readable medium may be a medium that provides data to the device to perform a specific function. For example, a device-readable medium may be a recording-medium. The device-readable medium may include at least one of a floppy disk, a flexible disk, a hard disk, a magnetic tape, a CD-ROM (compact disc read-only memory), an optical disk, a punch card, a paper tape, a RAM, a PROM (Programmable Read-Only Memory), an EPROM (Erasable PROM), or a flash-EPROM, but it is not limited thereto.

The sensor unit 120 may sense the authentication target in order to thereby acquire the sensing data. The sensor unit 120 may include a fingerprint recognition sensor 121, a camera 122, or an illumination sensor 123. The biometric sensor may be a fingerprint recognition sensor 121, a retina recognition sensor, an iris recognition sensor, an optical sensor, a pressure-sensitive sensor, or a motion sensor, and the present embodiment will describe the fingerprint recognition sensor 121 in detail.

The fingerprint recognition sensor 121 may be an input image device that obtains fingerprint images (or image information on the fingerprints) that represent unique characteristic difference between users. The sensing data on the fingerprint image may be obtained through an optical type, a semiconductor type, an ultrasonic type, or non-contact type.

For example, the optical fingerprint recognition sensor 121 may include a prism, a light source, a lens, or a CCD (Charge-Coupled Device). In the optical sensor, when the finger comes into contact with the prism, a light source emits light on the prism, and the lens collects the light reflected on the prism so that the CCD may obtain a fingerprint image from the collected light.

The semiconductor-based fingerprint recognition sensor 121 may include a thermal sensor, a capacitive sensor, or an electric sensor. The semiconductor-based fingerprint recognition sensor 121 may be compact to be used in personal application devices. The thermal sensor may be a kind of fingerprint recognition sensor 121 that obtains the fingerprint image based on the temperature distribution due to the temperature difference between the contact portion and the non-contact portion of the finger. The capacitive sensor may be a kind of fingerprint recognition sensor 121 that obtains the fingerprint image from the difference in the amount of charge or the capacitance between the ridges of the contact fingerprint. The electrical sensor may be a kind of fingerprint recognition sensor 121 that obtains the fingerprint image from the electric field that is formed on or around the contact fingerprint.

In addition, the fingerprint recognition sensor 121 may be a functional module that is comprised of hardware or software modules and controls to load a software module for the fingerprint recognition of the memory 110 into the task of the control unit 130 and to operate the fingerprint recognition sensor 121 included in the sensor unit 120. The fingerprint recognition sensor 121 as the functional module may be comprised of software modules for the fingerprint recognition, at least a portion of the control unit 130, or the fingerprint recognition sensor 121. In addition, the fingerprint recognition sensor 121 as the functional module may perform an operation of correcting the sensing data and an operation of calculating the feature information based on the sensing data, as well as the operation of obtaining the sensing data.

In addition, the fingerprint recognition sensor 121 may be activated by automatically sensing a finger touch of the user, or by the input through specific function keys. In addition, the fingerprint recognition sensor 121 may be provided inside the electronic device 100, or may be connected through a separate wired or wireless communication.

The camera 122 may photograph the periphery of the electronic device 100 or the user. The camera 122 may include a lens system and an image sensor to take still images or moving images according to the control of the control unit 130. In addition, a plurality of cameras may be disposed on the front side and back side of the electronic device 100. The camera 122 may convert an optical signal input through the lens system into an electrical image signal to then be transmitted to the control unit 130 or the display module 141 of the user interface unit 140.

The illumination sensor 123 may detect the intensity of light around the electronic device 100.

In addition, the sensor unit 120 may further include a motion sensor (not shown) that detects the operation (for example, the rotation of the electronic device 100, or acceleration or vibration applied to the electronic device 100) of the electronic device 100. The motion sensor may include a gyro sensor or an acceleration sensor.

In addition, the sensor unit 120 may further include various sensors, such as a proximity sensor that detects the proximity of the user with respect to the electronic device 100, a geo-magnetic sensor that detects the point of the compass by using a geomagnetic field, or a GPS module. The GPS module may receive radio waves from a plurality of GPS satellites (not shown) on the earth's orbit in order to thereby calculate the location of the electronic device 100 by using the time of arrival of the radio waves from the GPS satellites to the electronic device 100.

The user interface unit 140 may include a display module 141, a touch panel 142, or a button 143.

The user interface unit 140 may provide a user interface to configure the security level for an application that performs the biometrics-based authentication.

In addition, the user interface unit 140 may provide information on the position of the fingerprint recognition sensor 121 of the electronic device 100 for the fingerprint recognition or information on the user's gesture with respect to the fingerprint recognition sensor 121.

In addition, if the quality level of the biometric information is lower than the first preset quality level 112 in the registration mode, the user interface unit 140 may provide a user interface for at least one of the feedback on the registration failure or the acquisition of new sensing data.

In addition, if the quality level of the biometric information is lower than the second preset quality level 113 in the authentication mode, the user interface unit 140 may provide a user interface for at least one of the feedback on the authentication failure or the acquisition of new sensing data.

The display module 141 may include at least one of a liquid crystal display (LCD), a thin film transistor-liquid crystal display, an organic light-emitting diode, a flexible display, a 3D display, an electrophoretic display, or the like.

The touch panel 142 may be implemented in a resistive type, a capacitive type, an electromagnetic induction type, an EMR (Electronic Magnetic Resonance) type, an infrared type, or an acoustic wave type.

The display module 141 and the touch panel 142 may be combined to operate as a touch screen. At this time, the user interface unit 140 may further include a touch screen controller. The touch screen may receive one or more touches by a part of the user's body (e.g., fingers including the thumb) or a touchable input unit. In addition, the touch screen may include a pen recognition panel that recognizes an input by using pens, such as a stylus or an electronic pen. In addition, the touch screen panel may be formed by stacking a panel that detects an input of the finger or the input unit by using a change in the induced electromotive force, a display panel, and a panel that detects an input of the finger or the input unit through a change in the resistance or the capacitance, such that they come into contact with each other or they are spaced apart from each other. The touch screen controller may convert an analog signal received by the touch screen into a digital signal (for example, X and Y coordinates) to then be transmitted to the control unit 130. The control unit 130 may control the touch screen by using the digital signal received from the touch screen controller. In addition, the touch screen controller may be included in the control unit 130.

The button 143 may receive a button (or key) input from the user for the control of the electronic device 100. The button 143 may include a physical button (or keys) that is formed on the electronic device 100, or a virtual button or a virtual keypad, which is displayed on the touch screen. The physical keypad formed in the electronic device 100 may be excluded depending on the structure of the electronic device 100.

The power supply unit 150 may include one or more batteries (not shown) that are installed in the housing of the electronic device 100 according to the control of the control unit 130, a power supply circuit, or battery charging circuit. The power supply unit 150 may supply power to the electronic device 100. In addition, the power supply unit 150 may supply the power, which is supplied from an external power source (not shown) through a wire cable connected to the connector, to the configuration modules or the battery of the electronic device 100. In addition, the power supply unit 150 may control to supply the power, which is wirelessly supplied from an external power source through a wireless charging technology, to the configuration modules, or may control to charge the battery.

The communication unit 160 may include a mobile communication module 161 or a short-range communication module 162.

The mobile communication module 161 may include communication modules based on the standards, such as TDM, TDMA, FDM, FDMA, CDM, CDMA, OFDM, OFDMA, MIMO, GSM using techniques, such as smart antennas, WCDMA, HSDPA, LTE, or WiMAX.

The short-range communication module 162 may include communication modules of short-range communication methods, such as WiFi, Bluetooth, Zigbee, infrared data association (IrDA), RF-ID, or NFC (Near Field Communication). The Bluetooth communication module may operate based on a Bluetooth Low Energy communication method or a Bluetooth Classic communication method. The Wi-Fi communication module may operate as an access point, or may be connected to the access point to form a short-distance wireless LAN, based on the IEEE 802.11 communication standard.

In addition, the communication unit 160 may include various communication modules, such as a sound wave communication module (not shown) or a visible light communication module, but the communication unit 160 is not limited to the above-described communication modules.

The control unit 130 may calculate the feature information based on the sensing data. In addition, the control unit 130 may correct the sensing data in order to thereby obtain the corrected sensing data. When the corrected sensing data is obtained, the control unit 130 may calculate the feature information based on the corrected sensing data.

In addition, if the quality level of the biometric information is equal to or more than the first preset quality level 112 in the registration mode, the control unit 130 may control to record the feature information, as the registered information 111 on the authentication target, in the memory 110. If the quality level of the biometric information is equal to or more than the second preset quality level 113 in the authentication mode, the control unit 130 may identify whether or not the feature information matches the registered information 111.

In addition, the control unit 130 may specify the threshold (or the match score threshold 114) according to the security level that is configured through the user interface. If the match score, which indicates the degree to which the feature information and the registered information 111 match, is equal to or more than a specified threshold 114, the control unit 130 may generate an authentication success event.

In addition, the control unit 130 may control to accumulate and store the match score that indicates the degree to which the feature information and the registered information 111 match, and may control to update the registered information 111 by using the feature information when the accumulated match score satisfies a predetermined criterion.

The control unit 130 may include a CPU (Central Processing Unit), a ROM that stores control programs for the control of the electronic device 100, and a RAM that memorizes signals or data received from the outside of the electronic device 100 or is used as a storage area for the operation performed in the electronic device 100. The CPU may include a multi-core, such as dual-core, a quad-core, or an octa-core, as well as a single-core. The CPU, the ROM, and the RAM may be interconnected via an internal bus (Bus), or may be implemented as a chip or module.

The biometrics-based authentication in the electronic device 100 including the control unit 130 will be described in more detail with reference to FIG. 5 to FIG. 14, and FIG. 15A to FIG. 15D. For example, the description will be made of the case where the authentication target is the user's fingerprint.

Figure 5:
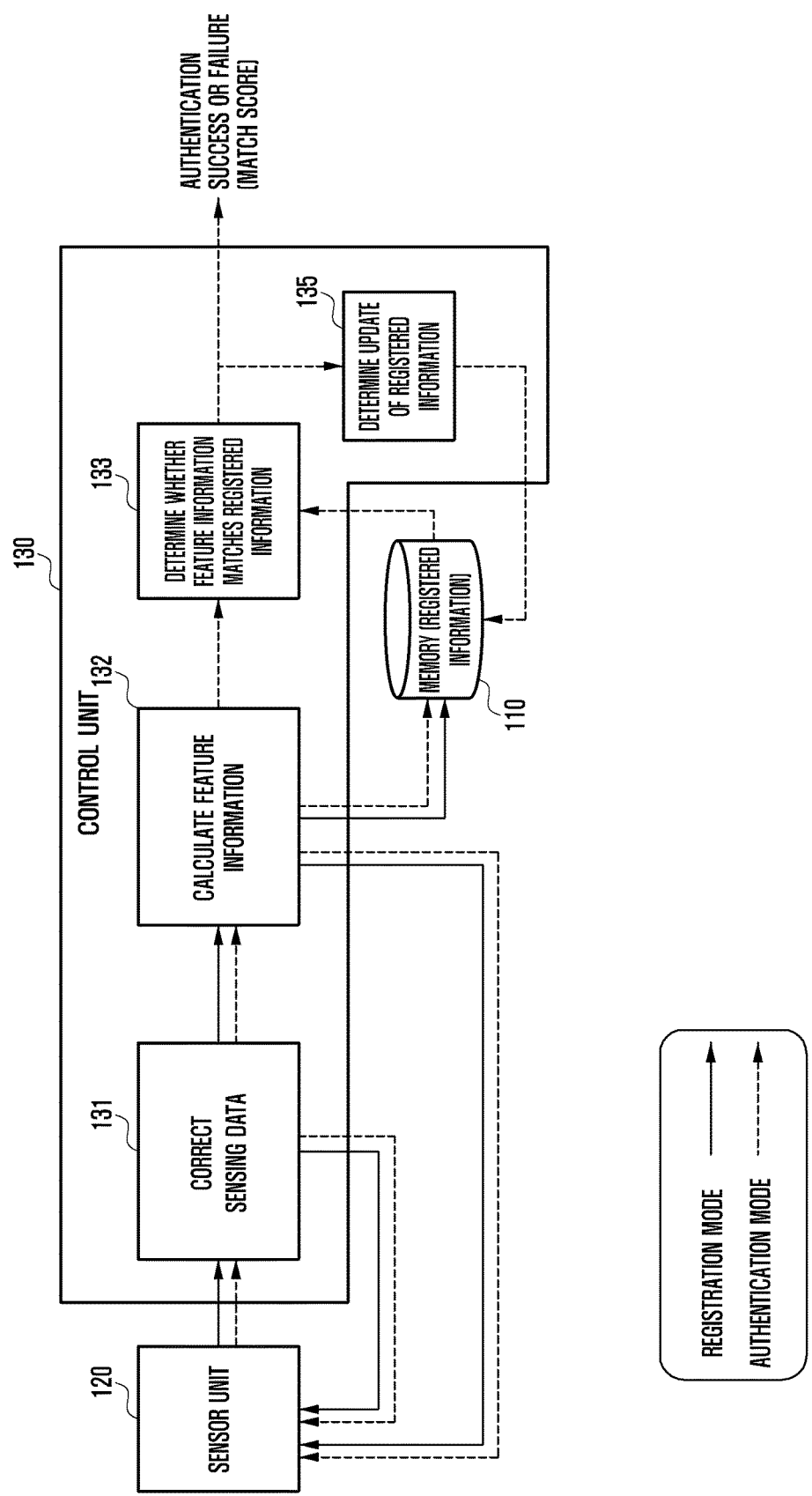
FIG. 5 is an exemplary diagram for explaining a control unit of the electronic device in detail, according to an embodiment of the present invention.

The functional modules 131, 132, 133, and 135 included in the control unit 130 are configured for the convenience of explanation in FIG. 5, and at least some of the functional modules 131, 132, 133, and 135 may be omitted, modified, or combined in order to thereby provide various forms. The functional modules 131, 132, 133, and 135 may be implemented by hardware, software, or a combination thereof.

In FIG. 5, the sensor unit 120 may obtain the sensing data from the authentication target in the registration mode or authentication mode.

Figure 6:
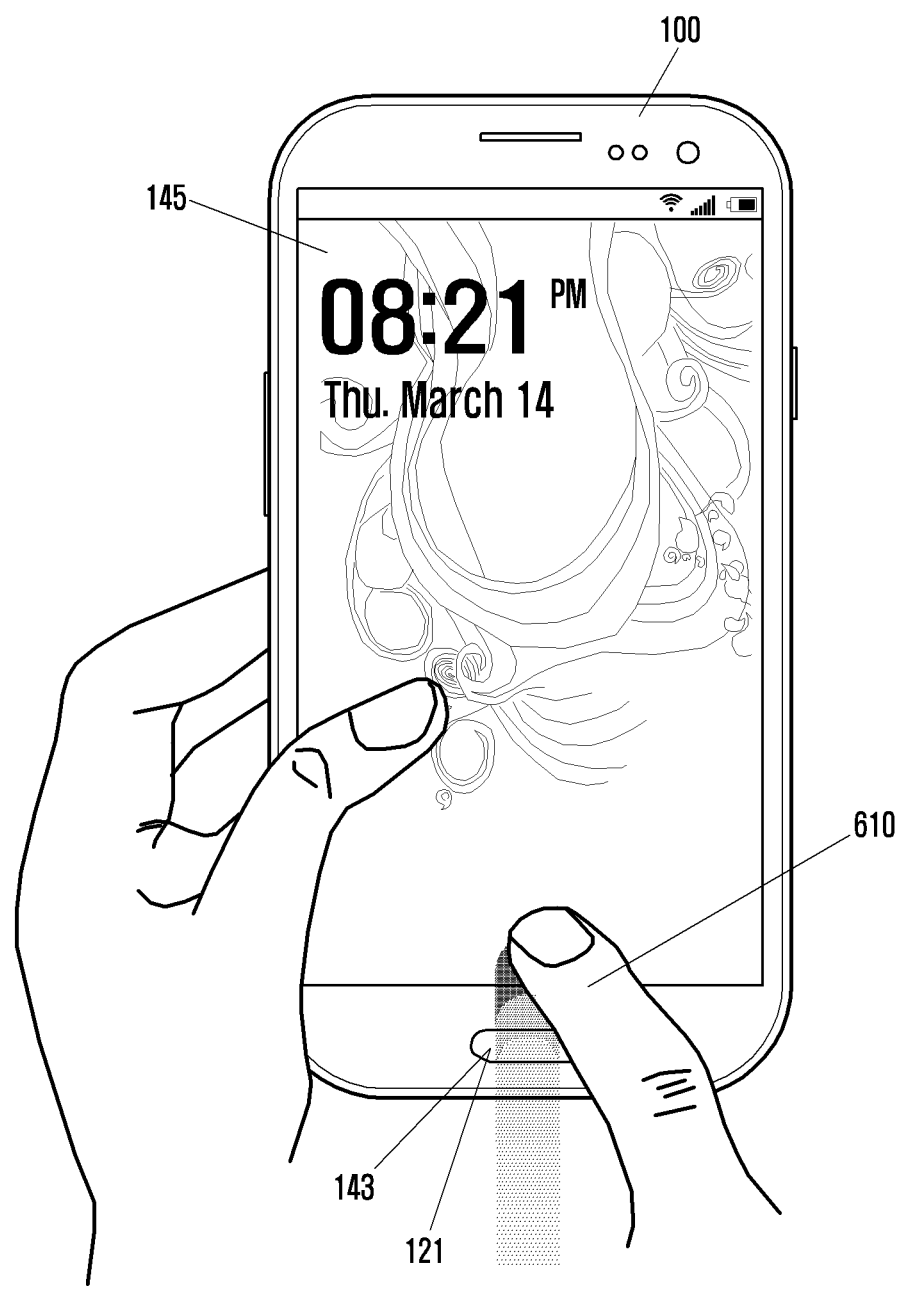
FIG. 6 is an exemplary view illustrating the structure of an electronic device for sensing the authentication target, according to an embodiment of the present invention.

For example, the electronic device 100 of FIG. 6 may include the fingerprint recognition sensor 121 for recognizing the fingerprint 610. The fingerprint recognition sensor 121 may be mounted on at least one side of the housing of the electronic device 100. In addition, the fingerprint recognition sensor 121 may be combined with the button 143 of the electronic device 100. For example, in the case where the electronic device 100 is a portable electronic device 100, such as a smart phone or a tablet PC, the fingerprint recognition sensor 121 may be physically coupled to the button 143, such as a Home button, such that one side of the fingerprint recognition sensor 121 is exposed on the button 143 in order to thereby come into contact with the fingerprint 610.

The display screen 145 of the electronic device 100 may display the user interface for the fingerprint recognition in the registration mode or authentication mode. For example, the user interface may provide information on the position of the fingerprint recognition sensor 121 of the electronic device 100 or information on the user's gesture for the fingerprint recognition sensor 121. The user's gesture may be a touch-and-hold gesture, or a swipe gesture.

In addition, the electronic device 100 may execute a screen lock application as the application performing the biometrics-based authentication so that the display screen 145 of the electronic device 100 may display a lock image in a screen lock mode. If the user's fingerprint recognition-based authentication is successful, the screen lock state of the electronic device 100 may be released.

Figure 7A:
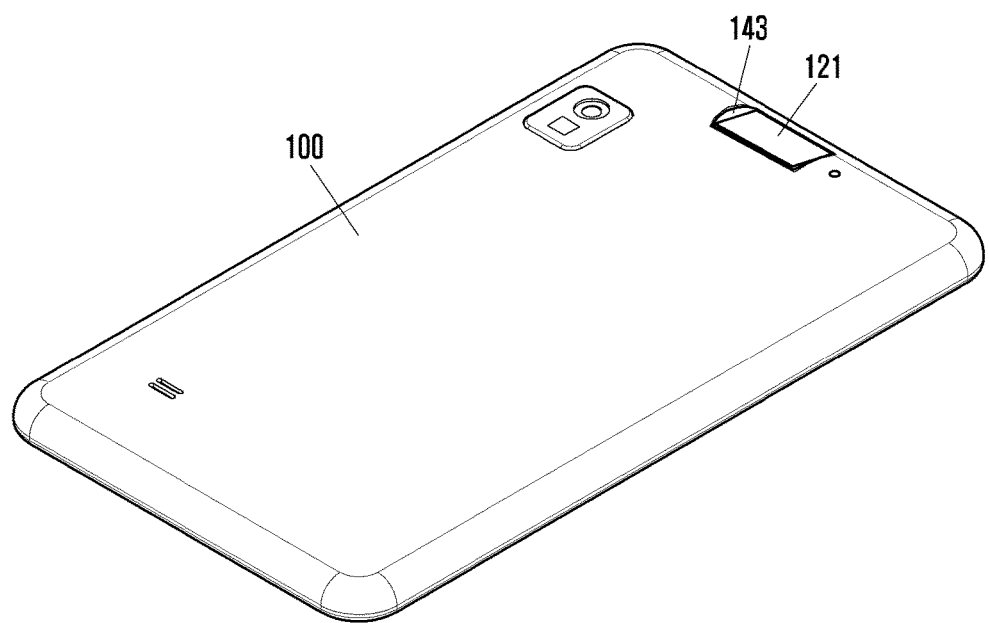
FIG. 7A is another exemplary view illustrating the structure of an electronic device for sensing the authentication target, according to an embodiment of the present invention.
Figure 7B:
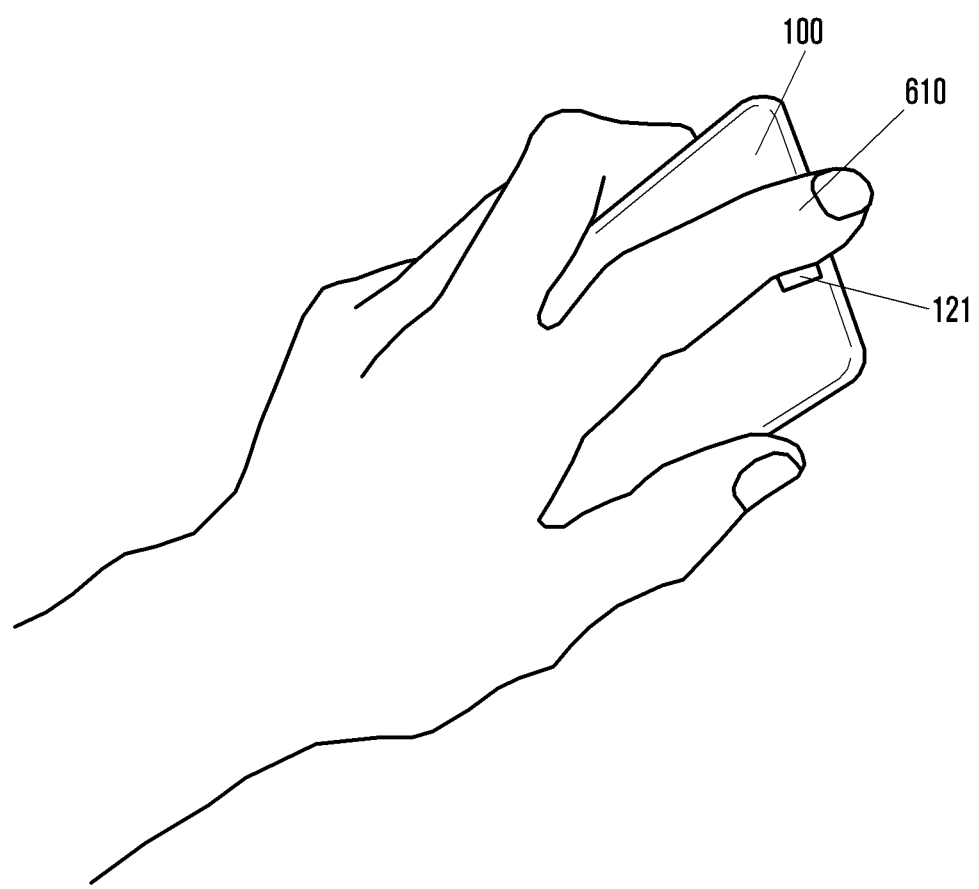
FIG. 7B is an exemplary view showing that the authentication target is sensed through the electronic device shown in FIG. 7A, according to an embodiment of the present invention.

In addition, in the electronic device 100 illustrated in FIG. 7A, the fingerprint recognition sensor 121 is positioned around the boundary between the back side and the top side of the electronic device 100. The fingerprint recognition sensor 121 may be mounted regardless of the position of the button 143, or may be mounted to be adjacent to the button 143 in consideration of usage behavior for the button 143 and the fingerprint recognition sensor 121 and convenience thereof. FIG. 7B shows the user's gesture for detecting the fingerprint 610 on the fingerprint recognition sensor 121 of the electronic device 100 of FIG. 7A.

The fingerprint recognition sensor 121 may sense the fingerprint 610 of the user to thereby acquire a fingerprint image from the sensing data.

In FIG. 5, the functional module 131 of the control unit 130 may receive the sensing data from the sensor unit 120. The functional module 131 may correct the sensing data in order to thereby obtain the corrected sensing data. For example, if it is determined that the fingerprint image is distorted or the resolution of the image is low, the functional module 131 may process the image such that the distorted image or the low-resolution image is to be corrected (or restored) in an available correction range by using statistical data or image processing functions.

In addition, the operation of correcting the sensing data to obtain the corrected sensing data in the functional module 131 may be omitted. In this case, the quality level of the sensing data may be evaluated based on the sensing data obtained by the sensor unit 120.

The functional module 131 may evaluate the quality level of the (corrected) sensing data based on the first preset quality level 112 or the second preset quality level 113.

The (corrected) sensing data, of which the quality level is evaluated by the functional module 131 and the functional module 132, or which is used for the calculation of the feature information, may include at least one piece of the sensing data that is obtained from the sensor unit 120 or the corrected sensing data that is obtained by correcting the sensing data received from the sensor unit 120 by using the functional module 131. In addition, for the convenience of explanation, the (corrected) sensing data may be referred to as the sensing data.

Figure 8:
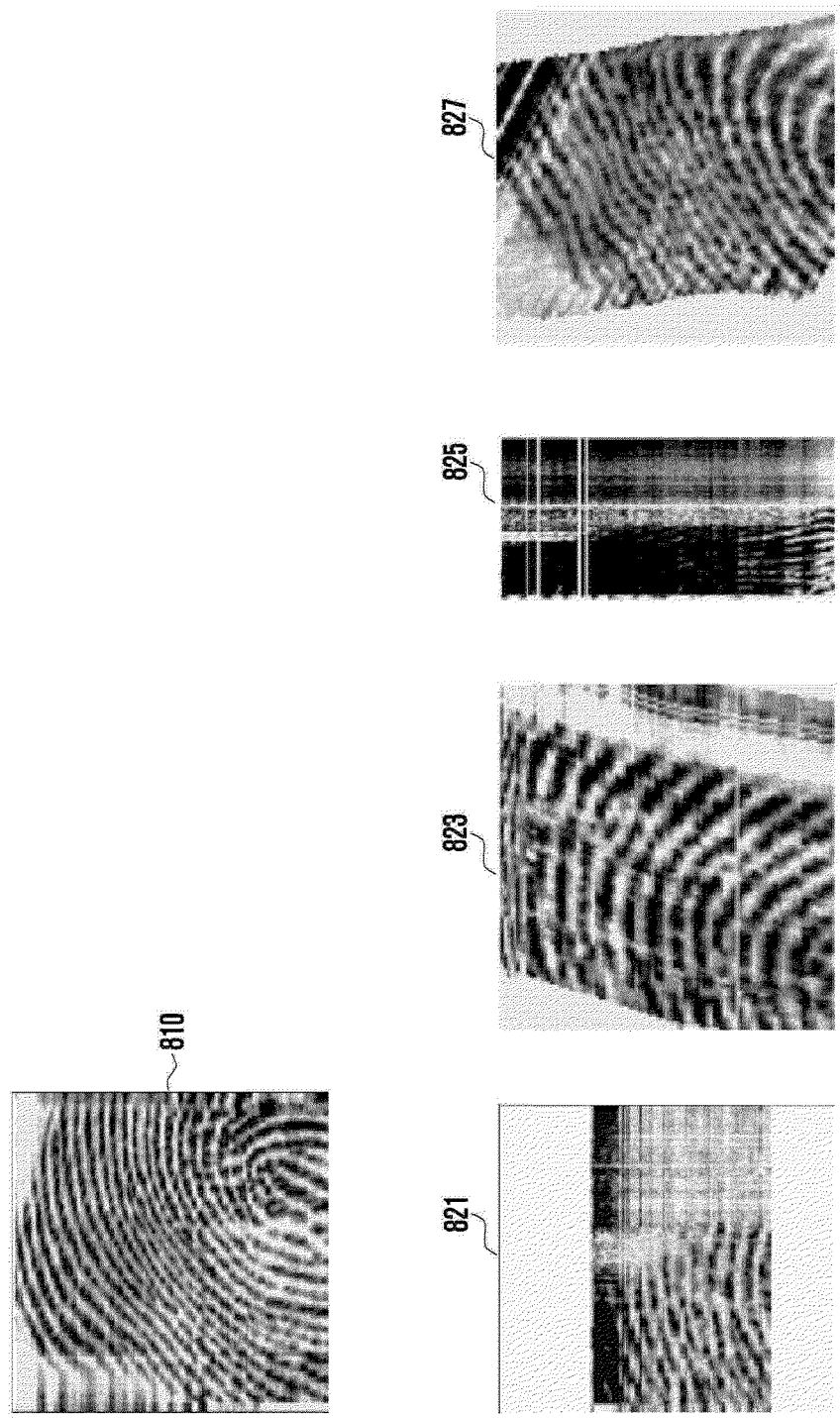
FIG. 8 is an exemplary view to explain a criterion for evaluating the quality of sensing data, according to an embodiment of the present invention.

For example, the quality level of the (corrected) sensing data may be calculated based on at least one of the size of an area, the degree of distortion, an offset, or a rotation angle of the image {e.g., the (corrected) fingerprint image} that is obtained from the authentication target. Referring to FIG. 8, the fingerprint image 810 has a good quality, and the fingerprint images 821, 823, 825, and 827 have low qualities. In the case where the fingerprint recognition sensor 121 senses the fingerprint 610 by using a swipe gesture: the fingerprint image 821 shows a small size of the image area; the fingerprint image 823 shows a distorted image due to a fast swipe gesture; the fingerprint image 825 shows an image that is sensed when the fingerprint 610 lightly or softly presses on the fingerprint recognition sensor 121; and the fingerprint image 827 shows an image that is obtained through a strong contact between the fingerprint 610 and the fingerprint recognition sensor 121. For example, it is possible to give a high weight to the size of the image area, which is a major factor that influences the number of feature points in the minutiae obtained from the fingerprint image, and to give a low weight to the offset or the rotation angle to then summate evaluation scores for the factors so that the quality level of the fingerprint image may be obtained.

If the quality level of the (corrected) sensing data is less than the quality level of the preset registration sensing data that belongs to the first preset quality level 112 in the registration mode, the functional module 131 may control to provide a user interface for requesting the acquisition of new sensing data.

In addition, if the quality level of the (corrected) sensing data is less than the quality level of the preset authentication sensing data that belongs to the second preset quality level 113 in the authentication mode, the functional module 131 may control to provide a user interface for requesting the acquisition of new sensing data or requesting re-authentication.

In the electronic device 100, the quality level of the preset authentication sensing data may be configured to be lower than the quality level of the preset registration sensing data. If the quality level of specific sensing data is equal to or more than the quality level of the preset authentication sensing data and, is less than the quality level of the preset registration sensing data, the functional module 131, with respect to the specific sensing data, may control to provide a user interface for requesting the acquisition of new sensing data in the registration mode, and may control to use the (corrected) sensing data in the functional module 132 without re-authentication in the authentication mode.

If the quality level of the (corrected) sensing data is equal to or more than the quality level of the preset registration sensing data in the registration mode, or is equal to or more than the quality level of the preset authentication sensing data in the authentication mode, the functional module 132 may calculate the feature information based on the (corrected) sensing data.

Figure 9:
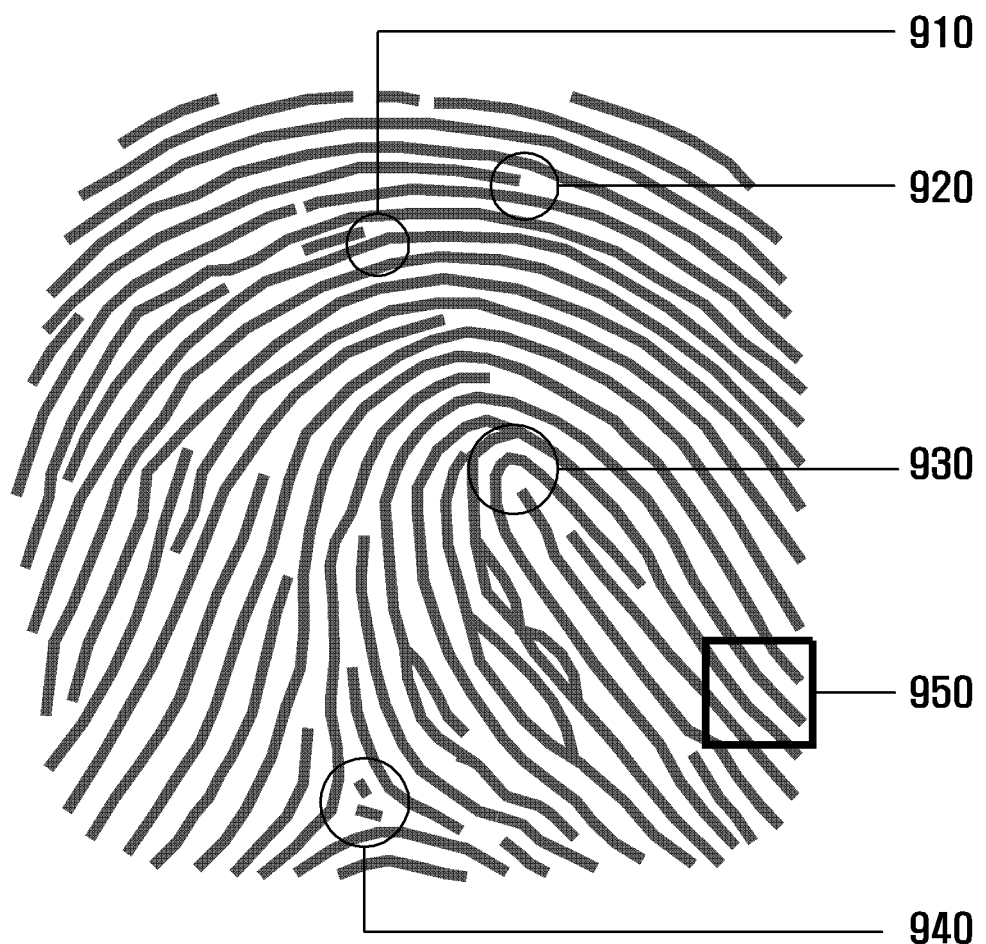
FIG. 9 is an exemplary diagram for explaining feature information, according to an embodiment of the present invention.

For example, the feature information in the fingerprint image shown in FIG. 9 may be minutiae representing one or more feature points. The minutiae may include feature points that indicate a bifurcation point 910, an end point 920, a core 930, or a delta 940. In addition, the minutiae may include feature points that represent the shape and direction of the valley 950 between ridges.

The feature information may be calculated in a preset format (or frame) in the functional module 133, which will be described later, in order to identify the degree to which the feature information and the registered information 111 match. The feature information in the preset format may be fingerprint templates.

The functional module 132 may evaluate the quality level of the feature information based on the first preset quality level 112 or the second preset quality level 113.

For example, the quality level of the feature information may be calculated based on at least one of the existence of at least one of the bifurcation point 910, the end point 920, the core 930, or the delta 940 in the minutiae, or the number of feature points.

In addition, if the quality level of the feature information is lower than the quality level of the preset registration feature information that belongs to the first preset quality level 112 in the registration mode, the functional module 132 may control to provide a user interface for requesting the acquisition of new sensing data.

In addition, if the quality level of the feature information is lower than the quality level of the preset authentication feature information that belongs to the second preset quality level 113 in the authentication mode, the functional module 132 may control to provide a user interface for requesting the acquisition of new sensing data or requesting re-authentication.

In the electronic device 100, the quality level of the preset authentication feature information may be configured to be lower than the quality level of the preset registration feature information.

If the quality level of the feature information is equal to or more than the quality level of the preset registration feature information in the registration mode, the functional module 132 may control to record the feature information, as the registered information 111 on the authentication target, in the memory 110.

In addition, if the quality level of the feature information is equal to or more than the quality level of the preset authentication feature information in the authentication mode, the functional module 132 may control the functional module 133 to process the feature information.

If the quality level of the feature information is equal to or more than the quality level of the preset authentication feature information, the functional module 133 may determine whether or not the feature information matches the registered information 111.

Figure 10:
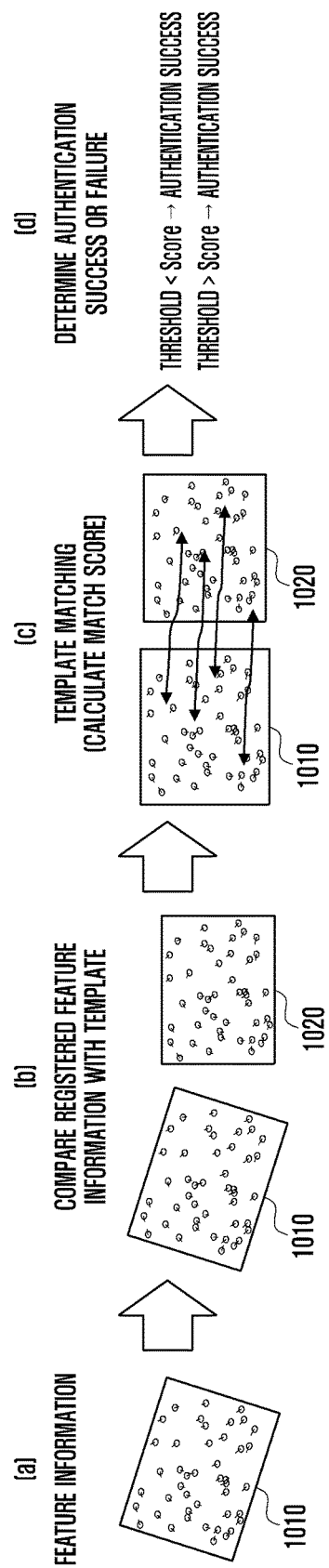
FIG. 10 is a conceptual diagram for explaining an operation in which it is identified whether or not feature information matches registered information in order to thereby determine the authentication success or failure, according to an embodiment of the present invention.

For example, referring to FIG. 10, the feature information (a) calculated from the fingerprint image may include the minutiae. The minutiae may be given by a fingerprint template 1010 that has information in a preset format, and the illustrated fingerprint template 1010 may be a conceptual and schematic view showing the information on the feature points.

The functional module 133 may compare (b) the feature information (a) (or the fingerprint template 1010) that is calculated in the functional module 132 with one or more registered fingerprint templates 1020. The one or more registered fingerprint templates 1020 may be contained in the registered information 111, or may be stored as the registered information 111.

The functional module 133 may perform a matching operation (c) of the fingerprint template 1010 and the one or more registered fingerprint templates 1020 in order to thereby output a match score. The match score may denote the degree to which the feature information and the registered information match. For example, the match score may be calculated based on the number of feature points that correspond to each other (or match each other) among the feature points of the fingerprint template 1010 and the one or more registered fingerprint templates 1020, or a value showing the degree of matching of the feature points. For example, the degree of matching may be a value calculated according to statistical data or probabilistic functions in consideration of the distance between a reference point and the feature points that are considered to match, the direction, or the similarity of arrangement of the feature points.

The functional module 133 may compare the calculated match score with the threshold (or the match score threshold) 114 in order to thereby determine (d) the success or failure of the authentication. For example, if the match score is equal to or more than the threshold 114, the functional module 133 may generate an authentication success event. For an example of the authentication success event, the screen lock state of the electronic device 100 in FIG. 6 may be released.

The threshold 114 may be previously set by the manufacturer of the electronic device 100, or the provider of applications or an operating system installed in the electronic device 100. In addition, the threshold 114 may be specified according to the security level configured through the user interface.

An example of the user interface for configuring the security level will be described with reference to FIG. 15A, FIG. 15B, FIG. 15C, and FIG. 15D.

In this case, a plurality of matching schemes, which are distinguished according to the status of the electronic device 100, may have different security levels from each other. In particular, the plurality of matching schemes may have different security levels according to the type of application that requests the biometrics-based authentication. For example, if the application requesting the biometrics-based authentication is a screen lock application, one of the plurality of matching schemes may be a scheme of a security level corresponding to the screen lock application, which is applied to the matching operation of the registered information and the feature information. On the contrary, if the application requesting the biometrics-based authentication is a financial application, one of the plurality of matching schemes may be a scheme of a security level corresponding to the financial application, which is applied to the matching operation of the registered information and the feature information. At this time, the security level corresponding to the screen lock application may be different from the security level corresponding to the financial application.

In addition, the control unit 130 may provide a user interface through which the security level is differently configured depending on the state of the electronic device 100 that performs the biometrics-based authentication. For example, the control unit may provide an interaction object that shows the security level for at least one state of the electronic device, and may change the security level for at least one state of the electronic device 100 to be a low security level or a high security level according to the user input through the interaction object.

In addition, the user interface unit 140 may provide a user interface to configure the security levels for a plurality of applications that perform the biometrics-based authentication. In this case, the control unit 130 may configure the security level for one of the plurality of applications according to a user input through the user interface. In addition, when the biometrics-based authentication is executed in relation to the one application, the control unit may calculate the feature information from the sensing data obtained by detecting the authentication target, and may perform the matching operation of the feature information and the pre-stored registered information.

Figure 15A:
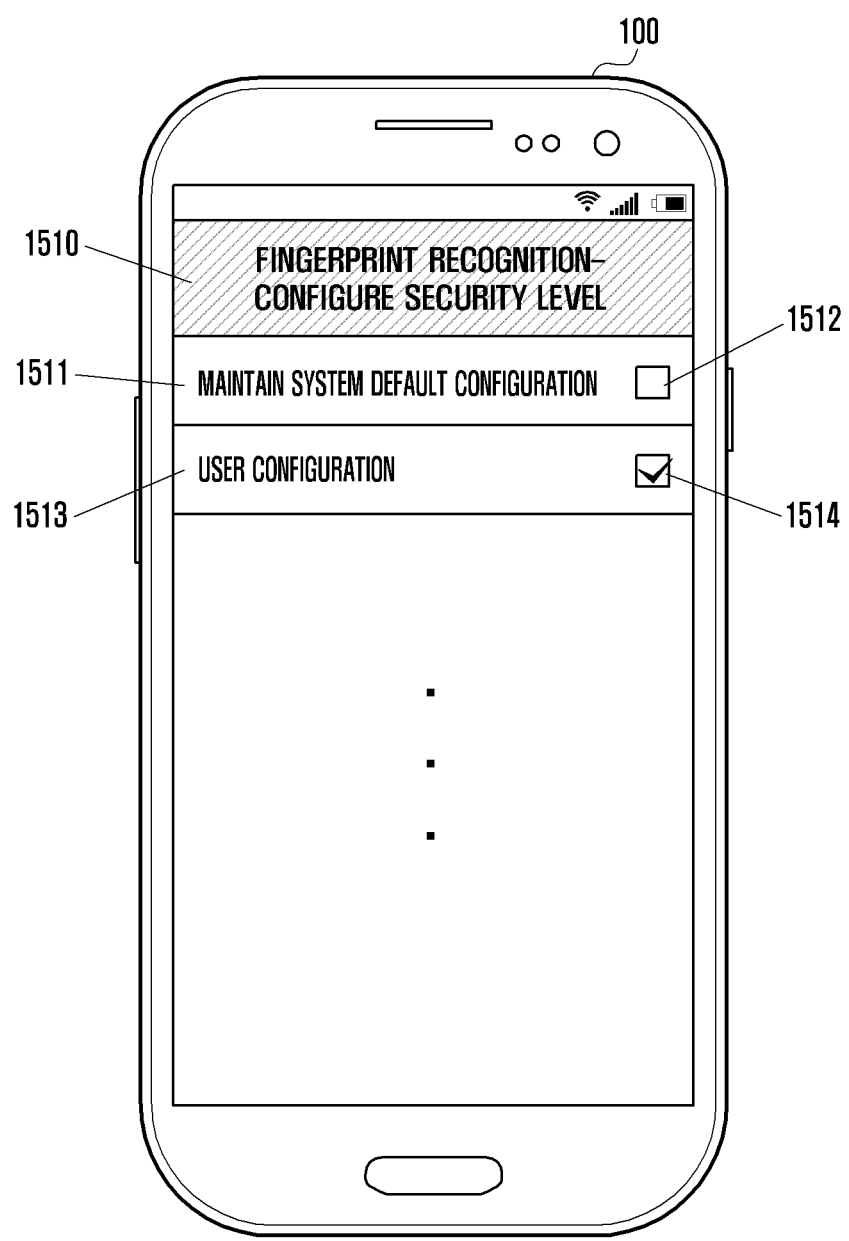
FIG. 15A, FIG. 15B, FIG. 15C, and FIG. 15D are exemplary views showing a user interface for configuring the security level, according to an embodiment of the present invention.

Referring to FIG. 15A, when the electronic device 100 uses the fingerprint recognition for the biometric authentication, the display screen of the display module 141 may display a user interface 1510 by which the security level for the fingerprint recognition is configured. The user interface 1510 may include a system default configuration maintaining item 1511 or a user configuration item 1513. The system default configuration maintaining item 1511 is intended to maintain a default security level that is preset by the manufacturer of the electronic device 100 or the application provider for the application that performs the biometrics-based authentication in the electronic device. The user configuration item 1513 may be intended to provide a function in which the user of the electronic device 100 may select or change the security level. The system default configuration maintaining item 1511 or the user configuration item 1513 may be selected by a user input through the interaction object, such as check boxes 1512 and 1514, or radio buttons.

Figure 15B:
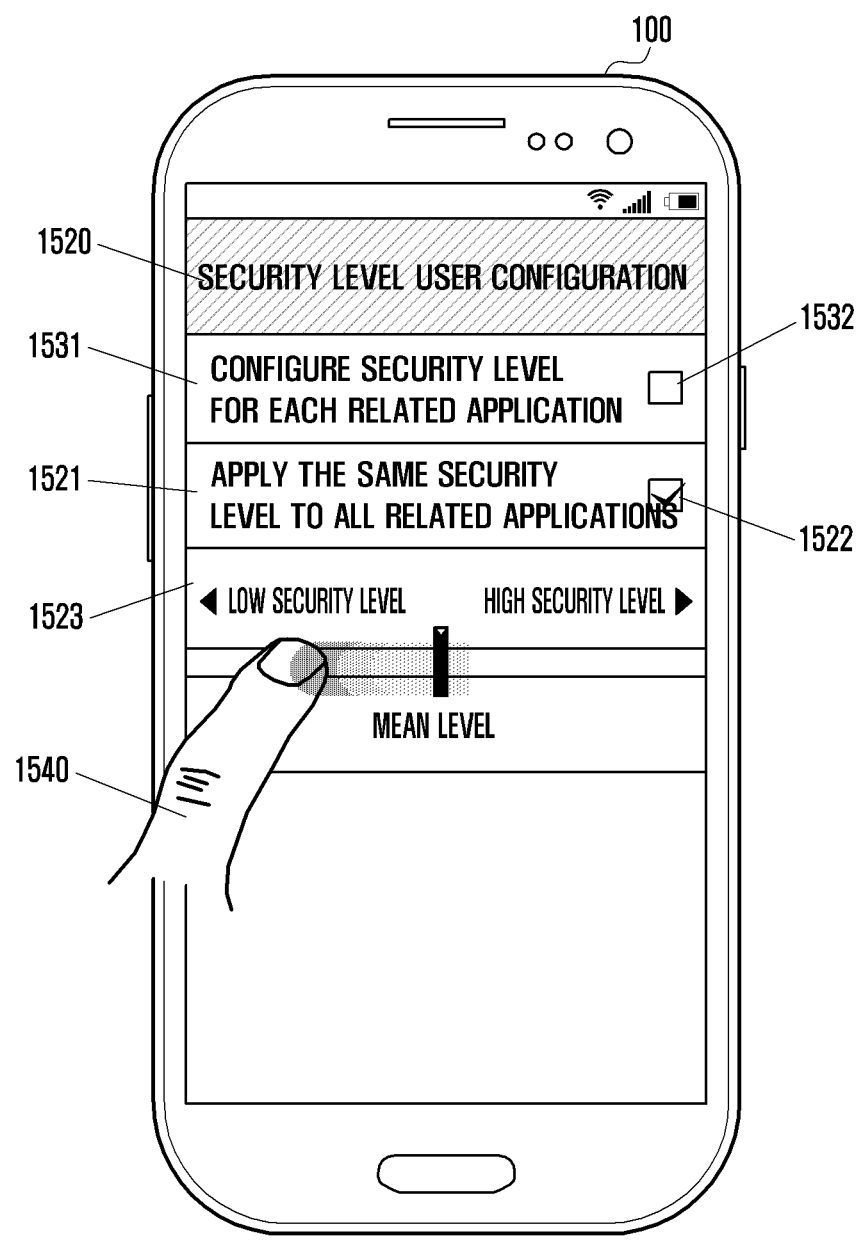

Referring to FIG. 15B, when the user configuration item 1513 is selected in FIG. 15A, the display screen of the display module 141 may display a user interface 1520 by which the security level may be changed according to the user's configuration. The user interface 1520 may include an item 1521 for applying the same security level to all of the related applications, or an item 1532 for configuring the security level for each related application. The user interface 1520 may provide an interaction object, such as the check boxes 1522 and 1532, or radio buttons to receive the user input for the items 1521 and 1532.

If the item 1521 is selected through the check box 1522, the electronic device may provide an interaction object 1523 that provides a function by which the same security level determined according to the user input 1540 may be applied to the related applications for the biometrics-based authentication. The interaction object 1523 may include objects, such as a slide bar as shown in FIG. 15B, check boxes, or radio buttons for selecting the security level from among a plurality of security levels or directly entering the corresponding security level. For example, in response to the user input 1540 for the interaction object 1523, the basic security level corresponding to a system default may be changed to a low or high security level.

Figure 15C:
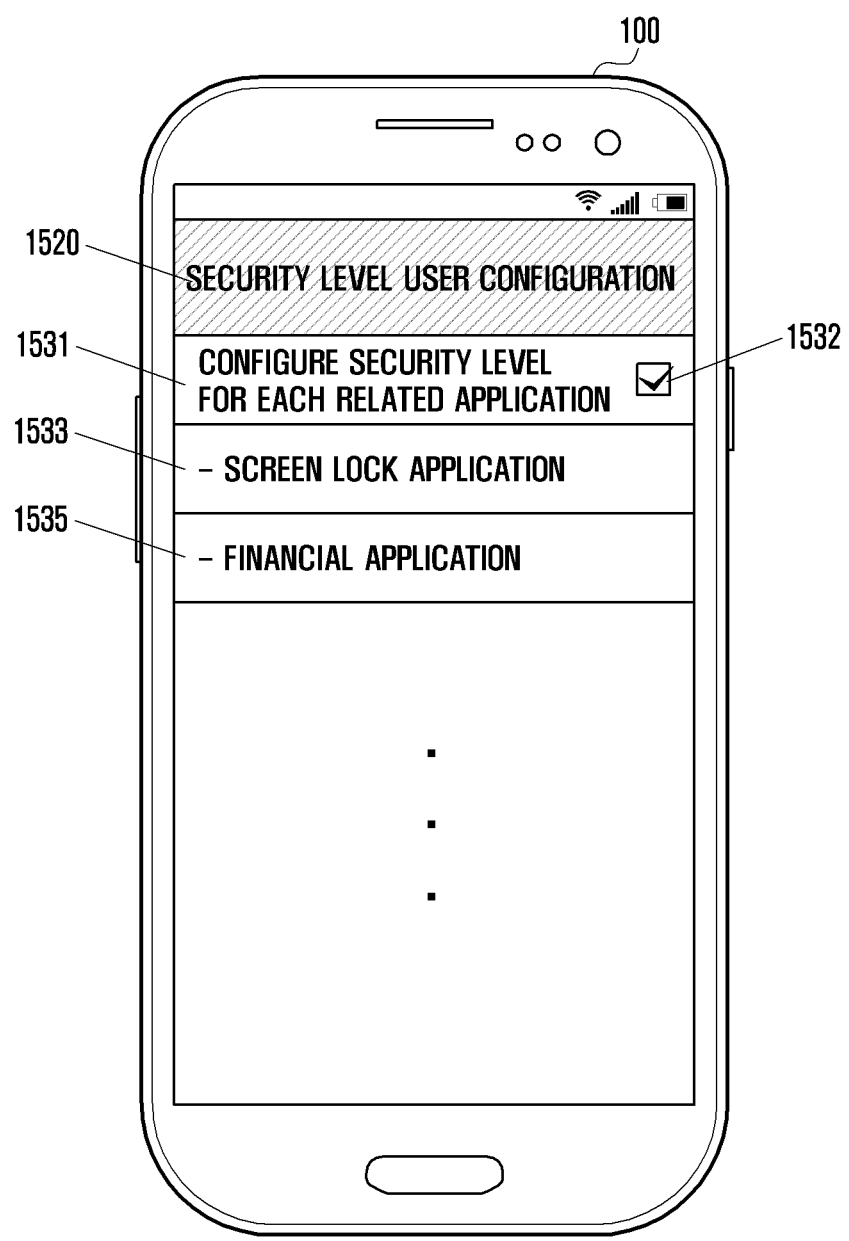

Referring to FIG. 15C, when the item 1531 is selected through the check box 1532 in FIG. 15B, the user interface 1520 may provide items 1533 and 1535 for the applications related to the execution of the biometrics-based authentication. The related applications may include a screen lock application or a financial application.

Each of the related applications may be designed by the application provider to perform the biometrics-based authentication by itself. In addition, the biometrics-based authentication function may be supported by a separate application, an OS (Operating System), a platform, or a system function for controlling or managing the electronic device 100, which performs the biometrics-based authentication. For example, the system function for the biometrics-based authentication may include a function that, as a criterion for executing a specified application in the electronic device 100, or a criterion for operating a specified function in a specific application, requests the biometrics-based authentication prior to the execution of the specified application or the operation of the specified function, and if the authentication is successful, determines that the corresponding criterion is satisfied. For example, when the electronic device 100 receives the user input on the icon for the execution of a specified application, the biometrics-based authentication may be required as a criterion for the execution of the specified application. In addition, when the biometrics-based authentication is successful, the system function may control to execute the specified application or function as the event for the authentication success.

Figure 15D:
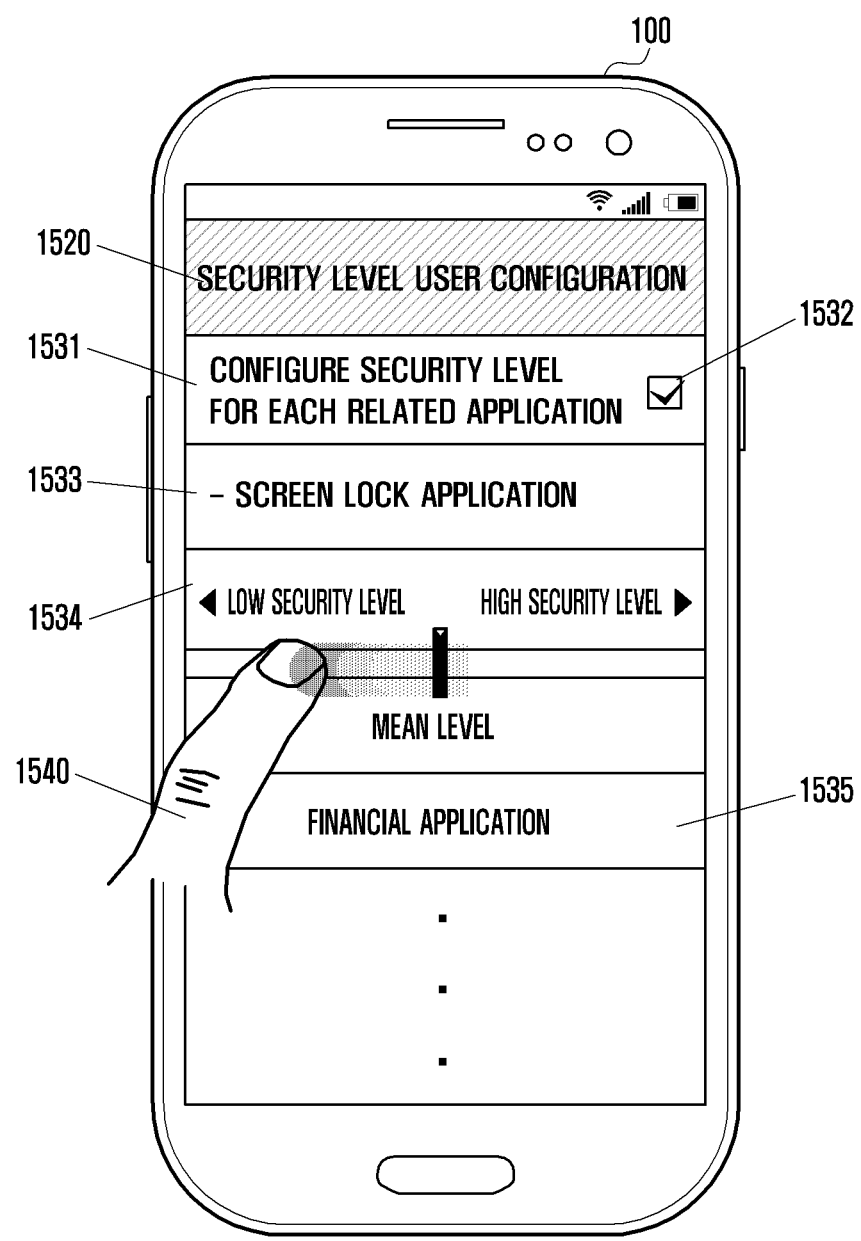

Referring to FIG. 15D, when the screen lock application item 1533 is selected from among the related application items 1533 and 1535 in FIG. 15C, the user interface 1520 may provide an interaction object 1534 for applying the security level that is configured by the user input 1540 with respect to the screen lock application. For example, the interaction object 1534 may be a slide bar.

The memory 110 may store a mapping table of thresholds corresponding to one or more security levels, or a function indicating the relationship between the security level and the threshold. The control unit 130 may specify a threshold corresponding to the security level that is configured by using the mapping table or function.

The threshold (or the match score threshold) 114 will be described through an example of a graph showing the probability density with reference to FIG. 11.

Figure 11:
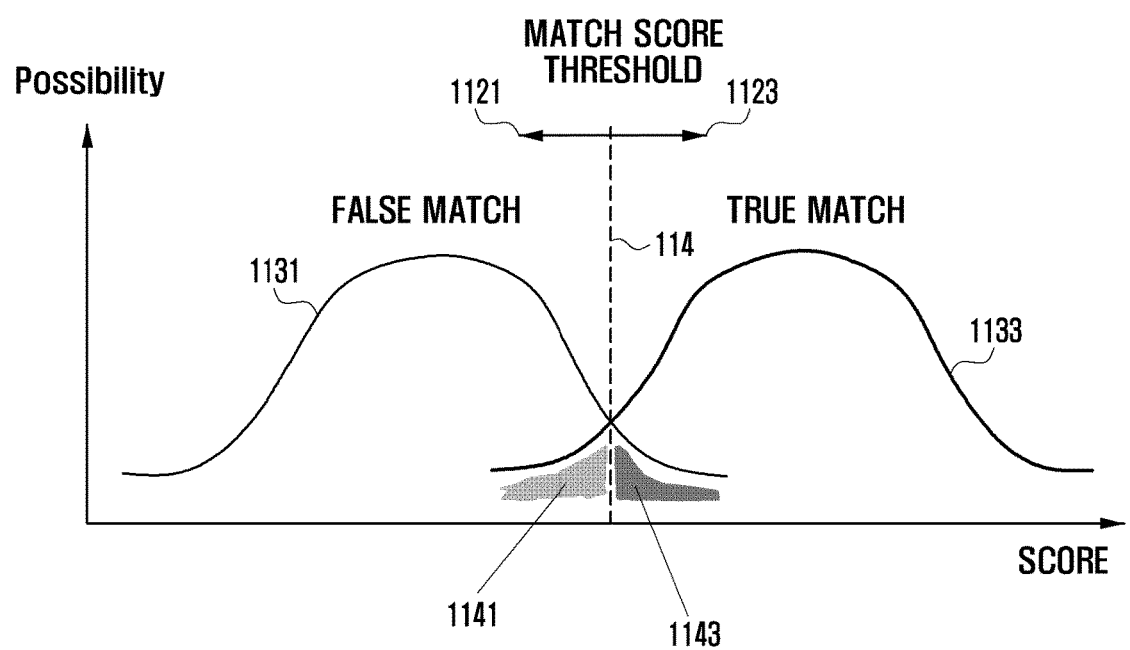
FIG. 11 is a graph showing the probability density for explaining a match score threshold, according to an embodiment of the present invention.

In FIG. 11, the x-axis represents the match score, and the y-axis represents the possibility. In the authentication mode, if the match score for the authentication target is greater than the threshold 114, the authentication may be successful, and if the match score is less than the threshold 114, the authentication may fail.

The curve 1131 is a graph showing the probability density with respect to the false acceptance rate (hereinafter, 'FAR') for the other authentication target. The curve 1133 is a graph showing the probability density with respect to the false rejection rate (hereinafter, 'FRR') for the authentication target.

In the case of the threshold 114 illustrated by a dotted line, the FAR 1143 may be obtained by integrating the possibility values of the curve 1131 in the section from the match score corresponding to the threshold 114 to the match score corresponding to the right end (in the direction in which the match score increases) 1123 of the curve 1131 above the threshold 114.

In addition, the FRR 1141 may be obtained by integrating the possibility values of the curve 1133 in the section from the match score corresponding to the left end (in the direction in which the match score decreases) 1121 of the curve 1133 below the threshold 114 to the match score corresponding to the threshold 114.

For example, in the case where the security level is configured to be high through the user interface, the control unit 130 may specify the first threshold that reduces the FAR 1143. If the threshold 114 has a value corresponding to the system default security level, the first threshold may be a value on the right of the dotted line (in the direction in which the match score increases) 1123. In addition, the first threshold may be configured to increase the FRR 1141.

In addition, in the case where the security level is configured to be low through the user interface, the control unit 130 may specify the second threshold that reduces the FRR 1141. If the threshold 114 has a value corresponding to the system default security level, the second threshold may be a value on the left of the dotted line (in the direction in which the match score decreases) 1121. In addition, the second threshold may be configured to increase the FAR 1143.

An example of the match score obtained by the functional module 1133 of the control unit 130 in FIG. 5 will be described with reference to FIG. 12.

The fingerprint image 1210 may correspond to one of the fingerprint templates that are registered as the registered information 111. The feature information is obtained through the fingerprint image 1210, and the obtained feature information may be recorded, as the fingerprint template of the registered information 111, in the memory 110.

For example, the registered information 111 may include one or more fingerprint templates that are obtained from the fingerprint images of more than a specific quality level (hereinafter, "good images") in the registration mode.

For example, the registered information 111 may include four fingerprint templates that are obtained from the four good images. The quality level of the feature information (or the fingerprint template) may be calculated from the feature points in the minutiae. For example, the quality level of the fingerprint template may be the number of feature points, and the number of feature points may be defined as a minutiae value. It may be assumed that the minutiae values 1215 of four fingerprint templates are {68, 68, 68, 68}, respectively.

Provided that the minutiae value obtained from the fingerprint image 1220 in the authentication mode is 68, the matching result 1225 of the feature information on the fingerprint image 1220 and the registered fingerprint templates may be {9, 7, 4, 16}. For example, each value of the matching result 1225 may be the number of pieces of feature information in which the feature information and the fingerprint template are determined to correspond to each other (or match each other). In addition, the match score of the matching result 1225 may be calculated based on various operations, such as a sum, an average, the maximum, the minimum, the median, or the variance of the values of the matching result 1225. For convenience of explanation, it may be assumed that the match score of the matching result 1225 is 36, which is the sum of the values of the matching result 1225.

In addition, a minutiae value for the fingerprint image 1230 may be 68, and the matching result 1235 of the feature information on the fingerprint image 1230 and the registered fingerprint templates may be {15, 20, 8, 7}. The match score of the matching result 1235 may be 50.

In addition, the minutiae value of the fingerprint image 1240 may be 68, and the matching result 1245 of the feature information on the fingerprint image 1240 and the registered fingerprint templates may be {7, 6, 5, 7}. The match score of the matching result 1245 may be 25.

The functional module 133 of the control unit 130 in FIG. 5 may determine the authentication success or failure for each of the matching results 1225, 1235, and 1245 based on the threshold 114. For example, provided that the threshold 114 is 50, the authentication target corresponding to the feature information having a match score of more than 50 may be successful in the authentication. In this case, the matching result 1235 may be determined to be successful in the authentication among the matching results 1225, 1235, and 1245. In addition, when the security level is configured to be low according to the user input in the electronic device 100, the threshold 114 may be specified as 25. In this case, each of the matching results 1225, 1235, and 1245 may be determined to be successful in the authentication.

In addition, the registered information 111 in the memory 110 may be operated in the EEM method.

For example, referring to FIG. 13, in the case of the initial registration (a), the electronic device 100 may obtain eight fingerprint templates 1310 from the authentication target in the registration mode until the registered information 111 contains four pieces of feature information (or fingerprint templates), which has more than a specific quality level (hereinafter, 'good templates') 1311. Four good templates among eight fingerprint templates 1310 may be stored as the registered information 111. Here, the good template 1311 may be a fingerprint template (or feature information) that has a quality, which is equal to or more than the first preset quality level 112. For example, the quality level of the good template 1311 may be equal to or more than the quality level of the registration feature information, or the fingerprint image corresponding to the good template 1311 may be equal to or more than the quality level of the preset registration sensing data.

The functional module 135 of the control unit 130 in FIG. 5 may determine whether or not a preset criterion for updating the registered information 111 is satisfied. If the preset criterion is satisfied, the functional module 135 may control to update the registered information 111.

Figure 13:
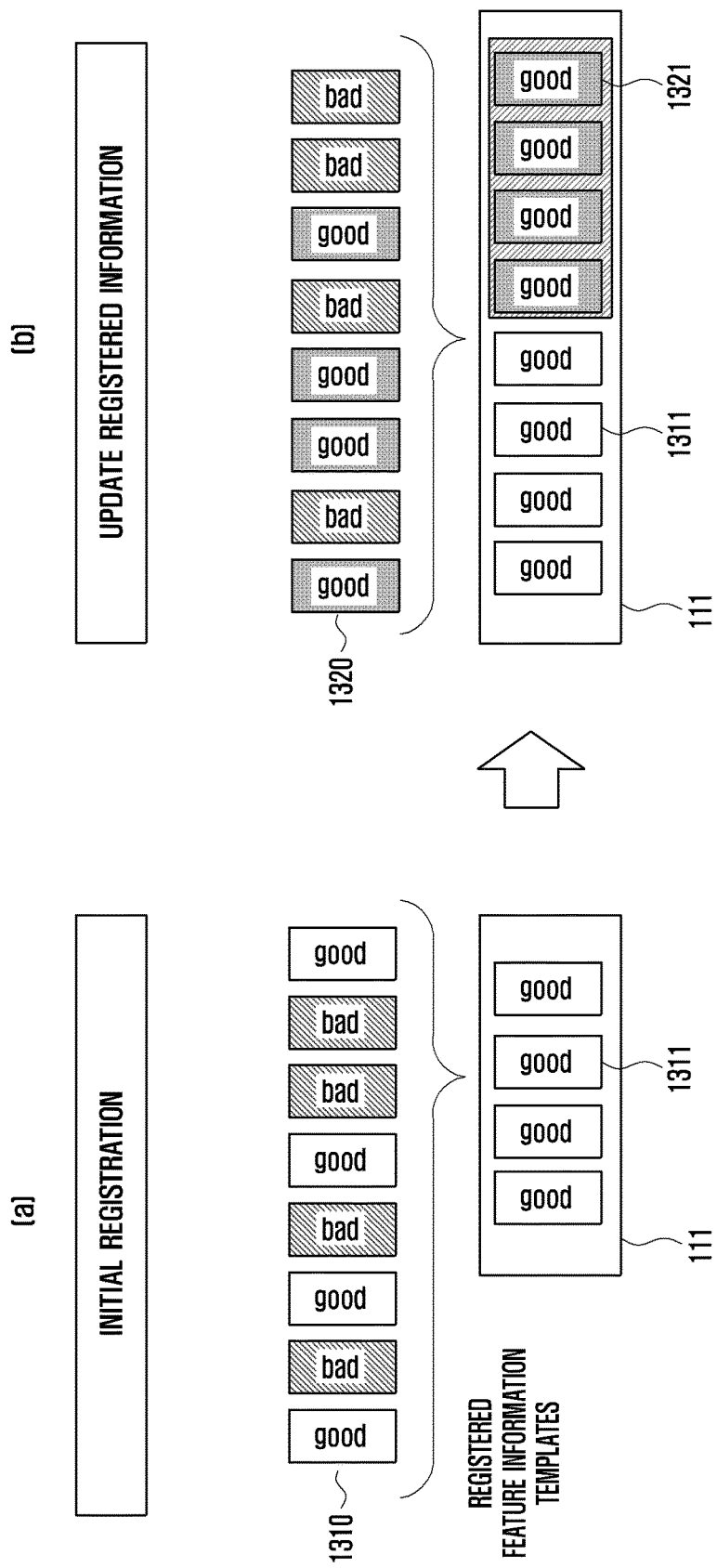
FIG. 13 is a conceptual diagram for explaining an operation of updating registered information, according to an embodiment of the present invention.

For example, when the registered information 111 is updated (b) in the EEM method in FIG. 13, four new good templates including a new good template 1321 may be added to the registered information 111. Eight specific information templates may be stored as the registered information 111. The electronic device 100 may obtain eight new fingerprint templates 1320 from the authentication target until four good templates are stored as the registered information 111.

Here, the new fingerprint templates 1320 may be obtained by controlling the functional module 135 of the control unit 130 to operate in the registration mode when the preset criterion is satisfied, or may be the fingerprint templates corresponding to the successful authentication in the registration mode. If the new fingerprint templates 1320 are obtained in the authentication mode, the update of the registered information 111 may be performed in the background without displaying the same to the user.

Here, a new good template 1321, which is additionally registered in the registered information 111, may have a higher quality than at least one of the good templates that have already been registered. In addition, the quality level of the new good template 1321 may be equal to or more than the average quality level of the registered good templates, or may be equal to or more than the minimum quality or the maximum quality among the qualities of the registered good templates.

In addition, the functional module 135 of the control unit 130 may control to accumulate and store the match scores in the memory 110 in order to determine a preset criterion for updating the registered information 111. For example, the functional module 135 may control to accumulate and store authentication scores, which are the match scores that are equal to or more than a preset threshold.

The preset criterion for updating the registered information 111 may include the operation of updating the registered information 111 by using a new fingerprint template according to a specified time and a specified cycle. For example, in the case where the update is made in a specified cycle, the electronic device 100 may add new fingerprint templates as the registered information 111 up to the maximum number of fingerprint templates that can be stored in the registered information 111, and if the fingerprint templates reaches the maximum number, the electronic device may replace the registered fingerprint template of a low quality level with a new fingerprint template.

In addition, in the case where the authentication target is a child's fingerprint, the functional module 135 of the control unit 130 may control to update the registered information 111 periodically by using new feature information. In the case where the authentication target is an adult's fingerprint, when the number of updates by using the new feature information exceeds the preset number of times, the functional module 135 of the control unit 130 may stop the addition of new fingerprint templates in order to thereby limit the update of the registered information 111. The control unit 130 may recognize whether the authentication target relates to a child or an adult by using a logging-on user mode or user information that is registered in the electronic device 100. For example, the electronic device 100 may be used by a plurality of users, and the electronic device 100 may have a user mode that manages the configuration of applications or the configuration of the system for each user. The electronic device 100 may provide the user mode that configures different usage environments depending on the users, or may provide a preset user mode, such as a child user mode or an adult user mode, in consideration of the user's age or usage pattern. For example, when the logging-on operation or the usage environment is configured as the child user mode, the control unit 130 of the electronic device 100 may determine that the authentication target relates to a child. In addition, the control unit 130 may analyze the sensing data (e.g., the size of the fingerprint image) obtained by the fingerprint recognition sensor 121 of the sensor unit 120 or the feature information in order to thereby recognize whether the authentication target relates to a child or an adult. In addition, the control unit 130 may analyze the characteristic of the image obtained through the camera 122 of the sensor unit 120 or the characteristics of audio data received through a microphone (not shown) in order to thereby determine whether the authentication target relates to a child or an adult.

For example, in the case where the authentication target is a child's fingerprint, the update may be made in a two-month cycle so that four new fingerprint templates may be added to the registered information 111 every two months. In addition, for example, in the case where the authentication target is an adult's fingerprint, the fingerprint templates are stored in the registered information 111 in the registration mode, and after that, up to four fingerprint templates, which are successful in the authentication, may be added in the authentication mode so that subsequent updates may be restricted.

In addition, the preset criterion for updating the registered information 111 may be the case where the accumulated authentication score for the authentication target is gradually lowered to be the same as, or close to, a preset threshold.

Figure 14:
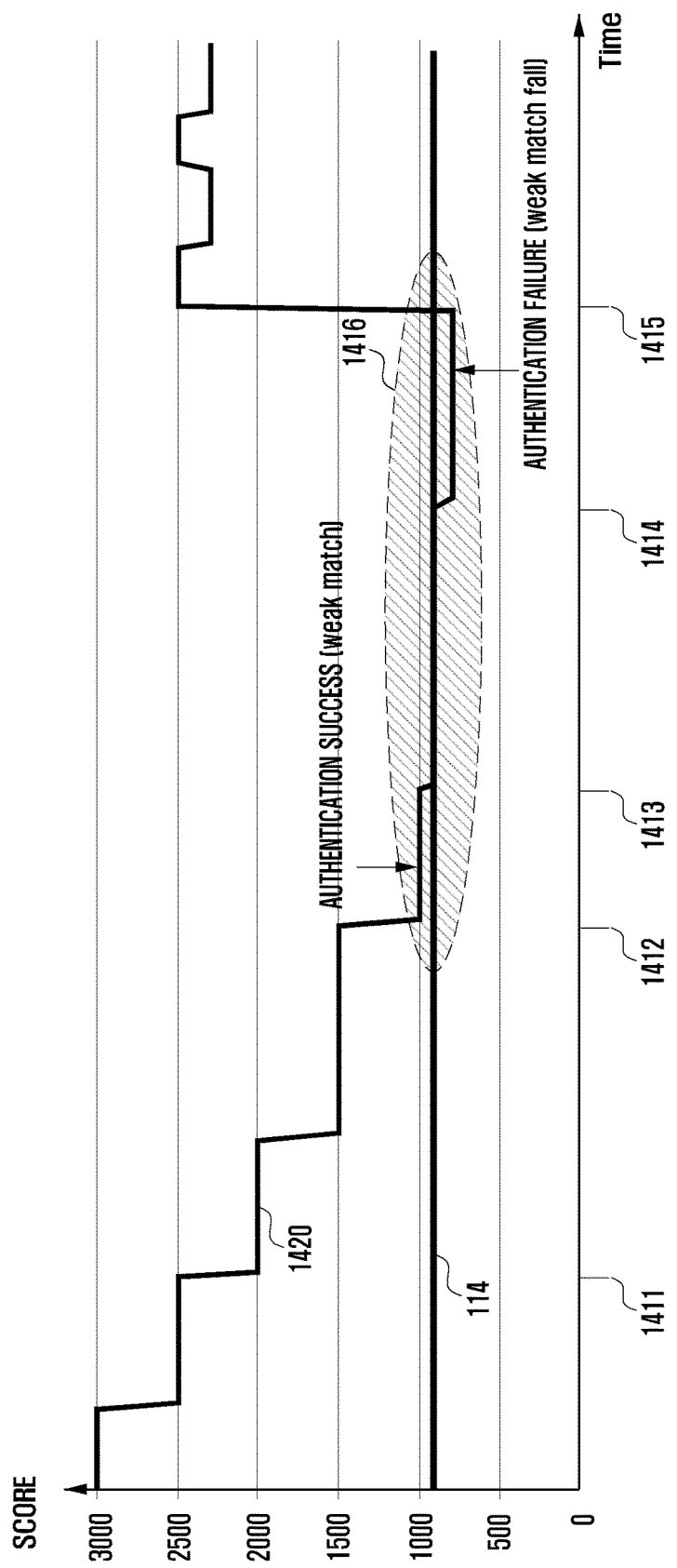
FIG. 14 is a graph for explaining a preset criterion for updating registered information, according to an embodiment of the present invention.

For example, the graph 1420 shown in FIG. 14 may indicate a change in the authentication score depending on time. Here, the time axis may denote a specific time, days, weeks, or months, or may denote the number of authentication attempts. For example, it may be assumed that the maximum value of the authentication score is 3000 and the score corresponding to threshold 114 is 800. The electronic device 100 may start observation in order to determine whether or not a preset criterion is satisfied from the time point 1411 when the authentication score is equal to or less than 2000, and may accumulate and store the authentication score.

When the authentication score is equal to or close to the threshold 114 as shown in the area 1416, the functional module 135 of the control unit 130 may determine the update of the registered information 111 for the time-period from the start time point 1412 to the time point 1415 in the area 1416. In addition, if the time-period between the time point 1412 and the time point 1415 is spaced a specific time from the observation start time point 1411 and the authentication score gradually decreases from the time point 1411 to the time point 1412, the functional module 135 of the control unit 130 may determine the update of the registered information 111. For example, the update of the registered information 111 may be performed: in the time-period between the time point 1412 and the time point 1413, where the authentication score is more than, and close to, the threshold 114; in the time-period between the time point 1413 and the time point 1414, where the authentication score is equal to the threshold 114; or in the time-period between the time point 1414 and the time point 1415, where the authentication score is less than and close to the threshold 114.

In addition, in order to determine whether the authentication score temporarily belongs to the area 1416 due to the sensing operation of another authentication target, the functional module 135 of the control unit 130 may determine the correlation between the feature information on the authentication target for a specific time-period prior to the time-period between the time point 1411 and the time point 1412, and the feature information that is obtained from the authentication target for the time-period corresponding to the area 1416. If the correlation between the feature information that is obtained from the authentication target at the time point corresponding to the authentication score of the area 1416 and the feature information on the authentication target corresponding to the accumulated authentication score is equal to or more than a specific level, the functional module 135 of the control unit 130 may determine the update of the registered information 111.

Hereinafter, the electronic device that performs the biometrics-based authentication method described in FIG. 16 to FIG. 19, FIG. 20A, and FIG. 20B, for example, may be the electronic device 100 that has been described in FIG. 1 to FIG. 5 above.

Figure 16:
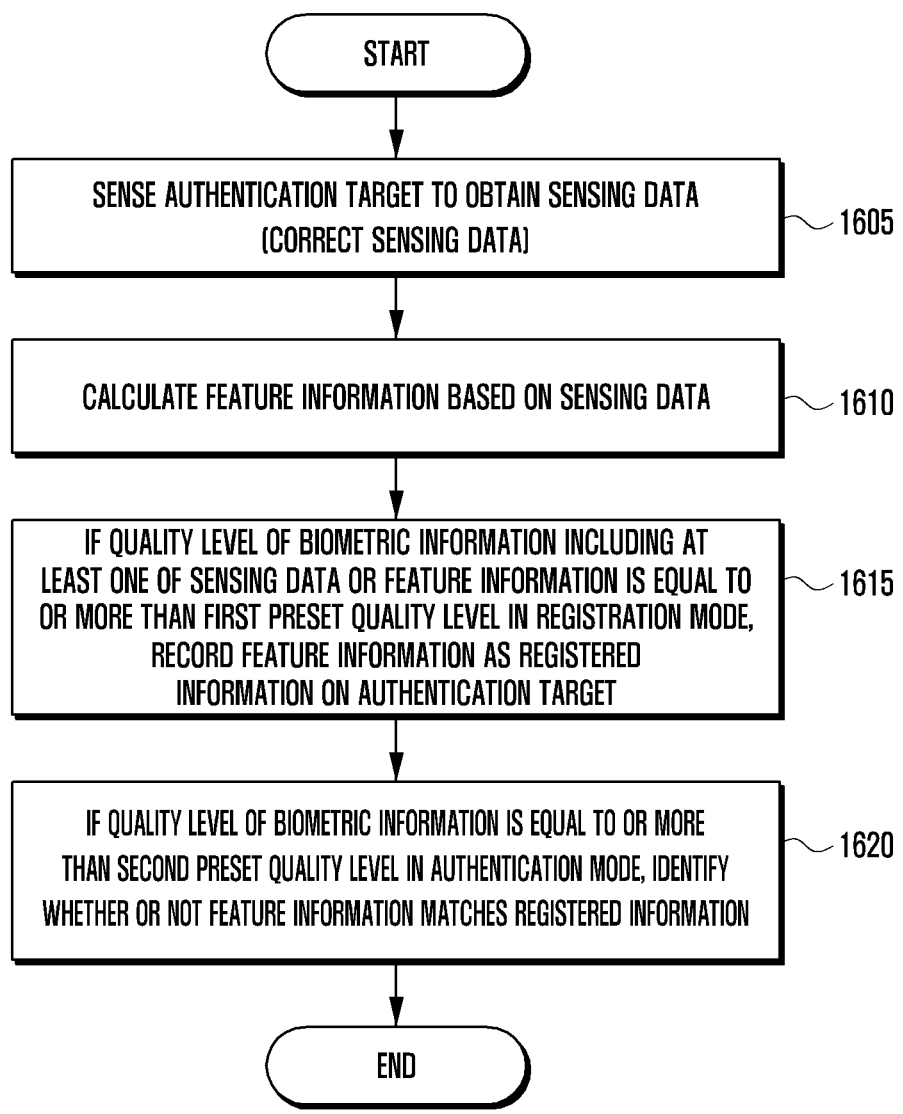
FIG. 16 is a flowchart showing a biometrics-based authentication method, according to an embodiment of the present invention.

FIG. 16 is a flowchart showing the biometrics-based authentication method, according to an embodiment of the present invention.

In operation 1605, the electronic device 100 may sense the authentication target to obtain the sensing data. In addition, the electronic device 100 may correct the sensing data in order to thereby obtain the corrected sensing data. Hereinafter, the sensing data may include the data obtained by sensing the authentication target and the corrected sensing data.

In operation 1610, the electronic device 100 may calculate the feature information based on the sensing data.

In operation 1615, if the quality level of the biometric information including at least one piece of the sensing data or the feature information is equal to or more than the first preset quality level in the registration mode, the electronic device 100 may record the feature information as the registered information on the authentication target.

In operation 1620, if the quality level of the biometric information is equal to or more than the second preset quality level in the authentication mode, the electronic device 100 may identify whether or not the feature information matches the registered information.

Here, the first preset quality level in the registration mode and the second preset quality level in the authentication mode may be different from each other. For example, the second preset quality level may be lower than the first preset quality level.

The first preset quality level may include at least one of the quality level of preset registration sensing data for evaluating the quality level of the sensing data, or the quality level of the preset registration feature information for evaluating the quality level of the feature information, in the registration mode.

The second preset quality level may include at least one of the quality level of preset authentication sensing data for evaluating the quality level of the sensing data, or the quality level of the preset authentication feature information for evaluating the quality level of the feature information, in the authentication mode.

The fact that the second preset quality level is less than the first preset quality level may mean that the quality level of the preset authentication sensing data is less than the quality level of the preset registration sensing data or the quality level of the preset authentication feature information is less than the quality level of the preset registration feature information.

Figure 17:
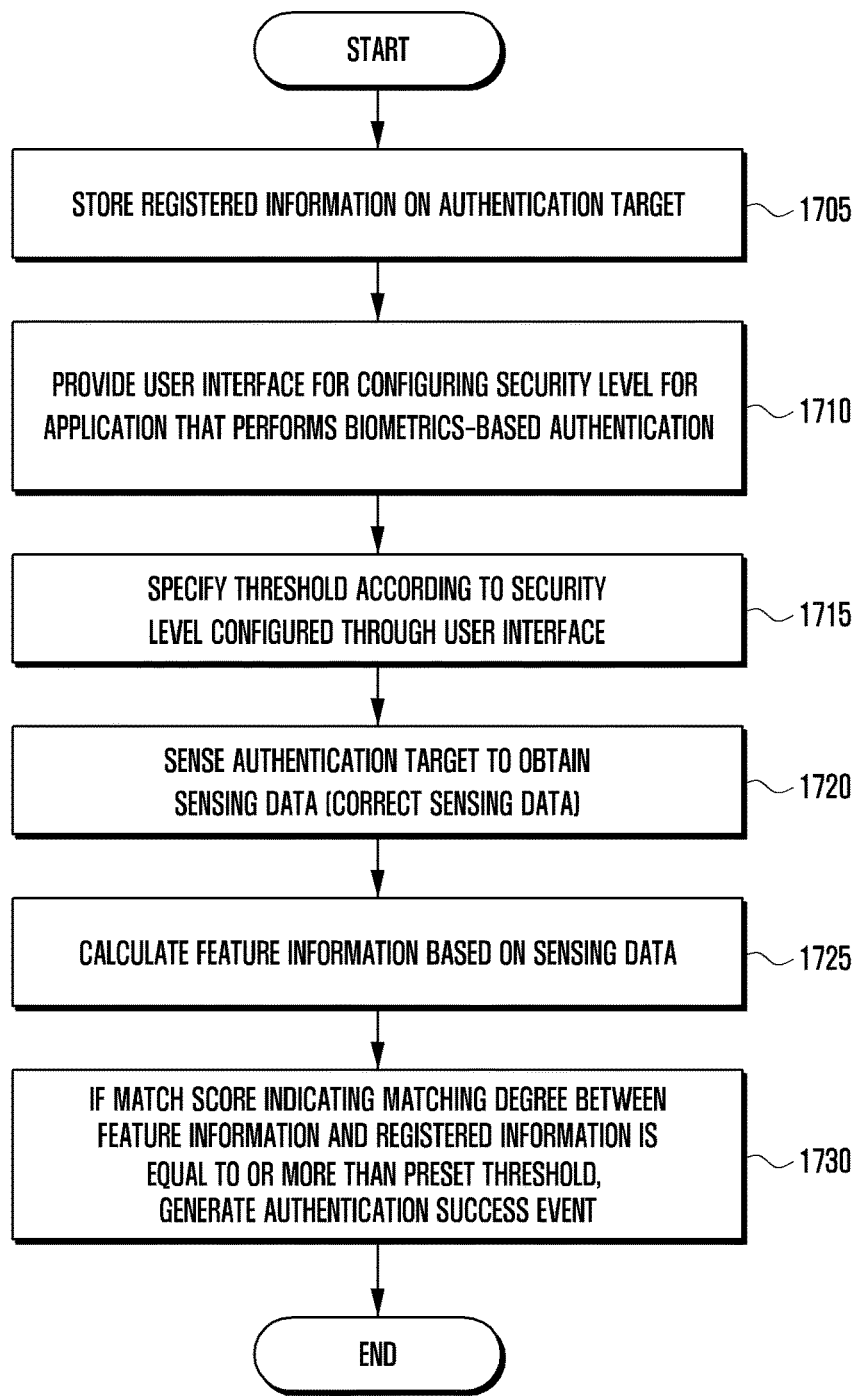
FIG. 17 is a flowchart showing a biometrics-based authentication method, according to another embodiment of the present invention.

FIG. 17 is a flowchart showing the biometrics-based authentication method, according to another embodiment of the present invention.

In operation 1705, the electronic device 100 may store the registered information on the authentication target.

In operation 1710, the electronic device 100 may provide a user interface for configuring the security level for the application that performs the biometrics-based authentication.

In operation 1715, the electronic device 100 may specify a threshold according to the security level configured through the user interface.

In operation 1720, the electronic device 100 may sense the authentication target to obtain the sensing data. In addition, the electronic device 100 may correct the sensing data in order to thereby obtain the corrected sensing data. Hereinafter, the sensing data may include the data obtained by sensing the authentication target and the corrected sensing data.

In operation 1725, the electronic device 100 may calculate the feature information based on the sensing data.

In operation 1730, if the match score, which indicates the degree to which the feature information and the registered information match, is equal to or more than a preset threshold, the electronic device 100 may generate an authentication success event.

Figure 18:
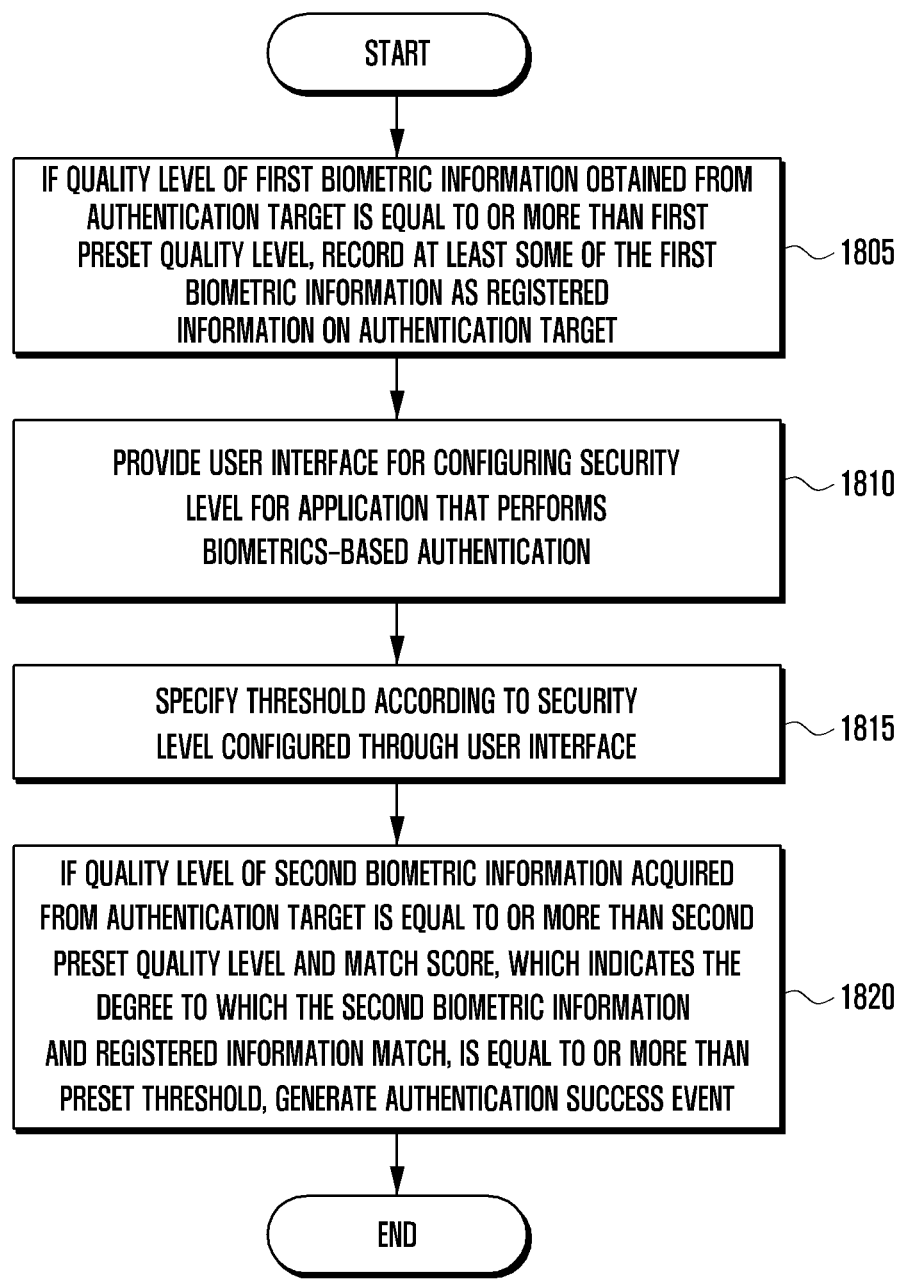
FIG. 18 is a flowchart showing a biometrics-based authentication method, according to another embodiment of the present invention.

FIG. 18 is a flowchart showing the biometrics-based authentication method, according to another embodiment of the present invention.

In operation 1805, if the quality level of the first biometric information obtained from the authentication target is equal to or more than the first preset quality level, the electronic device 100 may record at least some of the first biometric information as the registered information on the authentication target.

In operation 1810, the electronic device 100 may provide a user interface for configuring the security level for the application that performs the biometrics-based authentication.

In operation 1815, the electronic device 100 may specify a threshold in accordance with the security level configured through the user interface.

In operation 1820, if the quality level of the second biometric information acquired from the authentication target is equal to or more than the second preset quality level and the match score, which indicates the degree to which the second biometric information and the registered information match, is equal to or more than a preset threshold, the electronic device 100 may generate an authentication success event.

Here, the first preset quality level in the registration mode and the second preset quality level in the authentication mode may be different from each other. For example, the first preset quality level may be higher than the second preset quality level.

Figure 19:
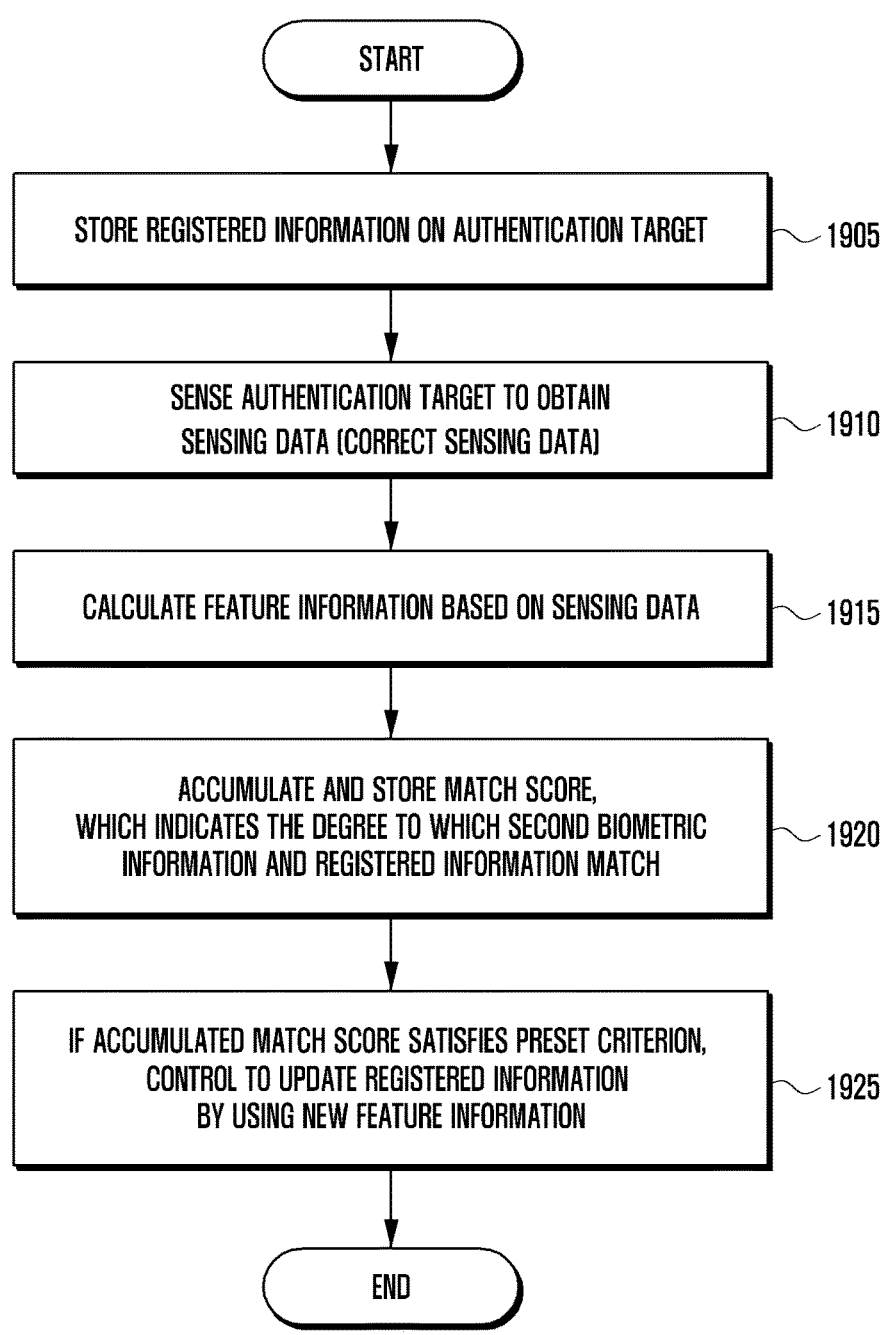
FIG. 19 is another flowchart showing a biometrics-based authentication method, according to another embodiment of the present invention.

FIG. 19 is another flowchart showing the biometrics-based authentication method, according to another embodiment of the present invention.

In operation 1905, the electronic device 100 may store the registered information on the authentication target.

In operation 1910, the electronic device 100 may sense the authentication target to obtain the sensing data. In addition, the electronic device 100 may correct the sensing data in order to thereby obtain the corrected sensing data. Hereinafter, the sensing data may include the data obtained by sensing the authentication target and the corrected sensing data.

In operation 1915, the electronic device 100 may calculate the feature information based on the sensing data.

In operation 1920, the electronic device 100 may accumulate and store the match scores, which indicate the degree to which the feature information and the registered information. For example, the authentication score that is the match score, which is equal to or more than a preset threshold, may be accumulated and stored.

In operation 1925, if the accumulated match score satisfies a preset criterion, the electronic device 100 may control to update the registered information by using the new feature information. In addition, the control of the update of the registered information may include the control of storing the feature information as a new fingerprint template when the quality level of the feature information is higher than the quality level of the fingerprint template contained in the registered information.

The preset criterion may denote the case where the accumulated authentication score for the authentication target is gradually lowered to be equal to, or close to, the preset threshold.

In addition, if the authentication target relates to a child, the electronic device 100 may control to update the registered information periodically by using the feature information, and if the authentication target relates to an adult, when the number of updates by using the feature information exceeds the preset number of times, the electronic device 100 may stop the addition of the fingerprint templates to the registered information on the authentication target in order to thereby limit the update of the registered information.

Figure 20A:
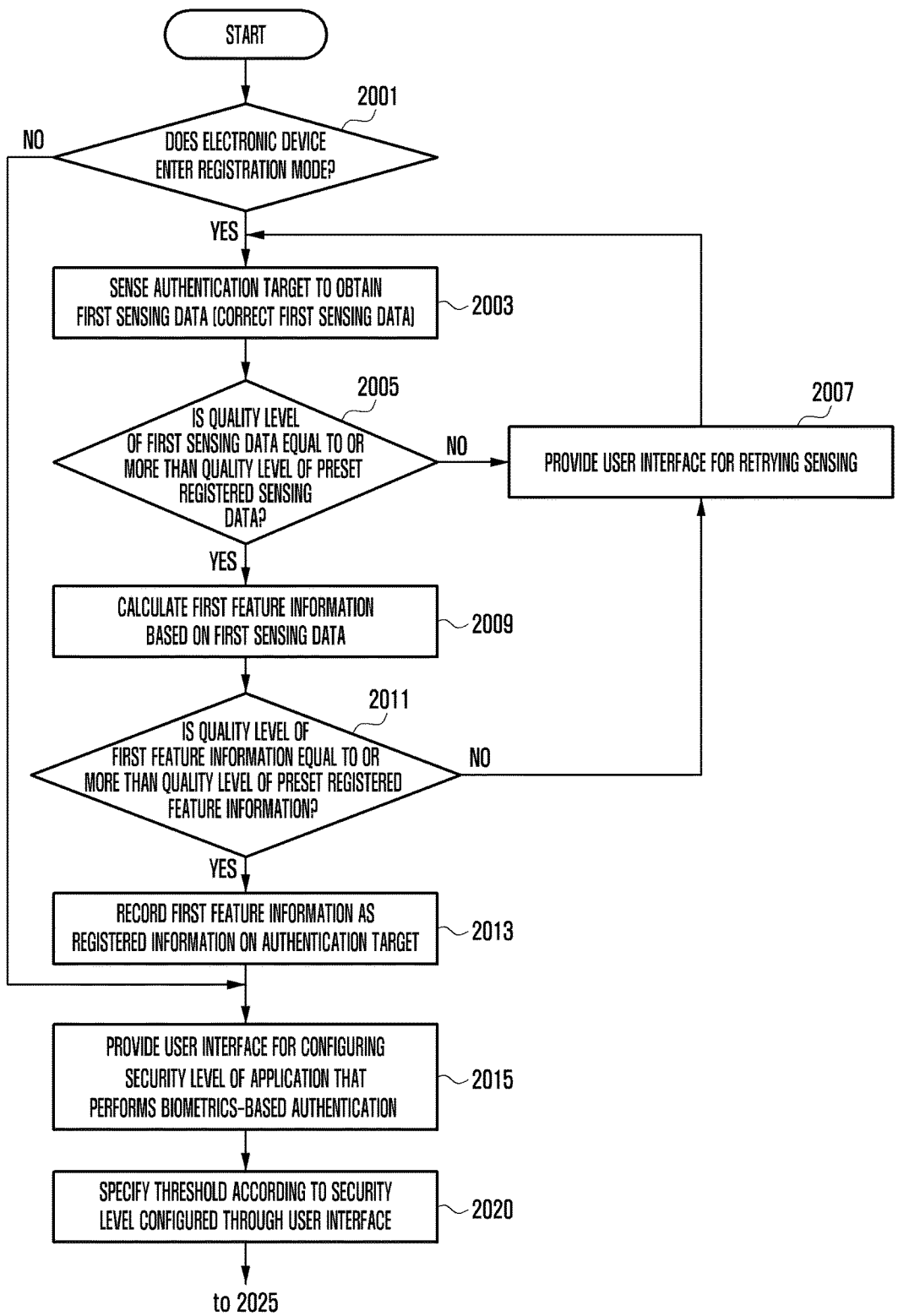
FIG. 20A and FIG. 20B are detailed flowcharts showing the biometrics-based authentication method, according to an embodiment of the present invention.
Figure 20B:
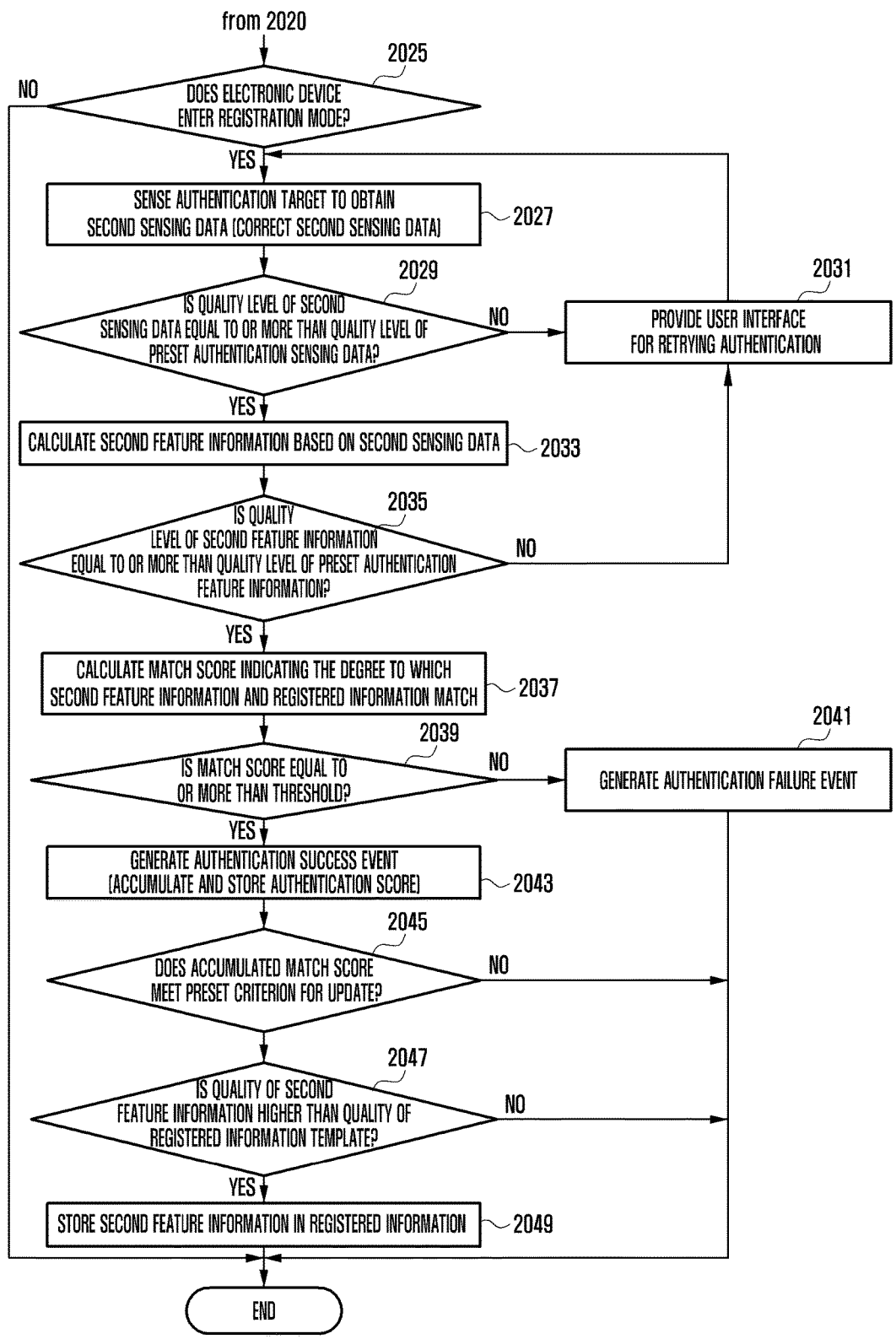

FIG. 20A and FIG. 20B are flowcharts illustrating the biometrics-based authentication method in more detail, according to an embodiment of the present invention.

In operation 1205, the electronic device 100 may determine whether or not the electronic device enters the registration mode. If the electronic device does not enter the registration mode, the electronic device 100 may perform operation 2015.

If the electronic device enters the registration mode, the electronic device 100 may sense the authentication target in order to thereby obtain the first sensing data in operation 2003. In addition, the electronic device 100 may correct the first sensing data in order to thereby obtain the first corrected sensing data. Hereinafter, the first sensing data may include the data obtained by sensing the authentication target and the first corrected sensing data.

In operation 2005, the electronic device 100 may determine whether or not the quality level of the first sensing data is equal to or more than the quality level of the preset registration sensing data. If the quality level of the first sensing data is less than the quality level of the preset registration sensing data, the electronic device 100 may provide a user interface for making a request to the user for retrying the sensing in operation 2007

If the quality level of the first sensing data is equal to or more than the quality level of the preset registration sensing data, the electronic device 100 may calculate the first feature information based on the first sensing data in operation 2009.

In operation 2011, the electronic device 100 may determine whether or not the quality level of the first feature information is equal to or more than the quality level of the preset registration feature information. If the quality level of the first feature information is less than the quality level of the preset registration feature information, the electronic device 100 may provide a user interface for making a request to the user for retrying the sensing in operation 2007.

If the quality level of the first feature information is equal to or more than the quality level of the preset registration feature information, the electronic device 100 may record the first feature information as the registration for the authentication target in operation 2013.

In operation 2015, the electronic device 100 may provide a user interface for configuring the security level for the application that performs the biometrics-based authentication.

In operation 2020, the electronic device 100 may specify a threshold according to the security level configured through the user interface. The memory of the electronic device 100 may store a mapping table of thresholds corresponding to one or more security levels or a function that represents the relationship between the security level and the threshold. The electronic device 100 may specify the threshold corresponding to the configured security level by using the mapping table or function.

In operation 2025, the electronic device 100 may determine whether or not the electronic device enters the authentication mode. If the electronic device does not enter the authentication mode, the electronic device 100 may terminate the biometrics-based authentication process.

If the electronic device enters the authentication mode, the electronic device 100 may sense the authentication target to obtain the second sensing data in operation 2027. In addition, the electronic device 100 may correct the second sensing data in order to thereby obtain the second corrected sensing data. Hereinafter, the sensing data may include the data obtained by sensing the authentication target and the second corrected sensing data.

In operation 2029, the electronic device 100 may determine whether or not the quality level of the second sensing data is equal to or more than the quality level of the preset authentication sensing data. If the quality level of the second sensing data is less than the quality level of the preset authentication sensing data, the electronic device 100 may provide a user interface for making a request to the user for retrying the sensing (or the authentication) in operation 2031.

If the quality level of the second sensing data is equal to or more than the quality level of the preset authentication sensing data, the electronic device 100 may calculate the second feature information based on the second sensing data in operation 2033.

In operations 2035, the electronic device 100 may determine whether or not the quality level of the second feature information is equal to or more than the quality level of the preset authentication feature information. If the quality level of the second feature information is less than the quality level of the preset authentication feature information, the electronic device 100 may provide a user interface for making a request to the user for retrying the sensing (or the authentication) in operation 2031.

If the quality level of the second feature information is equal to or more than the quality level of the preset authentication feature information, the electronic device 100 may calculate a match score, which indicates the degree to which the second feature information and the registered information match, in operation 2037.

In operation 2039, the electronic device 100 may determine whether or not the match score is equal to or more than a threshold. If the match score is less than the threshold, the electronic device 100 may generate an authentication failure event in operation 2041.

If the match score is equal to or more than the threshold, the electronic device 100 may generate an authentication success event in operation 2043. In addition, the electronic device 100 may accumulate and store the authentication scores.

In operation 2045, the electronic device 100 may determine whether or not the accumulated match score satisfies a preset criterion for an update. If the accumulated match score does not meet the preset criterion, the electronic device 100 may terminate the biometrics-based authentication process.

If the accumulated match score satisfies the preset criterion, the electronic device 100 may determine whether or not the quality of the second feature information is higher than the quality of at least one fingerprint template in operation 2047. If the quality of the second feature information is not higher than the quality of at least one fingerprint template, the electronic device 100 may terminate the biometrics-based authentication process.

If the quality of the second feature information is higher than the quality of at least one fingerprint template, the electronic device 100 may store the second feature information in the registered information in operation 2049.

It should be noted that at least some of the operations of the biometrics-based authentication method described in FIG. 20A and FIG. 20B may be modified or omitted or the sequence of the operations may vary. For example, the operations 2015 to 2020 may be provided in the registration mode, or may be provided regardless of the sequence or the status of the mode.

In addition, the user interface provided with reference to FIG. 15A to FIG. 15D may be changed by the manufacturer of the electronic device 100, the application provider, the service provider, or the user, and a variety of user interfaces may be provided for convenience and usage purposes.

In addition, the operations of the biometrics-based authentication method described in FIG. 16 to FIG. 19, FIG. 20A, and FIG. 20B may be changed in its sequence, or some of the operations may be omitted. In addition, the method may be performed by a combination of the operations described above. In addition, it is obvious to those skilled in the art that the user interface may be modified in various forms according to the change or omission of the operations.

In addition, those skilled in the art may understand that the program of the embodiment described in FIG. 16 to FIG. 19, FIG. 20A, and FIG. 20B may be configured as software, hardware, or a combination thereof. In addition, the program according to the embodiment may be recorded in the recording medium, and may be downloaded from a server or computers into the electronic device 100 through the communication network.

Figure 21:
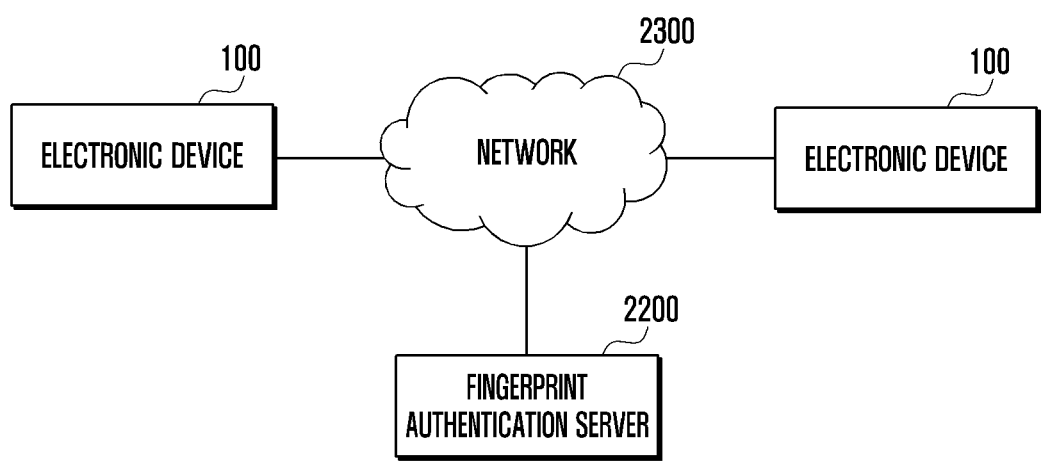
FIG. 21 is an exemplary view of a fingerprint authentication system that is comprised of a plurality of electronic devices and a fingerprint authentication server, according to an embodiment of the present invention.

FIG. 21 is an exemplary view of a fingerprint authentication system that is comprised of a plurality of electronic devices 100 and a fingerprint authentication server 2200, according to an embodiment of the present invention.

As shown in FIG. 21, the server-based fingerprint authentication system includes a plurality of electronic devices 100, the fingerprint authentication server 2200, and the network 2300.

The electronic device 100 allows a user who wishes to use the electronic device 100 to input the fingerprint in order to thereby perform the fingerprint authentication. At this time, the electronic device 100 may permit the eligible user to use the electronic device 100, or may differently configure the access authority to the electronic device 100 according to whether or not the user is eligible.

The fingerprint authentication server 2200 may include fingerprint templates that are compared with the input fingerprint, and may be implemented to perform the fingerprint authentication function, according to an embodiment. In the case where the fingerprint authentication server performs the fingerprint authentication function, the fingerprint authentication server may transmit the fingerprint authentication result to the electronic device 100 to configure the access authority of the user.

Although the fingerprint authentication server 2200 is illustrated to be separated from the electronic device 100 in FIG. 21, the fingerprint authentication server may be implemented to be included in the electronic device 100.

Meanwhile, the communication network 2300 may connect a plurality of electronic devices 100 and the fingerprint authentication server 2200. That is, the communication network 2300 may provide a connection path through which the electronic devices 100 access the fingerprint authentication server 2200 to then send and receive packet data. In other words, the communication network 2300, according to an embodiment of the present invention, may be configured by wired or wireless communication, and may be configured by various communication networks, such as a local area network (LAN), a metropolitan area network (MAN), or a wide area network (WAN). Preferably, the communication network 2300 in the present specification may be the well-known Internet or World Wide Web (WWW). However, the communication network 2300 is not limited thereto, and the communication network, at least in part, may include the conventional wired and wireless data communication networks, the conventional telephony network, or the conventional wired and wireless television communication networks.

Figure 22:
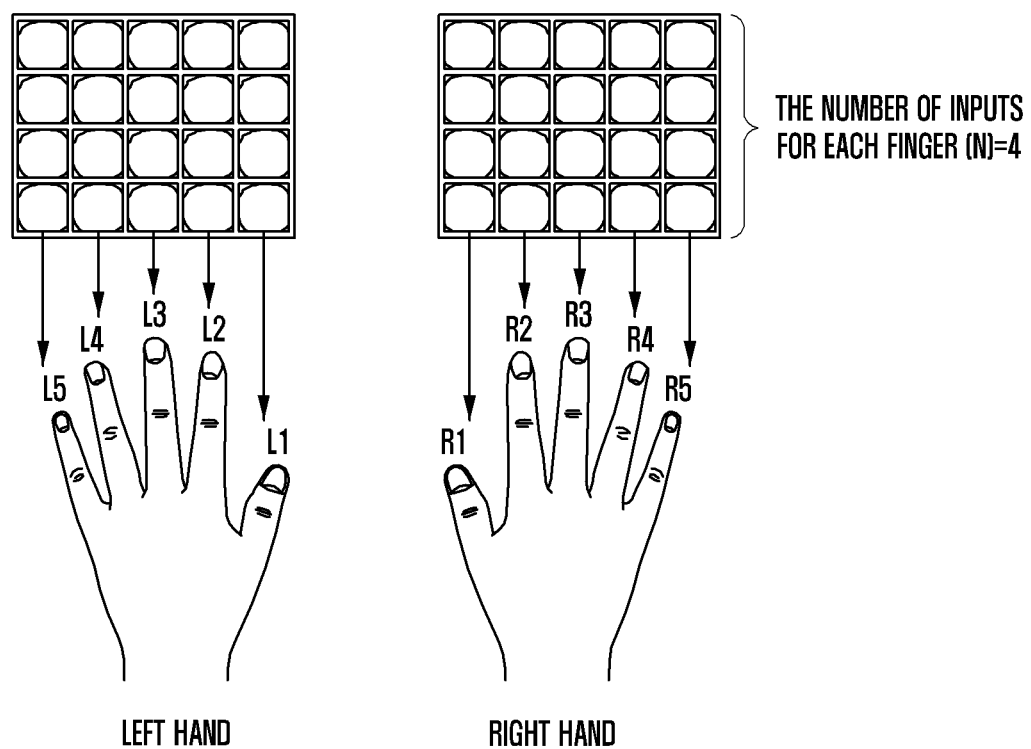
FIG. 22 is an exemplary diagram of user's fingerprint templates for the fingerprint authentication, according to an embodiment of the present invention.

FIG. 22 illustrates the user's fingerprint templates for the fingerprint authentication, according to an embodiment of the present invention.

The user's fingerprint is required to be registered in order to create the fingerprint templates. Identifiers to distinguish between the fingers may be specified for each finger. In FIG. 22, L1 to L5 indicate the thumb to the little finger of the left hand, respectively, and R1 to R5 indicate the thumb to the little finger of the right hand, respectively.

In addition, the fingerprint is scanned and stored for each finger in order to create the fingerprint templates. At this time, feature points of the fingerprint may be extracted and stored instead of the scanned image of the fingerprint for each finger. The number of fingerprint-scans (N) in order to create fingerprint templates is not limited, and the embodiment of FIG. 22 shows 4 fingerprint-scans. In general, as the number of fingerprint-scans (N) increases, the fingerprint authentication success rate becomes higher. However, as the number of fingerprint-scans (N) increases, the number of fingerprint templates increases, which may reduce the fingerprint authentication rate and may deteriorate the usability.

Figure 23:
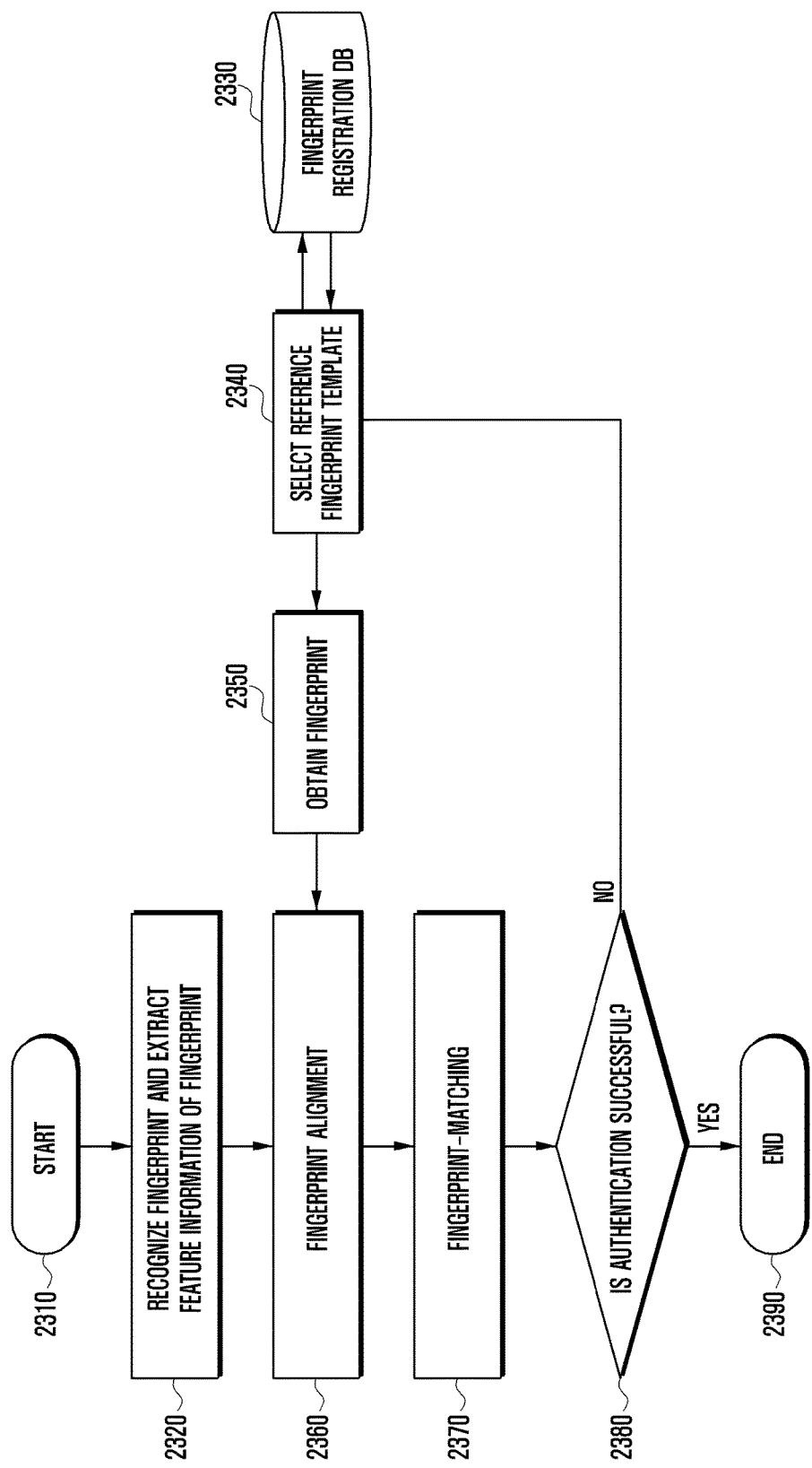
FIG. 23 is another flowchart showing a biometrics-based authentication method, according to another embodiment of the present invention.

FIG. 23 is another flowchart showing the biometrics-based authentication method, according to another embodiment of the present invention.

At this time, a plurality of matching schemes, which are separated depending on the status of the electronic device 100, may use different fingerprint templates according to the status of the electronic device 100. For example, if it is determined that the user is highly likely to use the fingers of the left hand based on the status information on the electronic device 100, the electronic device may select the left hand finger templates as the reference fingerprint templates first, and if it is determined that the user is highly likely to use the index finger, the electronic device may select the index finger templates as the reference fingerprint templates first.

Referring to FIG. 23, the start 2310 of the fingerprint authentication process means a process of activating the fingerprint recognition sensor 121 and preparing the fingerprint recognition process. At this time, the fingerprint recognition sensor 121 may be activated by automatically detecting the user's finger touch, or may be configured to be activated by allocating specific function keys.

Next, the fingerprint recognition sensor 121 recognizes and scans the user's fingerprint in contact with the sensor to then extract the feature information of the user's fingerprint from the scanned fingerprint image 2320.

When the feature information of the user's fingerprint is extracted, in order to identify the user's fingerprint, the electronic device selects the fingerprint template to be matched with the feature information of the user's fingerprint from among the fingerprint templates stored in the fingerprint registration DB 2330 (2340). After selecting the fingerprint template, the electronic device obtains the fingerprint to be compared with the recognized fingerprint through the sensor, from the selected fingerprint template (2350).

If separate information for selecting the fingerprint template is not provided, the fingerprint template may be selected randomly or according to a preset order.

The feature information of the recognized fingerprint and the feature information of the fingerprint obtained from the fingerprint template are to be aligned prior to being compared with each other (2360). A reference is required to compare two pieces of feature information, and according to this, the alignment may be made.

The features for aligning the fingerprints may include a core and a delta. Two pieces of fingerprint data are aligned based on the position and direction of the core on the assumption that most of the fingerprints have the cores. In the case of fingerprints that have both the core and the delta, the object may be rotated based on the direction of the line that passes through the core and delta. However, this method is limited because not all fingerprints have both the core and the delta.

After aligning the fingerprints, the electronic device performs a fingerprint-matching operation in which the feature points of the aligned fingerprints are compared (2370). The fingerprint-matching is performed by using the feature information of the fingerprint extracted through the feature information extraction operation 2320. Therefore, the matching operation has a close relationship with the feature information extraction algorithm, and they play a complementary role to each other. For example, even if the feature information extraction process is not perfect, the matching rate may be improved through the matching process.

The fingerprint-matching is conducted by comparing the recognized fingerprint with the feature information of the fingerprint selected from the DB and calculating the correlation of the feature points that are positioned in a similar area. A plurality of reference feature points may be provided with respect to a single feature point, and the efficiency of the matching may be improved by using the features, such as end points or bifurcation points.

If the correlation is high as a result of comparing the recognized fingerprint with the feature information of the fingerprint selected from the DB, the possibility in which the two fingerprints are the same (that is, the user is the registered user) increases. The matching result may be usually expressed as a match score between 0 and 1, and the higher the match score is, the higher the reliability of the matching result is.

If the match score calculated from the matching result is equal to or more than a preset threshold, the fingerprint authentication is determined to be successful, and if the match score calculated from the matching result is less than the preset threshold, the fingerprint authentication is determined to be a failure (2380).

If the threshold is configured to be high, the reliability of the matching result increases. However, if the threshold is configured to be high, the number of authentication failures increases, which brings about a reduction in the rate, an increase in the system load, and the degradation of the usability. On the contrary, when the threshold is configured to be low, the possibility of the determination on the authentication success increases with respect to the same result, but the reliability of the matching result is lowered.

When the fingerprint authentication is successful, the user is determined to be eligible to use the electronic device 100. When the user is determined to be eligible, according to the embodiment, the locked state of the electronic device 100 may be released or the user is authorized to access all of the functions of the electronic device 100.

If the fingerprint authentication is determined to have failed, the fingerprint template selecting operation 2340 and the reference fingerprint obtaining operation 2350 may be repeated, considering that even though the user is eligible, the fingerprint template may be incorrectly selected. At this time, the number of repeat times (M) may be configured by the system or the user, and if the number of authentication failures exceeds the preset number of times (M), it may be determined that the user is not the registered user. If the user is determined to not be the registered user, in accordance with the embodiment, the locked state of the electronic device 100 may be maintained or the user may be permitted to access specific functions of the electronic device 100.

The fingerprint recognition sensor 121 is disabled, and a fingerprint recognition end operation 2390 is conducted. At this time, like the fingerprint authentication start operation 2310, in the fingerprint authentication end operation 2390, the fingerprint recognition sensor 121 may be configured to be deactivated by allocating specific function keys, and the fingerprint recognition sensor 121 may be configured to be automatically deactivated when the fingerprint authentication is determined to be successful as a result of the authentication success determination 2380.

If separate information for selecting the fingerprint template is not provided, the fingerprint template may be selected randomly or according to a preset order, as described above. In the case of the fingerprint template DB that stores N sets of templates for a single user, 10*N matching operations may be required in the worst case.

Moreover, the number of the reference fingerprint templates stored in the fingerprint registered DB may considerably increase when a plurality of users use a single electronic device 100 that stores the fingerprint registration DB, or in the multi-user environment, such as the server-based fingerprint authentication system in which the server, which stores the fingerprint registered DB, transmits the user authentication result to the electronic device 100.

In this case, if the reference fingerprint template or the fingerprint is not correctly selected, since the operations of the fingerprint template selection 2340 to the authentication success determination 2380 are repeated so many times, the system load is increased so that the response rate and the usability may be deteriorated. Therefore, when the fingerprint templates or the fingerprints (fingers) are correctly selected, the authentication rate and the system performance may be improved.

In the case of using fingerprint template selection information for selecting the fingerprint template, the fingerprint authentication may be more quickly conducted by intelligently selecting the reference fingerprint template. At this time, the fingerprint template selection information may be determined based on at least one of the status information on the electronic device 100 or the fingerprint authentication history.

For example, if it is determined that the user is highly likely to use the fingers of the left hand based on the status information on the electronic device 100, the electronic device may select the left hand finger templates as the reference fingerprint templates first in order to thereby reduce the comparative objects to 50%. In addition, if it is determined that the user is highly likely to use the index finger based on the status information on the electronic device 100, the electronic device may select the index finger templates as the reference fingerprint templates first in order to thereby reduce the comparative objects to 20%.

In addition, considering that the users tend to habitually use the same finger when using of the electronic device 100, the electronic device 100 may select the template of the finger that is most frequently used as the reference fingerprint template in consideration of the fingerprint authentication history in order to thereby improve the authentication rate.

Hereinafter, the operation of the electronic device 100 will be described with reference to FIG. 24 and FIG. 25.

Figure 24:
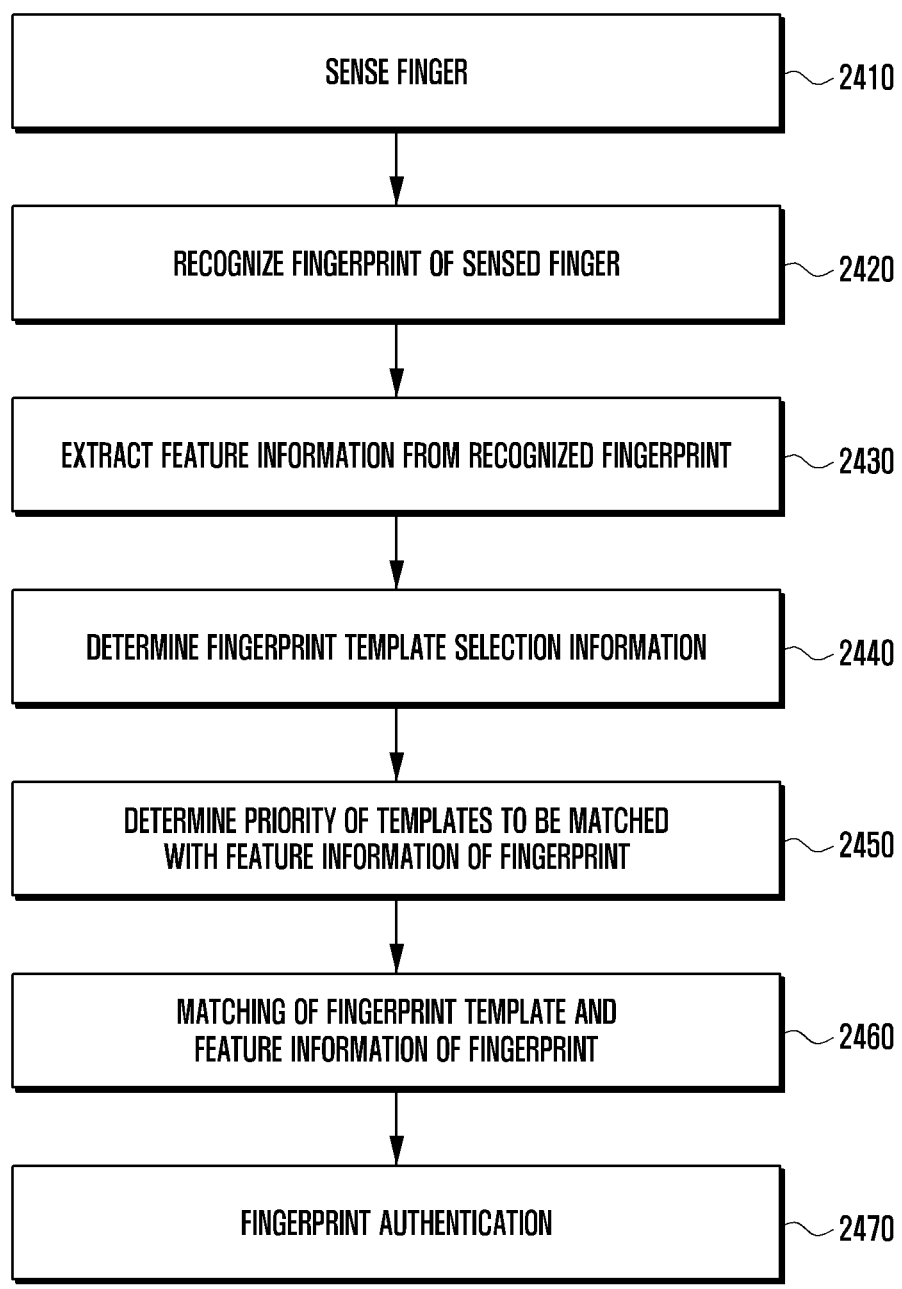
FIG. 24 is a flowchart illustrating the operation of an electronic device, according to an embodiment of the present invention.

FIG. 24 is a flowchart showing the operation of the electronic device 100, according to an embodiment of the present invention.

The electronic device 100 senses the user's finger through the fingerprint recognition sensor 121 (2410), and recognizes and scans the fingerprint of the sensed finger (2420). The fingerprint scan image may not be suitable for the fingerprint-matching because it contains a variety of information as well as the information necessary for the fingerprint-matching. Accordingly, the feature information of the fingerprint is to be extracted from the fingerprint scan image (2430).

The operation of extracting the feature information of the fingerprint (2430) may include pre-processing, such as eliminating noises from the fingerprint scan image, binarization, smoothing, or fining, and post-processing, such as extracting the feature points from the fined ridges, or removing pseudo-feature points from the extracted feature points.

After the extraction of the feature information of the recognized fingerprint, the electronic device 100 determines the fingerprint template selection information (2440). The fingerprint template selection information is determined based on at least one piece of the status information on the electronic device 100 or the authentication history information. The status information on the electronic device 100 may be determined by using a gyro sensor or a stylus, which is to be described later, and may be determined based on the configuration information on the electronic device 100, but it is not limited thereto.

When the fingerprint template selection information is determined, the electronic device 100 determines the priority of the reference fingerprint templates to be matched with the feature information of the fingerprint based on the fingerprint template selection information (2450). For example, if it is determined that the user is highly likely to use the fingers of the left hand based on the status information on the electronic device 100, the electronic device may select the left hand finger templates (L1 to L5 in FIG. 2) as the fingerprint templates to be matched first, and if it is determined that the user is highly likely to use the index finger, the electronic device may select the index finger templates (R2 and L2 in FIG. 2) as the fingerprint templates to be matched first.

When the priority of the reference fingerprint templates to be matched with the feature information of the fingerprint is determined, the electronic device 100 aligns the feature information of the recognized fingerprint and the fingerprint templates according to the priority, and performs the fingerprint-matching (2460). The fingerprint-matching is conducted by comparing the recognized fingerprint with the feature information of the fingerprint selected from the DB and calculating the correlation of the feature points that are positioned in a similar area after the alignment. A plurality of reference feature points may be provided with respect to a single feature point, and the efficiency of the matching may be improved by using the features, such as end points or bifurcation points.

The fingerprint-matching is conducted by using the feature information extracted through the feature information extracting operation of the fingerprint. Therefore, the matching operation has a close relationship with the feature information extraction algorithm, and they play a complementary role to each other. For example, even if the feature information extraction process is not perfect, the matching rate may be increased through the matching process.

The electronic device 100 determines the fingerprint authentication success or failure by using the fingerprint-matching result (2470). If the correlation is high as a result of comparing the recognized fingerprint with the feature information of the fingerprint selected from the DB, the possibility in which the two fingerprints are the same (that is, the user is the registered user) increases. The matching result may be usually expressed as a match score between 0 and 1, and the higher the match score is, the higher the reliability of the matching result is.

If the match score calculated from the matching result is equal to or more than a preset threshold, the electronic device 100 may determine that the authentication is successful, and if the match score calculated from the matching result is less than the preset threshold, the electronic device 100 may determine that the authentication has failed.

When the fingerprint authentication is successful, the user is determined to be eligible to use the electronic device 100. When the user is determined to be eligible, according to the embodiment, the locked state of the electronic device 100 may be released or the user is authorized to access all of the functions of the electronic device 100.

If it is determined that the fingerprint authentication has failed, the fingerprint template selecting operation and the reference fingerprint obtaining operation may be repeated, considering that even though the user is eligible, the fingerprint template may be incorrectly selected. At this time, the number of repeat times (M) may be configured by the system or the user, and if the number of authentication failures exceeds the preset number of times (M), it may be determined that the user is not the registered user. If the user is determined to not be the registered user, in accordance with the embodiment, the locked state of the electronic device 100 may be maintained or the user may be permitted to access specific functions of the electronic device 100.

A method for determining the fingerprint template selection information by using the status information on the electronic device 100 will be described with reference to FIG. 25 to FIG. 28.

Figure 25:
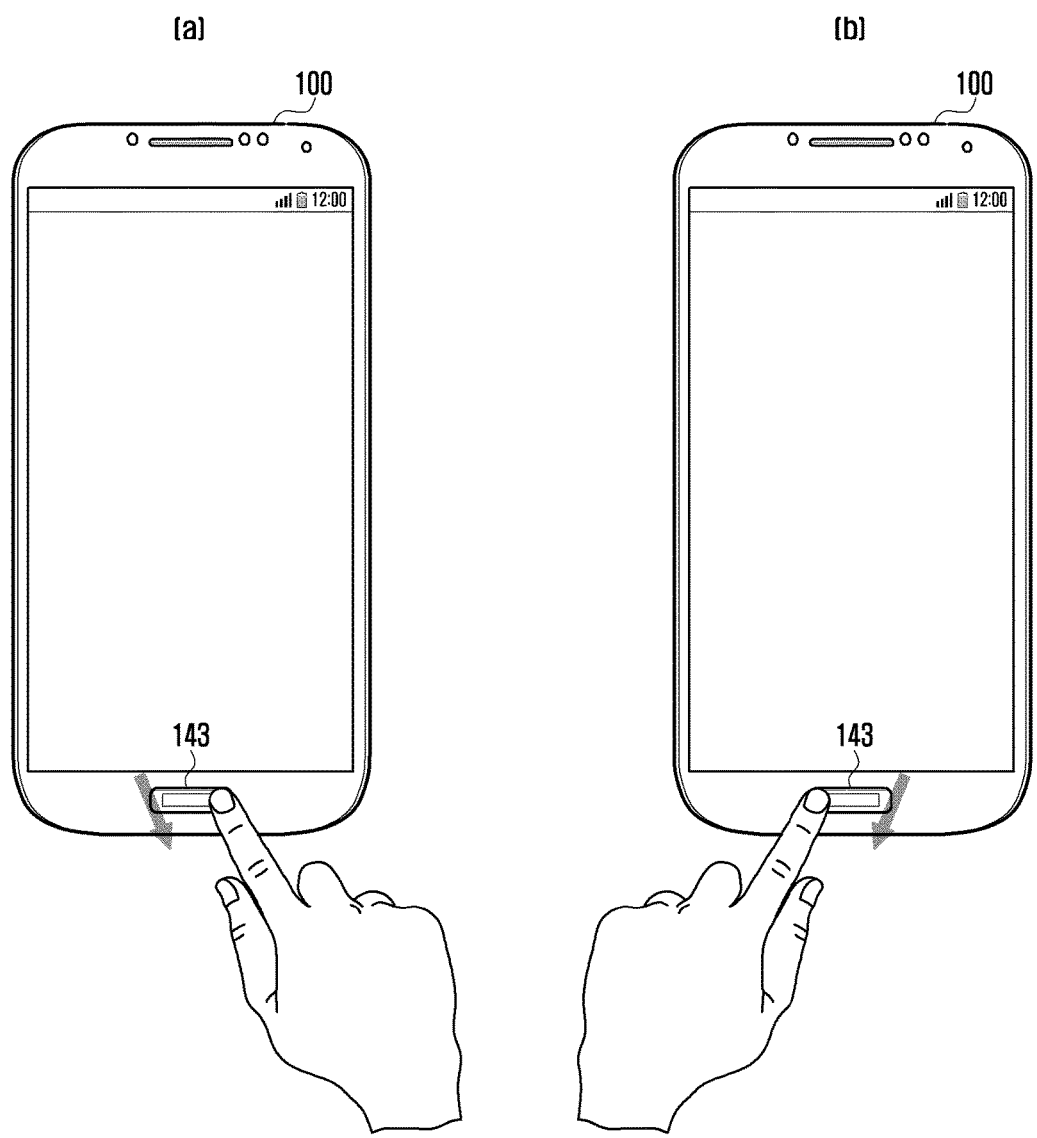
FIG. 25 is an exemplary view illustrating a method for determining fingerprint template selection information by using status information on an electronic device, according to an embodiment of the present invention.

FIG. 25 is an exemplary view illustrating a method for determining the fingerprint template selection information by using the status information on the electronic device 100, according to an embodiment of the present invention.

At this time, a plurality of matching schemes, which are distinguished depending on the status of the electronic device 100, may be distinguished by the direction in which the fingerprint recognition sensor is positioned when the electronic device 100 is in a horizontal mode. For example, in the case where the fingerprint recognition sensor 121 is positioned on the right of the user, one of the plurality of matching schemes may be a scheme that uses right fingerprint templates first. On the contrary, in the case where the fingerprint recognition sensor 121 is positioned on the left of the user, one of the plurality of matching schemes may be a scheme that uses left fingerprint templates first.

FIG. 25 shows the embodiment of a method in which direction information of the electronic device 100 among the status information on the electronic device 100 is utilized, and FIG. 25 shows two cases where the electronic devices 100 are placed horizontally. In the case in which the fingerprint recognition sensor 121 is attached to the button 143 of the electronic device 100, since the button 143 is positioned on the right of the user in the state of FIG. 25(a), it is natural for the user to touch the button 143 with a right hand. Therefore, the right fingerprint templates may be selected first for the matching operation in order to thereby secure a high probability of authentication success.

In the case in which the fingerprint recognition sensor 121 is attached to the button 143 of the electronic device 100, since the button 143 is positioned on the left of the user in the state of FIG. 25(b), it is natural for the user to touch the button 143 with a left hand. Therefore, the left fingerprint templates may be selected first for the matching operation in order to thereby secure a high probability of authentication success.

The fingerprint recognition sensor 121 may be provided in a one-dimensional or two-dimensional form, and may be provided at other positions rather than the button 143, or may be provided inside the TFT LCD to be exposed on the screen.

The posture of the electronic device 100 may be determined by using a gyro sensor or a tilt sensor, but it is not limited thereto.

In general, the gyro sensor is widely used in the electronic device. The gyro sensor may sense the rotational inertia by detecting the angular velocity to obtain the rotation angle. The gyro sensor always senses the direction of gravity to thereby act as a tilt sensor when no external impact is applied. The gyro sensor is referred to as a gyroscope as well, and may be divided into a mechanical gyro, an optical gyro, and a vibrating gyro according to the operation type.

Figure 26:
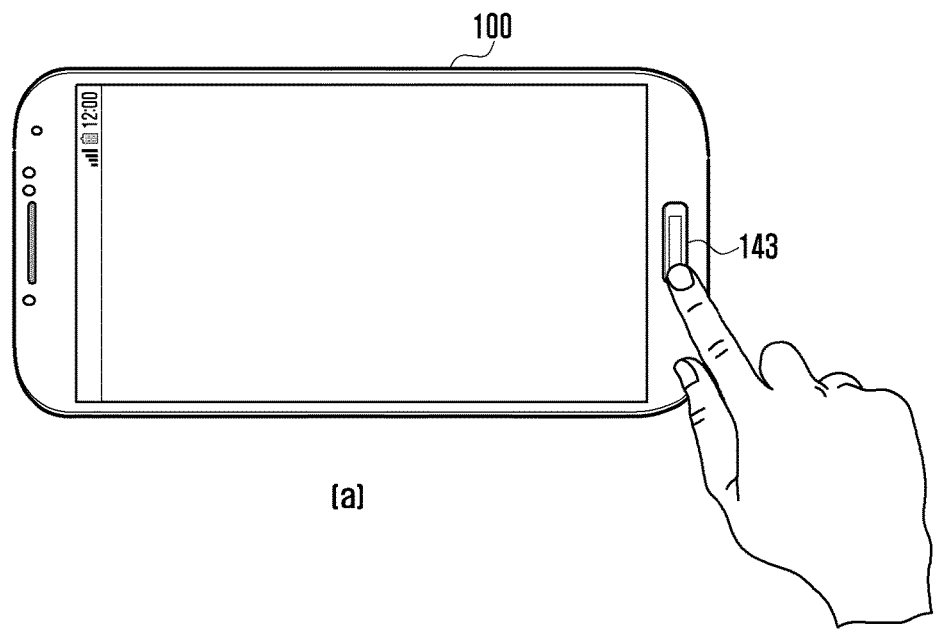
FIG. 26 is an exemplary view illustrating a method for determining fingerprint template selection information by using status information on an electronic device, according to another embodiment of the present invention.
Figure 26:
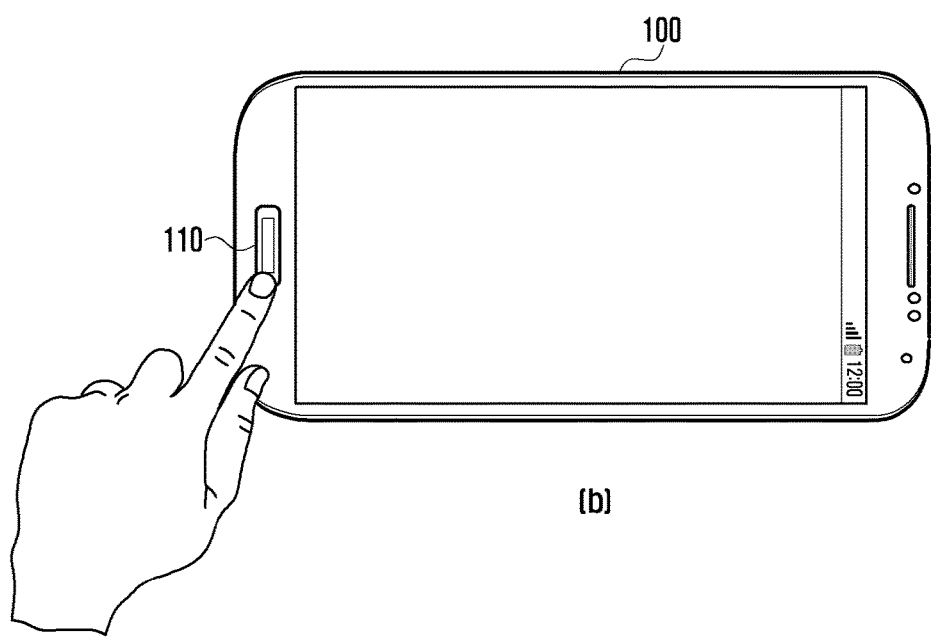

FIG. 26 is an exemplary view illustrating a method for determining the fingerprint template selection information by using the status information on the electronic device 100, according to another embodiment of the present invention.

At this time, a plurality of matching schemes, which are distinguished depending on the status of the electronic device 100, may be distinguished by the direction in which the finger input is received on the fingerprint recognition sensor 121 of the electronic device 100 (for example, the rubbing direction of the finger on the fingerprint recognition sensor 121). For example, in the case where the finger input is received in the direction from the upper left portion to the lower right portion, one of the plurality of matching schemes may be a scheme that uses right fingerprint templates first. On the contrary, in the case where the finger input is received in the direction from the upper right portion to the lower left portion, one of the plurality of matching schemes may be a scheme that uses left fingerprint templates first.

FIG. 26 shows the embodiment of a method of using skew information among the status information of the electronic device 100, and here, the skew information refers to the information on the rubbing direction of the finger on the fingerprint recognition sensor 121.

In the case in which the fingerprint recognition sensor 121 is attached to the button 143 of the electronic device 100, when the input is received in the direction from the upper left portion to the lower right portion as shown in FIG. 8(a), the input is highly likely to be made by using the user's right hand. Therefore, the right fingerprint templates may be selected first for the matching operation in order to thereby secure a high probability of authentication success.

On the contrary, in the case in which the fingerprint recognition sensor 121 is attached to the button 143 of the electronic device 100, when the input is received in the direction from the upper right portion to the lower left portion as shown in FIG. 8(b), the input is highly likely to be made by using the user's left hand. Therefore, the left fingerprint templates may be selected first for the matching operation in order to thereby secure a high probability of authentication success.

At this time, the skew information may be obtained by a proximity touch function (hovering function), as well as a direct touch with respect to the fingerprint recognition sensor 121, i.e., the button 143.

Moreover, the skew information may be obtained by using a camera sensor that is positioned around the fingerprint recognition sensor 121, i.e., the button 143. In this case, the finger of the user may be photographed to obtain an image, and the image may be analyzed in order to thereby determine the direction of the finger.

Figure 27:
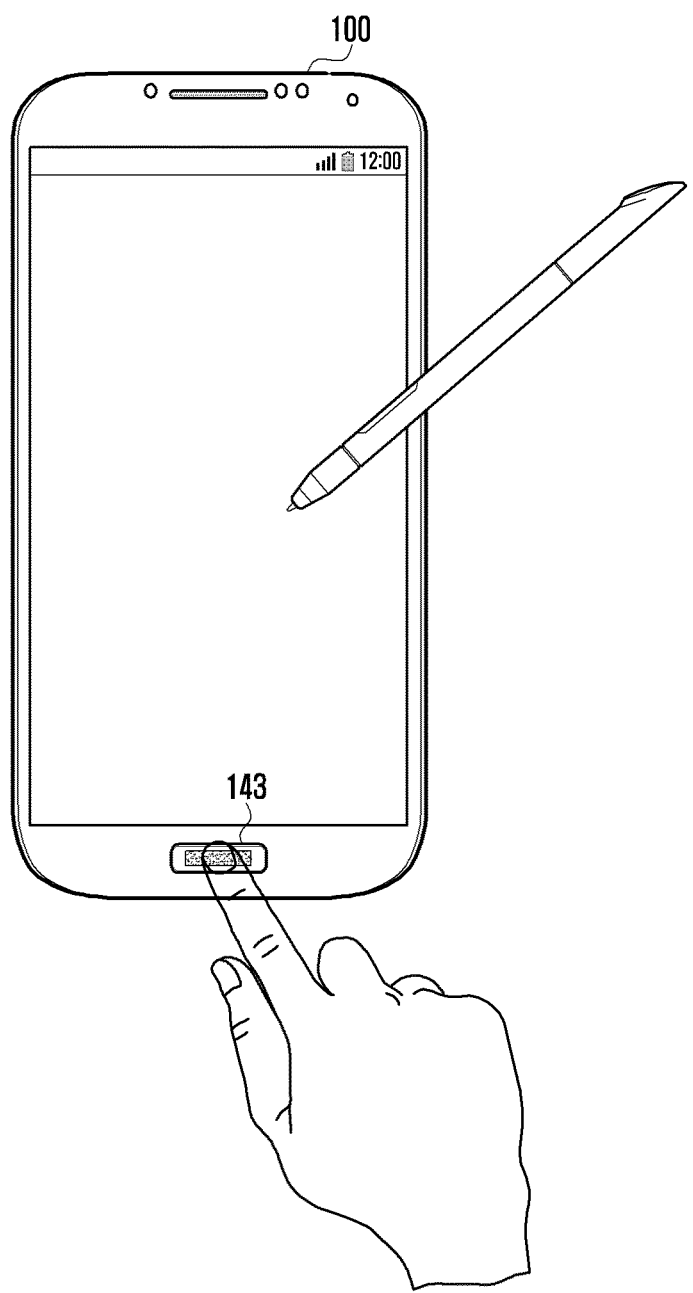
FIG. 27 is an exemplary view illustrating a method for determining fingerprint template selection information by using status information on an electronic device, according to another embodiment of the present invention.

FIG. 27 is an exemplary view illustrating a method for determining the fingerprint template selection information by using the status information on the electronic device, according to another embodiment of the present invention.

At this time, a plurality of matching schemes, which are distinguished depending on the status of the electronic device 100, may be distinguished by the attachment or detachment of a stylus that is provided at a specific position of the electronic device 100. For example, if it is recognized that the stylus is detached, one of the plurality of matching schemes may be a scheme that uses index fingerprint templates first. On the contrary, if it is recognized that the stylus is not detached, one of the plurality of matching schemes may be a scheme that uses other finger fingerprint templates rather than the index finger first.

FIG. 27 shows a method of using the information on the attachment or detachment of the stylus among the status information on the electronic device 100, and this method is useful in the case where the stylus is mounted on the electronic device 100.

In the case of the electronic device 100 that accepts the stylus therein, a specific position is fixed to mount the stylus on the electronic device 100, and if the stylus is detached from the corresponding position, the electronic device may recognize the same. When the stylus is determined to be detached, it may be assumed that the user is holding the stylus. In this case, it may be convenient for the user to conduct the fingerprint recognition by using an index finger rather than other fingers.

Therefore, when the stylus is detached from the electronic device 100, it may be assumed that the user conducts the fingerprint recognition by using the index finger, and the index fingerprint templates may be selected first for the matching operation in order to thereby secure a high probability of authentication success.

Figure 28:
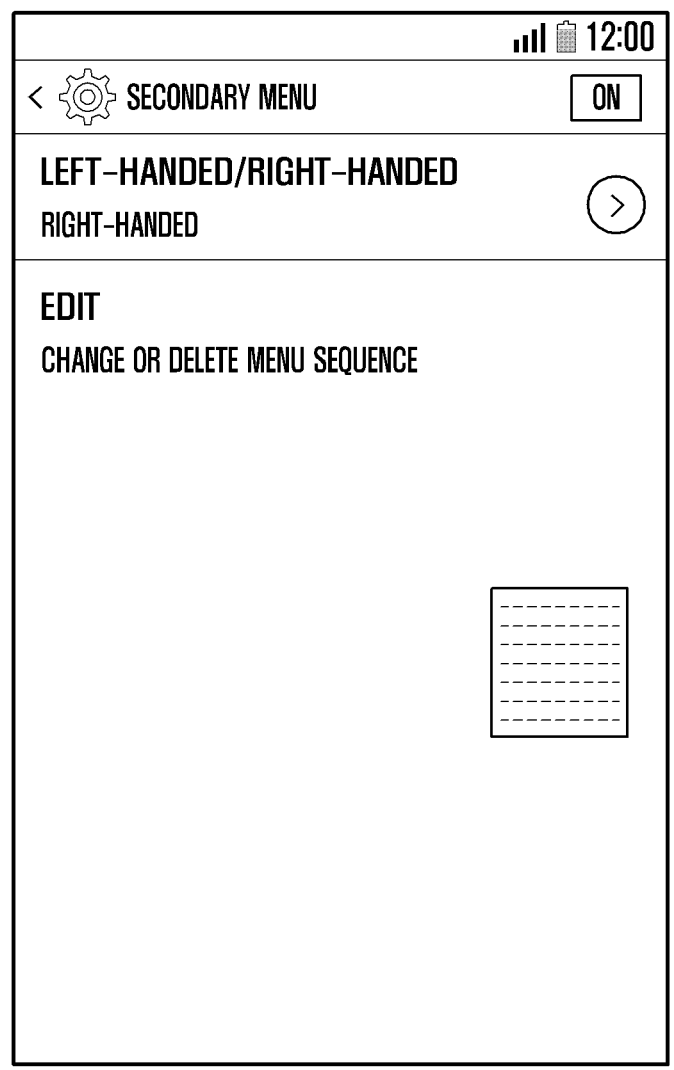
FIG. 28 is an exemplary view illustrating a method for determining fingerprint template selection information by using status information on an electronic device, according to another embodiment of the present invention.

FIG. 28 is an exemplary view illustrating a method for determining the fingerprint template selection information by using the status information on the electronic device 100, according to another embodiment of the present invention.

FIG. 28 shows the embodiment of a method of using configuration information among the status information on the electronic device 100.

At this time, a plurality of matching schemes, which are distinguished depending on the status of the electronic device 100, may be distinguished by the configuration information of the electronic device 100. For example, the plurality of matching schemes may be distinguished based on the configuration information about whether the user is left-handed or right-handed, which is configured by the user through the configuration menu. In this case, if the user is left-handed, one of the plurality of matching schemes may be a scheme that uses left fingerprint templates first. On the contrary, if the user is right-handed, one of the plurality of matching schemes may be a scheme that uses right fingerprint templates first.

The user may configure whether or not the user is left-handed or right-handed through the configuration menu of the electronic device 100. By using the information on the left-handed/right-handed user, which is configured through the configuration menu, the left hand templates may be selected first for the left-handed user, and the right hand templates may be selected first for the right-handed user.

In the embodiment shown in FIG. 28, since the user is configured to use a right hand, it is effective to select the right hand templates for the fingerprint authentication.

According to another embodiment of the present invention, the status information on the electronic device 100 and other status information on the electronic device 100 may be used together. For example, if the user is left-handed and the stylus is determined to be detached as shown in the embodiment of FIG. 28, the user is highly likely to hold the electronic device and the stylus with the right hand and the left hand, respectively, and the fingerprint authentication, by using a left index hand, may have a high probability of authentication success.

Therefore, it is effective to first select templates of the left index finger for the matching.

In addition, although it is not shown in the drawings, according to another embodiment of the present invention, it is possible to use the information on the hand that is holding the electronic device 100 among the status information on the electronic device 100.

At this time, a plurality of matching schemes, which are distinguished depending on the status of the electronic device 100, may be distinguished by a right hand or a left hand, which is holding the electronic device 100. For example, if the right hand is holding the electronic device 100, one of the plurality of matching schemes may be a scheme that uses left hand fingerprint templates first. On the contrary, if the left hand is holding the electronic device 100, one of the plurality of matching schemes may be a scheme that uses right hand fingerprint templates first.

For example, in the case where the electronic device 100 is placed horizontally, when the user holds the electronic device 100 with the right hand, the left end of the electronic device moves in a large radius by the wrist movement, and on the contrary, when the user holds the electronic device 100 with the left hand, the right end of the electronic device moves in a large radius due to the wrist movement. Such radial movement of the electronic device 100 may be detected by using a gyro sensor or a tilt sensor, but it is not limited thereto.

If the user is holding the electronic device 100 with one hand, it may be assumed that the user may perform the fingerprint authentication by using the other hand, and a more accurate estimation of the fingers may be made by using other status information described above together.

Figure 29:
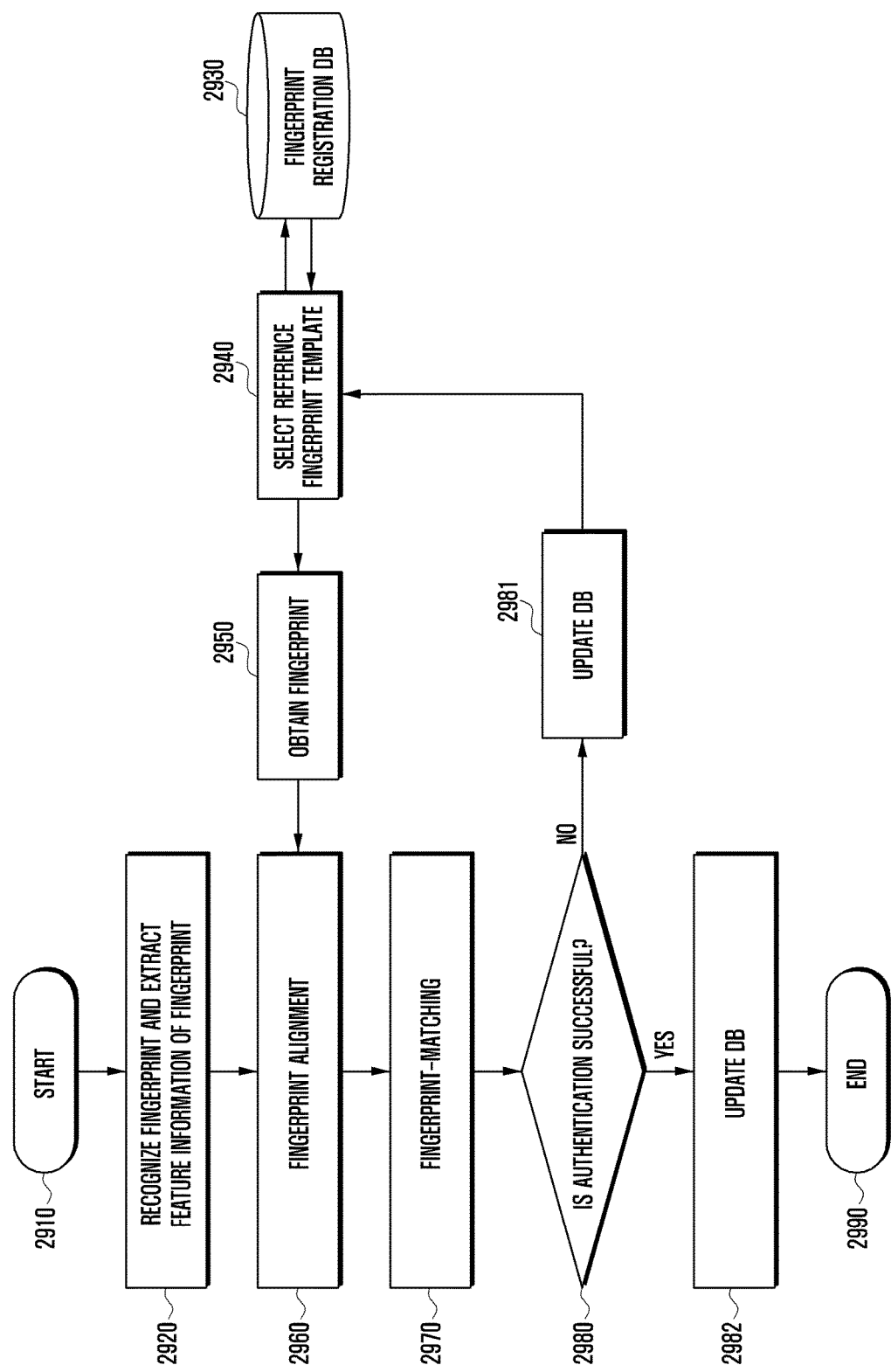
FIG. 29 is a flowchart of a method for updating the fingerprint template selection probability, according to an embodiment of the present invention.

FIG. 29 is a flowchart of a method for updating the fingerprint template selection probability, according to an embodiment of the present invention.

FIG. 29 shows the embodiment of a method of selecting the fingerprint templates by using the probability used for the authentication of a specific finger and updating the probability based on the result.

The fingerprint template selection information may be determined by using the fingerprint authentication history information as well as the status information on the electronic device 100, or typically, by the probability in which a specific finger is used for the authentication. When using the fingerprint authentication function, the user is highly likely to use a specific finger. Such information may be stored in the templates of the fingerprint registration DB to then be used for the selection of the templates.

The start (2910) of the fingerprint authentication process means a process of activating the fingerprint recognition sensor 121 and preparing the fingerprint recognition process. At this time, the fingerprint recognition sensor 121 may be activated by automatically detecting the user's finger touch, or may be configured to be activated by allocating specific function keys.

Next, the fingerprint recognition sensor 121 recognizes and scans the user's fingerprint in contact with the sensor in order to thereby extract the feature information of the user's fingerprint from the scanned fingerprint image (2920). As described above, the operation of scanning the user's fingerprint and extracting the feature information may include the pre-processing and the post-processing, and the feature information may include bifurcation points, end points, cores, or deltas, but it is not limited thereto.

When the feature information of the user's fingerprint is extracted, in order to identify the user's fingerprint, the electronic device selects a reference fingerprint template corresponding to the fingerprint template of the corresponding user from among the information stored in the fingerprint registration DB 2930 (2940). In addition, the electronic device obtains the fingerprint to be compared with the fingerprint recognized through the sensor, from the reference fingerprint template (2950).

The present embodiment is different from the embodiment of FIG. 23 in that the highest selection probability of the fingerprint template is selected from among the fingerprint templates of the user when selecting the fingerprint template. For example, in the case where ten fingers of the user have the selection probabilities of P1 to P10 based on the authentication history, the template of the i-th finger that has the highest probability Pi may be selected first.

Afterwards, the recognized fingerprint and the template information of the i-th finger are aligned (2960), and the matching operation is performed with respect to the same (2970). If a match score, which is calculated from the matching result, is equal to or more than a preset threshold, the control unit 130 may generate an authentication success event, and if the match score, which is calculated from the matching result, is less than the preset threshold, the control unit 130 may generate an authentication failure event The present embodiment is different from the embodiment of FIG. 23 in that the selection probabilities of P1 to P10 for the ten fingers of the user may be updated according to the authentication success or authentication failure. If the template of the i-th finger is selected and the fingerprint authentication thereof is successful, the selection probability Pi may increase and the selection probabilities of other fingers may be slightly reduced (2982). If the template of the i-th finger is selected and the fingerprint authentication thereof fails, the selection probability Pi may be reduced and the selection probabilities of other fingers may slightly increase (2981).

The subsequent operations may be similar to the embodiment of FIG. 3. When the fingerprint authentication is successful, the user is determined to be eligible to use the electronic device 100. When the user is determined to be eligible, according to the embodiment, the locked state of the electronic device 100 may be released or the user is authorized to access all of the functions of the electronic device 100.

If it is determined that the fingerprint authentication has failed, the reference fingerprint template selecting operation 2940 and the reference fingerprint obtaining operation 2950 may be repeated M times. At this time, the reference fingerprint template and the reference fingerprint may be selected from among the remaining fingers, except for the finger that has already been compared, in the order of high selection probability. Finally, if the user is determined to not be the registered user, in accordance with the embodiment, the locked state of the electronic device 100 may be maintained or the user may be permitted to access specific functions of the electronic device 100.

The fingerprint recognition sensor 121 is disabled, and a fingerprint recognition end operation 2990 is conducted. At this time, like the fingerprint authentication start operation 2910, in the fingerprint authentication end operation 2990, the fingerprint recognition sensor 121 may be configured to be deactivated by allocating specific function keys, and the fingerprint recognition sensor 121 may be configured to be automatically deactivated when the fingerprint authentication is determined to be successful as a result of the authentication success determination 2980.

The embodiments described above, among the embodiments according to the present invention, relate to the fingerprint registration DB that is included in the electronic device 100. However, in the server-based fingerprint authentication system, according to another embodiment of the present invention, the fingerprint registration DB may be provided in an external server other than the electronic device 100, and in this case, the electronic device 100 may receive the information on the fingerprint templates from the external server that has the fingerprint registration DB.

In addition, in the server-based fingerprint authentication system, according to another embodiment of the present invention, the fingerprint registration DB may be provided in an external server other than the electronic device 100, and the external server may be a fingerprint authentication server that stores the fingerprint registration DB and receives the feature information of the user's fingerprint transmitted from the electronic device 100 in order to thereby perform the fingerprint authentication process.

In general, the electronic device 100 tends to be small and light, so the memory capacity and the battery capacity are limited, and the increase in the processed data may reduce the data processing rate. Therefore, the electronic device 100 may process only the feature information of the fingerprint recognized through the fingerprint recognition sensor 121 and the template information to then transmit the same to the fingerprint authentication server, and subsequent data processing may be conducted by the fingerprint authentication server. The electronic device 100 may receive only a fingerprint authentication result from the fingerprint authentication server so that the usability of the fingerprint authentication system using the electronic device 100 may be improved.

Figure 30:
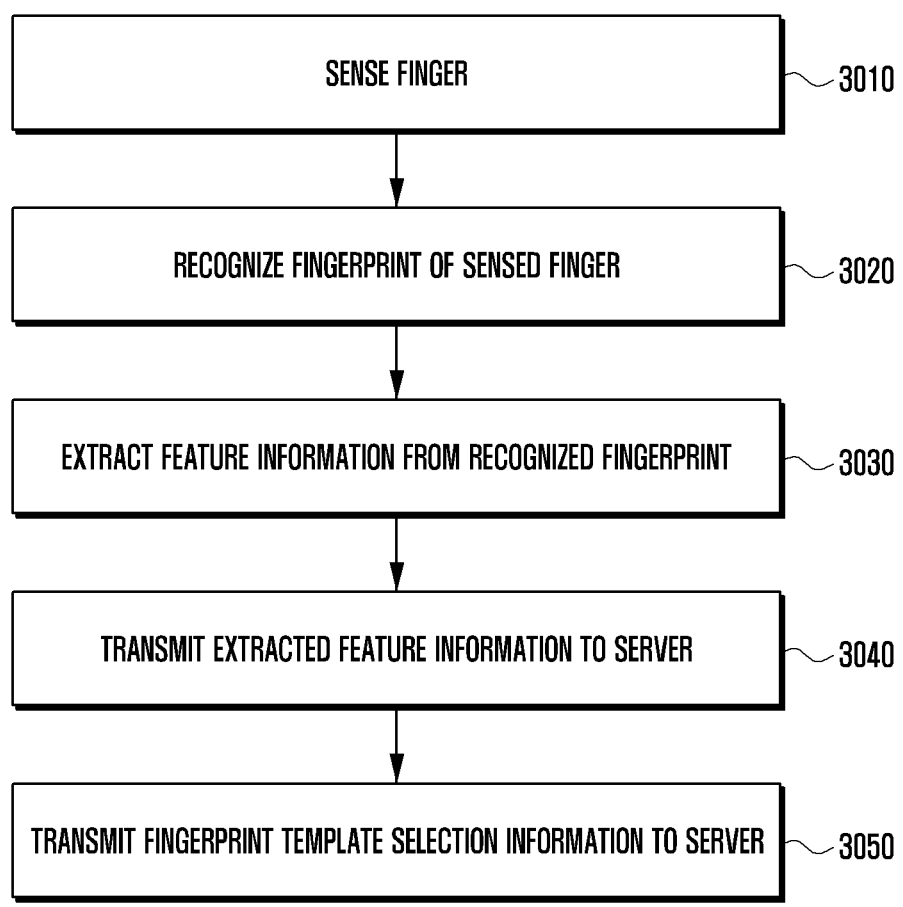
FIG. 30 is a flowchart illustrating the operation of an electronic device, according to another embodiment of the present invention.

FIG. 30 is a flowchart showing the operation of the electronic device 100, according to another embodiment of the present invention.

The electronic device 100 senses the user's finger through the fingerprint recognition sensor 121 (3010), and recognizes and scans the fingerprint of the sensed finger (3020). The fingerprint scan image may not be suitable for the fingerprint-matching because it contains a variety of information as well as the information necessary for the fingerprint-matching. Accordingly, the feature information of the fingerprint is to be extracted from the fingerprint scan image (3030).

The operation of extracting the feature information of the fingerprint (3030), as described above, may include preprocessing, such as eliminating noise from the fingerprint scan image, binarization, smoothing, or fining, and postprocessing, such as extracting the feature points from the fined ridges or removing pseudo-feature points from the extracted feature points.

After the extraction of the feature information of the recognized fingerprint, the electronic device 100 determines the fingerprint template selection information. The fingerprint template selection information is determined based on at least one piece of the status information on the electronic device 100 or the authentication history information. The status information on the electronic device 100 may be determined by using a gyro sensor and a stylus, which is to be described later, and may be determined based on the configuration information of the electronic device 100, but it is not limited thereto.

When the fingerprint template selection information is determined, the electronic device transmits the extracted feature information of the fingerprint (3340) and the fingerprint template selection information (3050) to the fingerprint authentication server.

Although it is not shown in FIG. 30, after that, the electronic device 100 determines the electronic device access authority of the user who has attempted the fingerprint authentication by using a fingerprint authentication result received from the fingerprint authentication server 200.

When the fingerprint authentication is successful, the user is determined to be eligible to use the electronic device 100. When the user is determined to be eligible, according to the embodiment, the locked state of the electronic device 100 may be released or the user is authorized to access all of the functions of the electronic device 100.

If it is determined that the fingerprint authentication has failed, since the user is not the registered user, according to the embodiment, the locked state of the electronic device 100 may be maintained or the user may be permitted to access specific functions of the electronic device 100.

Figure 31:
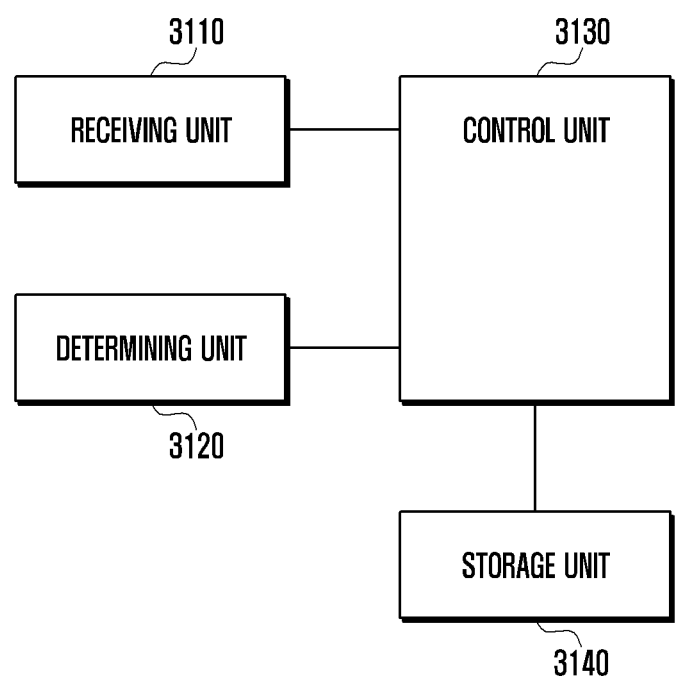
FIG. 31 illustrates the detailed configuration of a fingerprint authentication server, according to various embodiments.

FIG. 31 illustrates the detailed configuration of the fingerprint authentication server 2200, according to various embodiments.

As shown in FIG. 31, the fingerprint authentication server 2200, according to another embodiment of the present invention, includes a receiving unit 3110, a determining unit 3120, a control unit 3130, and a storage unit 3140.

The receiving unit 3110 receives, from the electronic device 100, the feature information of the recognized user fingerprint and the fingerprint template selection information, and transfers the fingerprint template selection information to the determining unit 3120.

The determining unit 3120 determines the priority of the templates to be matched with the feature information of the user's fingerprint from among the fingerprint templates of the fingerprint registration DB stored in the storage unit 1340, based on the fingerprint template selection information transmitted from the receiving unit 3110.

The storage unit 3140 stores a variety of information in order for the fingerprint authentication server 2200 to determine and display a variety of information necessary for the authentication of the user's fingerprint based on the fingerprint template selection information. In addition, the storage unit 3140 may store the fingerprint registration DB that contains the fingerprint templates for each user.

The control unit 3130 controls the overall operation of the fingerprint authentication server 2200, and controls the receiving unit 3110, the determining unit 3120, and the storage unit 3140 such that the fingerprint authentication server 2200 may perform the authentication of the user's fingerprint based on the fingerprint template selection information.

Figure 32:
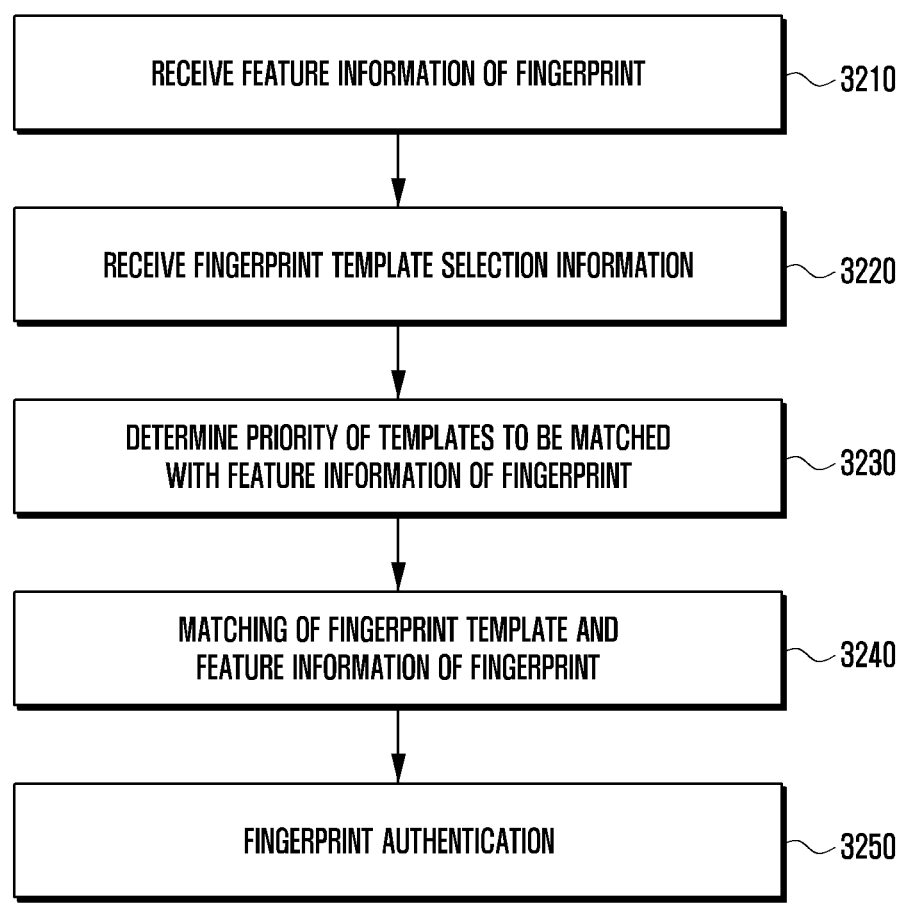
FIG. 32 is a flowchart illustrating the operation of a fingerprint authentication server, according to an embodiment of the present invention.

FIG. 32 is a flowchart showing the operation of the fingerprint authentication server 2200, according to an embodiment of the present invention.

The fingerprint authentication server 2200 receives the feature information of the user's fingerprint transmitted from the electronic device 100 through the receiving unit (3210), and receives the fingerprint template selection information transmitted from the electronic device 100 (3220).

As described above, the fingerprint template selection information may be determined based on at least one piece of the status information of the electronic device 100 or the authentication history information. The status information of the electronic device may be determined by using a gyro sensor or a stylus sensor, which will be described below, or may be determined based on the status information of the electronic device 100, but the present invention is not limited thereto.

When the fingerprint template selection information is received, the fingerprint authentication server 2200 determines the priority of the reference fingerprint templates to be matched with the feature information of the fingerprint based on the fingerprint template selection information (3230). For example, if it is determined that the user is highly likely to use a left hand based on the status information of the electronic device 100, the fingerprint authentication server may select the left hand templates first as the reference fingerprint templates to be matched, and if it is determined that the user is highly likely to use an index finger, the fingerprint authentication server may select the index finger templates first as the reference fingerprint templates to be matched.

When the priority of the reference fingerprint templates to be matched with the feature information of the fingerprint is determined, the fingerprint authentication server 2200 aligns the feature information of the recognized fingerprint and the fingerprint templates according to the priority, and performs the fingerprint-matching (3240). The fingerprint-matching is conducted by comparing the recognized fingerprint with the feature information of the fingerprint selected from the DB and calculating the correlation of the feature points that are positioned in a similar area after the alignment. A plurality of reference feature points may be provided with respect to a single feature point, and the efficiency of the matching may be improved by using the features, such as end points or bifurcation points.

The fingerprint-matching is conducted by using the feature information extracted through the feature information extracting operation of the fingerprint. Therefore, the matching operation has a close relationship with the feature information extraction algorithm, and they play a complementary role to each other. For example, even if the feature information extraction process is not perfect, the matching rate may be increased through the matching process.

The fingerprint authentication server 2200 determines the fingerprint authentication success or failure by using the fingerprint-matching result (3250). If the correlation is high as a result of comparing the recognized fingerprint with the feature information of the fingerprint selected from the DB, the possibility in which the two fingerprints are the same (that is, the user is the registered user) increases. The matching results may usually be expressed as match scores between 0 and 1, and the higher the match score is, the higher the reliability of the matching result is.

If the match score calculated from the matching result is equal to or more than a preset threshold, the fingerprint authentication server may determine that the authentication is successful, and if the match score calculated from the matching result is less than the preset threshold, the fingerprint authentication server may determine that the authentication has failed.

Although it is not shown in FIG. 32, afterwards, the fingerprint authentication server 2200 transmits the fingerprint authentication result to the electronic device 100 to thereby determine the access authority of the user who has attempted the fingerprint authentication with respect to the electronic device 100.

The embodiments of the present invention described above may be implemented in the form of program instructions that can be executed by various computers, and may be recorded in a computer-readable recording medium. The computer readable recording medium may include a program command, a data file, and a data structure independently or in combination. The program instruction recorded in the recording medium is specially designed and constructed for the present invention, but may be well known to and may be used by those skilled in the art of computer software. For example, the computer readable recoding medium includes magnetic media such as a hard disk, a floppy disk, and a magnetic tape, optical media such as a CD-ROM and a DVD, magneto-optical media such as a floptical disk, and hardware devices such as a ROM, RAM, and a flash memory, which are specially constructed in such a manner that they can store and execute a program command. Examples of the program command include a machine language code generated by a compiler and a high-level language code executable by a computer through an interpreter and the like. The hardware devices may be changed into one or more software modules in order to perform the process according to the present invention, and vice versa.

Although the present invention has been described through the details, such as specific elements, and exemplary embodiments and drawings, these are merely provided to aid in understanding the present invention, and the invention is not limited thereto. The present invention may be achieved with various modifications and changes by those skilled in the art based on the description above.

Accordingly, the spirit and scope of the present invention should not be limited or determined by the above-described embodiments, and it should be noted that not only the claims which will be described below but also their equivalents fall within the spirit and scope of the present invention.

The invention claimed is:

1. A biometrics-based authentication method of an electronic device, the method comprising:
storing registered information on an authentication target;
subsequent to the storing, sensing the authentication target to obtain sensing data, and calculating feature information based on the sensing data;
evaluating a quality level of the sensing data and the feature information;
based on the quality level of the sensing data and the feature information being higher than a preset quality level, determining whether or not the calculated feature information and the stored registered information match each other by using a dynamic matching scheme in which a matching operation of the feature information and the registered information is variably performed according to a status of the electronic device; and
based on determining that the feature information and the registered information match each other generating an authentication success event.

2. The method of claim 1, wherein the dynamic matching scheme, in which the matching operation of the feature information and the registered information is variably performed according to the status of the electronic device, is a scheme for performing the matching of the feature information and the registered information by selectively applying one of a plurality of matching schemes, which are distinguished according to the status of the electronic device.

3. The method of claim 2, wherein the plurality of matching schemes, which are distinguished according to the status of the electronic device, have different security levels according to the status of the electronic device.

4. The method of claim 2, wherein the plurality of matching schemes, which are distinguished according to the status of the electronic device, use different fingerprint templates according to the status of the electronic device.

5. The method of claim 2, wherein the plurality of matching schemes, which are distinguished according to the status of the electronic device, are distinguished according to the type of application that requests biometrics-based authentication through the electronic device.

6. The method of claim 2, wherein, in a case in which a screen lock application and a financial application are installed in the electronic device, the plurality of matching schemes, which are distinguished according to the status of the electronic device, are distinguished according to whether the application, which requests biometrics-based authentication through the electronic device, is the screen lock application or the financial application.

7. The method of claim 2, wherein the plurality of matching schemes, which are distinguished according to the status of the electronic device, are distinguished according to a direction in which a fingerprint recognition sensor is positioned when the electronic device is in a horizontal mode.

8. The method of claim 2, wherein the plurality of matching schemes, which are distinguished according to the status of the electronic device, are distinguished according to a direction in which a finger input is received on a fingerprint recognition sensor of the electronic device.

9. The method of claim 2, wherein the plurality of matching schemes, which are distinguished according to the status of the electronic device, are distinguished according to attachment or detachment of a stylus provided at a preset position of the electronic device.

10. The method of claim 2, wherein the plurality of matching schemes, which are distinguished according to the status of the electronic device, are distinguished according to whether the electronic device is determined to be held by a right hand or a left hand.

11. The method of claim 2, wherein the plurality of matching schemes, which are distinguished according to the status of the electronic device, are distinguished based on information configured through a configuration menu provided by the electronic device.

12. The method of claim 2, wherein the plurality of matching schemes, which are distinguished according to the status of the electronic device, are distinguished according to a growth condition of a user of the electronic device.

13. The method of claim 1, further comprising providing a user interface for differently configuring a security level according to the status of the electronic device.

14. The method of claim 1, further comprising:
providing an object that represents a security level in one of a plurality of states of the electronic device; and
changing the security level in the one state to a lower security level or a higher security level according to a user input.

15. A biometrics-based authentication method of an electronic device, the method comprising:
storing registered information on an authentication target;
providing a user interface for configuring security levels for a plurality of applications that perform biometrics-based authentication;
configuring the security level for one of the plurality of applications according to a user input through the user interface;
when biometrics-based authentication related to the one application is performed subsequent to the storing, sensing the authentication target to obtain sensing data;
calculating feature information based on the sensing data;
evaluating a quality level of the sensing data and the feature information; and
based on the feature information and the registered information being determined to match each other based on the security level for the one application, and based on the quality level of the sensing data and the feature information being higher than a preset quality level, generating an authentication success event.

16. An electronic device for performing biometrics-based authentication, the electronic device comprising:

a memory configured to store registered information on an authentication target;
a sensor configured to sense the authentication target to obtain sensing data at a time subsequent to a time at which the registered information is stored in the memory; and
a processor configured to evaluate a quality level of the sensing data and feature information calculated based on the sensing data; determine, based on the quality level of the sensing data and the feature information being higher than a preset quality level, whether or not the calculated feature information and the stored registered information match each other by using a dynamic matching scheme in which a matching operation of the feature information and the registered information is variably performed according to a status of the electronic device; and generate, based on determining that the feature information and the registered information match each other, an authentication success event.

17. The electronic device of claim 16, wherein the dynamic matching scheme, in which the matching operation of the feature information and the registered information is variably performed according to the status of the electronic device, is a scheme for performing the matching of the feature information and the registered information by selectively applying one of a plurality of matching schemes, which are distinguished according to the status of the electronic device.

18. The electronic device of claim 17, wherein the plurality of matching schemes, which are distinguished according to the status of the electronic device, have different security levels according to the status of the electronic device.

19. The electronic device of claim 17, wherein the plurality of matching schemes, which are distinguished according to the status of the electronic device, use different fingerprint templates according to the status of the electronic device.

20. The electronic device of claim 17, wherein the plurality of matching schemes, which are distinguished according to the status of the electronic device, are distinguished according to the type of application that requests biometrics-based authentication through the electronic device.

21. The electronic device of claim 17, wherein, in a case in which a screen lock application and a financial application are installed in the electronic device, the plurality of matching schemes, which are distinguished according to the status of the electronic device, are distinguished according to whether the application, which requests biometrics-based authentication through the electronic device, is the screen lock application or the financial application.

22. The electronic device of claim 17, wherein the sensor comprises a fingerprint recognition sensor and the plurality of matching schemes, which are distinguished according to the status of the electronic device, are distinguished according to a direction in which the fingerprint recognition sensor is positioned when the electronic device is in a horizontal mode.

23. The electronic device of claim 17, wherein the sensor comprises a fingerprint recognition sensor and the plurality of matching schemes, which are distinguished according to the status of the electronic device, are distinguished according to a direction in which a finger input is received on the fingerprint recognition sensor of the electronic device.

24. The electronic device of claim 17, wherein the plurality of matching schemes, which are distinguished according to the status of the electronic device, are distinguished according to attachment or detachment of a stylus provided at a preset position of the electronic device.

25. The electronic device of claim 17, wherein the plurality of matching schemes, which are distinguished according to the status of the electronic device, are distinguished according to whether the electronic device is determined to be held by a right hand or a left hand.

26. The electronic device of claim 17, wherein the plurality of matching schemes, which are distinguished according to the status of the electronic device, are distinguished based on information configured through a configuration menu provided by the electronic device.

27. The electronic device of claim 17, wherein the plurality of matching schemes, which are distinguished according to the status of the electronic device, are distinguished according to a growth condition of a user of the electronic device.

28. The electronic device of claim 16, further comprising a user interface unit that provides a user interface for differently configuring a security level according to the status of the electronic device.

29. The electronic device of claim 16, further comprising a user interface for providing an object that represents a security level in one of a plurality of states of the electronic device, wherein the processor is configured to change the security level in the one state to a lower security level or a higher security level according to a user input through the user interface.

30. An electronic device for performing biometrics-based authentication, the electronic device comprising:
- a memory configured to store registered information on an authentication target;
- a user interface for configuring security levels for a plurality of applications that perform biometrics-based authentication;
- a sensor configured to sense the authentication target to obtain sensing data; and
- a processor configured to configure the security level for one of the plurality of applications according to a user input through the user interface; calculate, when the biometrics-based authentication related to the one application is performed at a time subsequent to a time at which the registered information the is stored in the memory, feature information based on sensing data obtained through the sensor; evaluate a quality level of the sensing data and the feature information and generate, based on the feature information and the registered information being determined to match each other based on the security level for the one application and based on the quality level of the sensing data and the feature information being higher than a preset quality level, an authentication success event.

* * * * *